(12) United States Patent
Huo et al.

(10) Patent No.: US 12,231,153 B2
(45) Date of Patent: Feb. 18, 2025

(54) PRACTICAL DESIGN TECHNIQUES FOR CELLULAR AND WiFi CO-ENABLED SYSTEMS

(71) Applicants: Yiming Huo, Victoria (CA); Xiaodai Dong, Victoria (CA); Wei Xu, Nanjing (CN); Marvin Yuen, Irvine, CA (US)

(72) Inventors: Yiming Huo, Victoria (CA); Xiaodai Dong, Victoria (CA); Wei Xu, Nanjing (CN); Marvin Yuen, Irvine, CA (US)

( * ) Notice: Subject to any disclaimer, the term of this patent is extended or adjusted under 35 U.S.C. 154(b) by 379 days.

(21) Appl. No.: 17/728,777

(22) Filed: Apr. 25, 2022

(65) Prior Publication Data

US 2022/0255572 A1 Aug. 11, 2022

Related U.S. Application Data

(63) Continuation-in-part of application No. 16/944,035, filed on Jul. 30, 2020, now abandoned, which is a continuation-in-part of application No. 15/883,725, filed on Jan. 30, 2018, now Pat. No. 10,771,123.

(60) Provisional application No. 62/453,120, filed on Feb. 1, 2017.

(51) Int. Cl.
*H04B 1/04* (2006.01)
*H04B 1/16* (2006.01)
*H04B 7/0426* (2017.01)

(52) U.S. Cl.
CPC .................. *H04B 1/04* (2013.01); *H04B 1/16* (2013.01); *H04B 7/043* (2013.01)

(58) Field of Classification Search
CPC ............. H04B 1/04; H04B 1/16; H04B 7/043

USPC ........................................................ 375/262
See application file for complete search history.

(56) References Cited

U.S. PATENT DOCUMENTS

| 9,819,083 | B1 | 11/2017 | Chen et al. |
|---|---|---|---|
| 10,771,123 | B2 * | 9/2020 | Huo ..................... H04L 1/0625 |
| 2013/0095770 | A1 | 4/2013 | Moshfeghi |
| 2017/0041038 | A1 | 2/2017 | Kirkpatrick et al. |
| 2017/0054534 | A1 | 2/2017 | Sang et al. |
| 2017/0331670 | A1 | 11/2017 | Parkvall et al. |

* cited by examiner

*Primary Examiner* — Michael R Neff
(74) *Attorney, Agent, or Firm* — Womble Bond Dickinson (US) LLP

(57) ABSTRACT

A system for distributed phased array multiple input multiple output (DPA-MIMO) communications is disclosed. The system includes beamforming (BF) modules. Each BF module comprises a beamforming antenna, a downconverter that downconverts a beamformed antenna radio frequency signal to an intermediate frequency signal, and an upconverter that upconverts an intermediate frequency signal to a radio frequency signal and sends said radio frequency signal to said beamforming antenna for transmission. The system further includes intermediate frequency (IF) radios. Each IF radio comprises a downconverter that downconverts an intermediate frequency signal sent from a BF module to a baseband signal, and an upconverter that upconverts said baseband signal to an intermediate frequency signal that is transmitted to a beamforming module. The system can be designed for a wearable virtual reality (VR) device, a VR base station, an automotive vehicle, an aerial vehicle, a high altitude platform (HAP) system, and a foldable handheld device.

18 Claims, 20 Drawing Sheets

PRACTICAL DESIGN TECHNIQUES FOR CELLULAR AND WiFi CO-ENABLED SYSTEMS

CROSS-REFERENCE TO RELATED APPLICATIONS

This application is a continuation-in-part of U.S. patent application Ser. No. 16/944,035, filed Jul. 30, 2020, which is a continuation-in-part of U.S. patent application Ser. No. 15/883,725, filed Jan. 30, 2018, which claims the benefit pursuant to 35 U.S.C. 119(e) of U.S. Provisional Application No. 62/453,120, filed Feb. 1, 2017, all of which are incorporated herein by reference in their entirety.

FIELD OF THE INVENTION

One or more embodiments of the disclosure generally relate to mobile wireless communications. More particularly, the disclosure relates to multiple-input-multiple-output wireless communications device designs.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present disclosure, or any embodiments thereof, to anything stated or implied therein or inferred thereupon.

Current mobile computing devices such as, but not limited to, smartphones typically contain more wireless technologies and standards as time progresses. Support for more wireless technologies and standards may be typically achieved by additional hardware systems. Considerations are typically given for power, cost, and/or physical space when designing mobile computing devices for users Typically, current wireless communication systems require higher data rates to enable increasingly complex applications. Wireless communication systems may involve communications at frequencies as high as 60 GHz. Communications at high frequencies may allow for more available spectrums and bandwidths, but may lead to high propagation loss and penetration loss. Spectral efficiency may be improved by multiple-input-multiple-output (MIMO) techniques.

Fifth generation wireless communication systems such as 5G typically are expected to have peak data throughputs of approximately 10 gigabits per second. Higher data throughputs typically may be achieved by using a broader frequency range, improving data encoding and/or error correction, and/or improving signal reception. Higher frequencies such as those above 37 GHz are typically known to have a higher degree of signal interference from physical objects such as, but not limited to, buildings and/or people, compared to typically more traditional cellular frequencies. Improvements in data encoding and/or error correction typically require considerations for hardware costs and/or power usage. Signal reception may typically be improved with additional hardware components such as, but not limited to, antennas and/or amplifiers and typically require considerations such as, but not limited to, hardware cost, power usage, and/or physical dimensions.

The following is an example of a specific aspect in the prior art that, while expected to be helpful to further educate the reader as to additional aspects of the prior art, is not to be construed as limited the present disclosure, or any embodiments thereof, to anything stated or implied therein or inferred thereupon. By way of educational background, another aspect of the prior art generally useful to be aware of is that some companies may implement wireless communication designs that comprise of a plurality of antennas to improve signal reception of a predetermined frequency range.

In view of the foregoing, it is clear that these traditional techniques are not perfect and leave room for more optimal approaches.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION

Some embodiments of the present disclosure and variations thereof, relate to wireless communications systems. Some of these embodiments may comprise computer software. In some of these embodiments, software may be integrated into hardware, including, without limitation, uniquely-designed hardware for running embodiment software.

Figure 1:
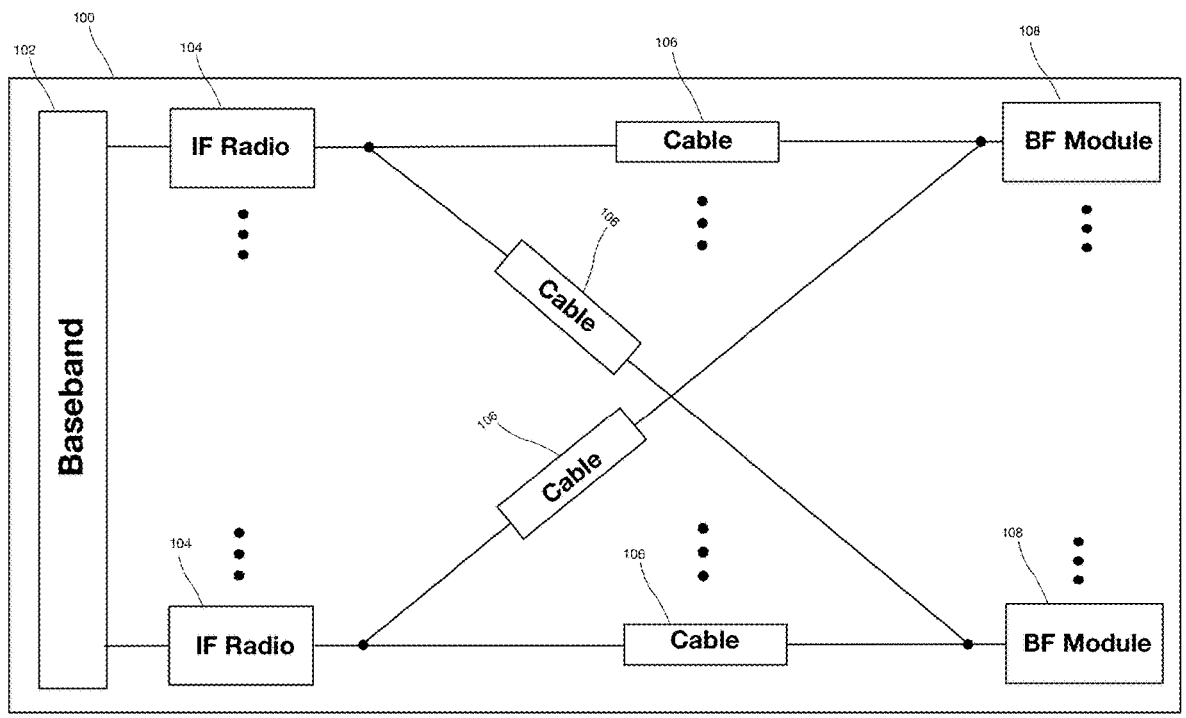
FIG. 1 illustrates a top level system diagram of a distributed phased array multiple-input-multiple-output wireless communication architecture, in accordance with an embodiment.

FIG. 1 illustrates a top level system diagram of a distributed phased array multiple-input-multiple-output (DPA-MIMO) wireless communication architecture, in accordance with an embodiment. A DPA-MIMO wireless communication architecture 100 comprises of a baseband processing unit 102, one or more intermediate frequency (IF) radios 104, one or more cables 106, and one or more beamforming (BF) modules 108. Baseband processing unit 102 may handle all baseband signals for all IF radios 104. Electronic signals and/or power may travel from IF radios 104 through one or more cables 106 to one or more BF modules 108. BF module 106 may be configured to receive and/or transmit wireless data.

During a typical receive operation, henceforth also known as a downlink path, BF module 108 receives wireless signals and downconverts the wireless signals to an intermediate frequency (IF) range. One or more BF modules 108 may form wireless receiving beams independently or jointly pointing to any directions with any beamwidths that are amenable to reception in a given propagation environment. The wireless signals in the IF range are sent through one or more cables 106 to one or more IF radios 104. At IF radio 104, IF range wireless signals are further downconverted in the frequency domain and sent to baseband processing unit 102 for processing.

During a typical transmit operation, henceforth also known as an uplink path, baseband processing unit 102 generates baseband data carrying information for communication and sends the baseband signals to one or more IF radios 104. IF radios 104 upconvert the baseband signals to one or more intermediate frequencies which are sent through one or more cables 106 to one or more BF modules 108. BF modules 108 upconvert any received IF signals to one or more predetermined transmission frequencies. One or more BF modules 108 further form a wireless transmission beams independently or jointly pointing to any directions with any beamwidths that are amenable to transmission in a given propagation environment and sends wireless signals at transmission frequencies.

One or more IF radios 104 may be connected to one BF module 108 through one or more cables 106. BF module 108 may exchange IF signals with a plurality of IF radios 104, which may be performed during instances when, but not limited to, some of the BF modules are powered down or stand by.

It may be appreciated by a person with ordinary skill in the art that baseband processing unit 102 includes a processor that may perform any type of process and/or algorithm on electronic signals. Processes and/or algorithms include, but are not limited to, digital beamforming techniques that process one or more signals from the one or more BF modules 108 independently or jointly. Digital beamforming may implement functions such as, but not limited to, removing interferences and/or enhancing a signal-to-noise ratio of the one or more processed signals and/or signals between antenna elements within one BF module 108. Baseband processing unit 102 may also perform baseband processing for other wireless protocols and/or standards.

It may be appreciated by a person with ordinary skill in the art that one or more cables 106 may be any type of medium capable of sending signals and/or power. Cables 106 may be, but not limited to, fiber optic cables, coaxial cables, IPEX/IPX cables, and/or ethernet cables with the any necessary coupling apparent by a person with ordinary skill in the art. In one embodiment, cables 106 may be fiber optic cables carrying signals and/or power at various optical wavelengths.

It may be appreciated by a person with ordinary skill in the art that one or more cables 106 may carry signals at one or more frequencies for each cable 106. In one embodiment a single cable 106 may carry multiple signals at a plurality of frequencies.

It may be appreciated by a person with ordinary skill in the art that a BF module 108 may include any type of beamforming antenna in any orientation. BF module 108 antennas may include, but not limited to, phased array antennas, steerable antennas, and/or reconfigurable antennas. In one embodiment, a plurality of phased array antennas are orientated in a circular formation. In another embodiment, a plurality of phased array antennas are orientated in a stacked up three-dimensional formation.

It may be appreciated by a person with ordinary skill in the art that a BF module 108 may operate at any frequency range. Frequency ranges may be, but not limited to, from 6 to 600 GHz, to handle various wireless technologies and standards which may include, but not limited to, cellular communications, wireless local area network (WLAN) communications, global navigation satellite system (GNSS) communications, millimeter wave (mmWave) communications, terahertz (THz) communications, visible-light communications, near field communications (NFC) and/or other wireless communications. In one embodiment, a plurality of BF modules 108 may cover a plurality of standard wireless communications frequencies such that a DPA-MIMO wireless communications architecture 100 may function at a plurality of wireless communication protocols.

It may be appreciated by a person with ordinary skill in the art that any signal and/or power may be sent between one or more elements of DPA-MIMO wireless communication architecture 100. Signals and/or power sent between one or more elements may include, but not limited to, direct current (DC) power, control signals, reference signals, and/or feedback signals. In one embodiment, an IF radio 104 may provide DC power to one or more BF modules 108 through one or more cables 106. In another embodiment, one or more IF radios 104 may send control and reference signals through one or more cables 106 to one or more BF modules 108. BF modules 108 may send feedback signals back to IF radios 104 through cables 106.

It may be appreciated by a person with ordinary skill in the art that one or more elements of DPA-MIMO wireless communication architecture 100 may be combined into a single functional group or separated into a plurality of functional groups. In one embodiment, a plurality of sets each comprising of an IF radio 104, a cable 106, and a BF module 108 may work individual functions such as, but not limited to, communications at a specific frequency, communications in a specific data stream, transmitting signals, and/or receiving signals. In another embodiment, a plurality of sets comprising of one or more IF radios 104, cables 106, and BF modules 108 may work a single function such as, but not limited to, communications at a specific frequency, communications in a specific data stream, transmitting signals, and/or receiving signals.

It may be appreciated by a person with ordinary skill in the art that one or more BF modules 108 may cover a wide frequency range. A frequency range covered by one or more BF modules 108 may include, but not limited to, WiFi bands beyond 6 GHz, wireless gigabit (WiGig) bands from 57-71 GHz, and/or frequencies used by other wireless standards, licensed and unlicensed spectrum frequencies.

Figure 2:
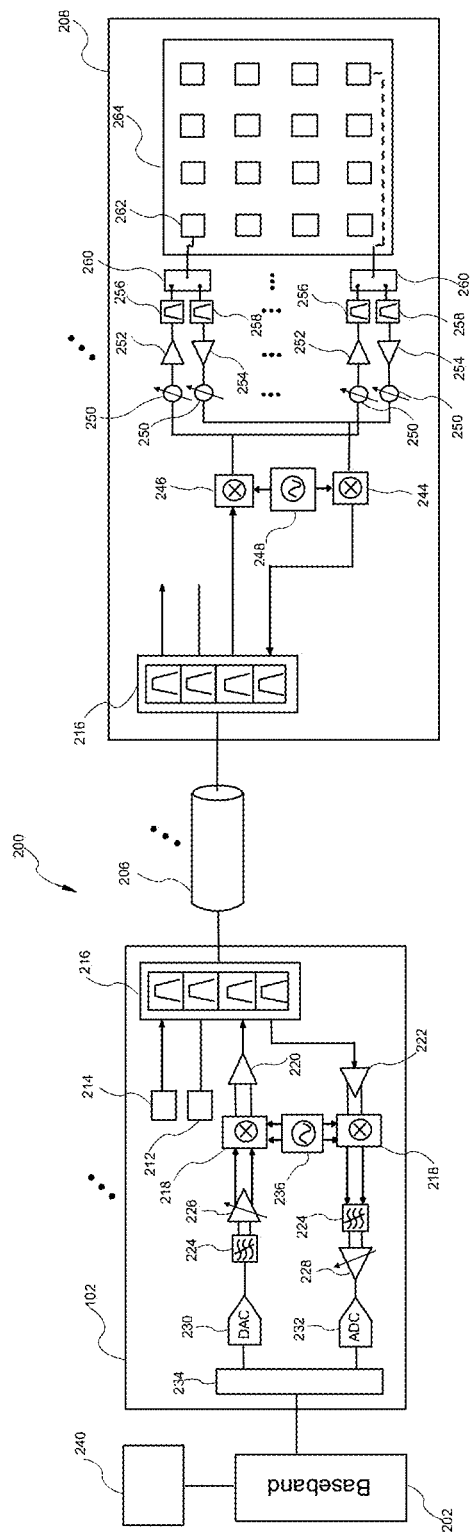
FIG. 2 illustrates a detailed perspective of an exemplary distributed phase array multiple-input-multiple-output system, in accordance with an embodiment.

FIG. 2 illustrates a detailed perspective of an exemplary DPA-MIMO system 200, in accordance with an embodiment. A DPA-MIMO wireless communication system 200 comprises of a baseband processing unit 202, one or more intermediate frequency (IF) radios 204, one or more cables 206, and one or more BF modules 208. Baseband processing unit 202 may be further connected to one or more radio frequency (RF) systems 240 which may include any RF front ends and/or antenna apparent by a person with ordinary skill in the art.

BF module 208 comprises of an antenna array 264, one or more quadplexers 216, one or more local oscillators 248, one or more transmission signal mixers 246, one or more receive signal mixers 244, two or more phase shifters 250, one or more power amplifiers 252, one or more low-noise amplifiers 254, one or more transmission band filters 256, one or more tunable receive band filters 258, and one or more time controlled switches 260. Antenna array 264 may further comprise of one or more antenna elements 262.

Antenna array 264 may comprise of one or more antenna elements 262 which may be of heterogeneous or homogeneous type, shape, polarization, orientation and design. It may be appreciated by a person with ordinary skill in the art that antenna elements 262 may be selected and/or orientated based on specific DPA-MIMO wireless communication system 200 design and/or an application requirement.

IF radio module 204 comprises of one or more quadplexers 216, a control-reference generator 212, a power supply generator 214, one or more local oscillators 236, one or more low-pass filters 224, one or more automatic gain control units 226 and 228, one or more analog-to-digital converters (ADC) 232, a digital interface 234, one or more digital-to-analog converters (DAC) 230, a plurality of signal mixers 218, one or more transmission filters 224, and two or more signal amplifiers 220 and 222.

During typical operation within a BF module 208, one or more antenna elements 262 may be directly connected to a time controlled switch 260 that may route the signal for an uplink or a downlink path. A downlink path may have a tunable receive band filter 258 placed between a time controlled switch 260 and one or more low noise amplifiers 254. Each low-noise amplifiers 254 are followed by one or more phase shifters 250. Output signals from one or more phase shifters 250 of multiple paths may be combined to be downconverted to IF signals by a local oscillator 248 and a receive signal mixer 244. A generated IF signal may be then delivered to one or more quadplexers 216 in one or more IF radios 204 via one or more cables 206. A BF module 208 may comprise of transceiver circuits including multiple uplink and downlink paths connected to one or more antenna arrays 264.

A transmission path within BF module 208 may begin by receiving signals from quadplexer 216 via one or more cables 206. Signals received from quadplexer 216 may be upconverted by a local oscillator 248 and a transmission signal mixer 246. An output signal from transmission signal mixer 246 is sent to multiple phase shifters 250, one or more phase shifters 250 at a path where one or more power amplifiers 252 may direct an amplified output signal to one or more transmission band filters 256. A filtered output signal from the one or more transmission band filters 256 may be sent to a time controlled switch 260 and routed to a corresponding antenna element 262 for transmission.

During typical operation within a IF radio 204, one or more quadplexers 216 may deliver power from a power supply generator 214 to one or more BF modules 208 via one or more cables 206. A control-reference generator 212 generates control and/or reference signals. The control-reference generator 212 may also receive feedback signals that may include, but not limited to, an indication of communication quality and temperature of BF modules 208.

A downlink path within IF radio 204 begins with output signals received at one or more quadplexers 216. One or more signal amplifiers 222 may perform functions such as, but not limited to, amplification and transforming single-ended signals to differential signals. Signals from signal amplifiers 222 may be downconverted into one or more baseband analog signals by a local oscillator 236 and a signal mixer 218. The baseband analog signals may be filtered by one or more low-pass filters 224. An amplitude of a filtered baseband signal may be adjusted by one or more automatic gain control units 228. A filtered and/or amplified baseband signal may be digitized by an ADC 232. A digital interface 234 bridges the digitized baseband signal from ADC 232 to baseband processing unit 202.

An uplink path within IF radio 204 begins with digital baseband signals being transformed to analog baseband signals through one or more DAC 230. The analog baseband signals may be filtered through one or more low-pass filters 224. One or more automatic gain control units 226 may adjust the amplitude of a filtered analog baseband signal from the low-pass filters 224. Filtered and/or amplitude adjusted signals may be frequency upconverted by a local oscillator 236 and a signal mixer 218. One or more signal amplifiers 220 may further amplify an upconverted signal from signal mixer 218 before sending the upconverted signal to one or more quadplexers 216. Signals may be sent from quadplexers 216 to one or more BF modules 208 via one or more cables 206.

It may be appreciated by a person with ordinary skill in the art that baseband processing unit 202 includes a processor that may perform any type of process and/or algorithm on electronic signals. Processes and/or algorithms include, but are not limited to, digital beamforming techniques that process one or more signals from the one or more BF modules 208 independently or jointly. BF modules 208 may also perform functions such as, but not limited to, removing interferences and/or enhancing a single to noise ratio of the one or more processed signals and/or signals between antenna elements within one BF module 208. Baseband processing unit 202 may also perform baseband processing for other wireless protocols and/or standards.

It may be appreciated by a person with ordinary skill in the art that a BF module 208 may operate at any frequency range. Frequency ranges may be, but not limited to, from 6 to 600 GHz, to handle various wireless technologies and standards which may include, but not limited to, cellular communications, WLAN communications, GNSS communications, mmWave communications, THz communications, visible-light communications, NFC and/or other wireless communications. In one embodiment, a plurality of BF modules 208 may cover a plurality of standard wireless communications frequencies such that a DPA-MIMO wireless communications system 200 may function at a plurality of wireless communication protocols.

It may be appreciated by a person with ordinary skill in the art that a plurality of IF radios 204 may operate at same or different frequency ranges, each of which operates at a frequency depending on the working frequency of its connected BF module 208. The operating frequencies of IF radio 204 and BF module 208 may be designed jointly.

It may be appreciated by a person with ordinary skill in the art that one or more quadplexers 216 may be multiplexers of any size and/or number. In one embodiment, quadplexers 216 may be a hexplexer. In another embodiment, quadplexers 216 may be a chain of smaller multiplexers.

It may be appreciated by a person with ordinary skill in the art that RF system 240 may be for any wireless communication standard. Wireless communication standards include, but not limited to, the $2^{nd}$ Generation cellular system (2G), the $3^{rd}$ Generation cellular system (3G), the $4^{th}$ Generation cellular system (4G), WLAN, Bluetooth, and/or other wireless standards. In one embodiment, RF system 240 may function at Bluetooth, NFC, and 3G wireless standards.

It may be appreciated by a person with ordinary skill in the art that one or more time controlled switches 260 may be any type, combination, and/or number of time controlled switches. Time controlled switches 260 may be, but not limited to, N-pole N-throw switches. In one embodiment, time controlled switches 260 may be a combination of single-pole double-throw switches and single-pole triple-throw switches.

It may be appreciated by a person with ordinary skill in the art that one or more time controlled switches 260 may be any switching and/or multiplexing device to achieve any duplexing scheme for one or more BF modules 208. BF modules 208 may perform duplexing such as, but not limited to, time-division duplexing and/or frequency-division duplexing. Duplexing schemes may be achieved with different types of switches and/or multiplexers as the one or more time controlled switches 260 in BF modules 208. Duplexing switches and/or multiplexers may include, but not limited to, diplexers and/or single-pole double-throw switches. In one embodiment, one or more BF modules 208 may have time-division duplexing with one or more time controlled switches 260 as single-pole double-throw switches. In another embodiment, one or more BF modules 208 may have frequency-division duplexing with one or more time controlled switches 260 replaced as diplexers.

Figure 3:
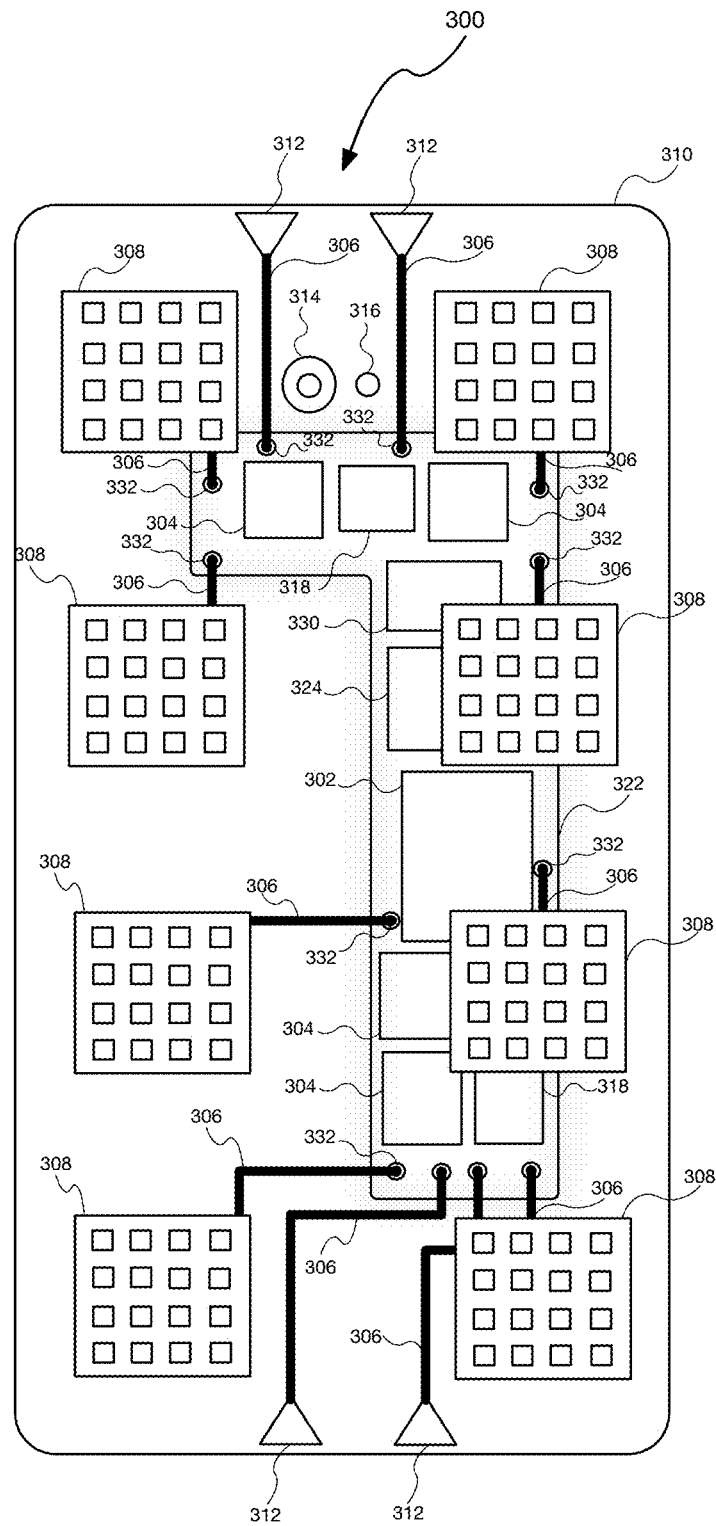
FIG. 3 illustrates a top view of an exemplary user equipment device based on DPA-MIMO architecture, in accordance with an embodiment.

FIG. 3 illustrates a top view of an exemplary user equipment device 300 based on DPA-MIMO architecture, in accordance with an embodiment. A user equipment device 300 comprises of a rear housing 310, a camera 314, a LED light 316, one or more wireless protocol chipsets 318, one or more cellular sub-6 GHz antennas 312, a main logic board 322, a baseband processing unit 302, one or more IF radios 304, one or more cables 306, and one or more beamforming (BF) modules 308.

Main logic board 322 may be connected to the one or more IF radios 304, baseband processing unit 302, cable connectors 332, and one or more wireless protocol chipsets 318. One or more cables 306 may be used to connect one or more BF modules 308 and one or more sub-6 GHz antennas 312 to main logic board 322 at cable connectors 332. Peripherals such as, but not limited to, camera 314, LED light 316, and/or one or more wireless protocol chipsets 318 may be additionally connected to main logic board 322.

One or more BF modules 308 may be placed within rear housing 310 in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment, a plurality of BF modules 308 are placed such that a necessary edge-to-edge spacing of more than 1.5 times a free space wavelength is maintained. A placement for BF modules 308 may be determined according to any application requirements such as, but not limited to, physical requirements, heat dissipation, and/or spatial multiplexing gain.

It may be appreciated by a person with ordinary skill in the art that one or more wireless protocol chipsets 318 may be for any combination of wireless protocols. Wireless protocol chipsets 318 may adhere to protocols such as, but not limited to, WiFi, Bluetooth, GNSS, and/or NFC. In one embodiment, user equipment device 300 comprises of a plurality of heterogeneous wireless protocol chipsets 318 to provide Bluetooth, WiFi, GNSS, and NFC communication functionality.

It may be appreciated by a person with ordinary skill in the art that the placement and number of any elements in user equipment device 300 may be determined by any metrics and/or purposes. Metrics and/or purposes may include, but not limited to, heat dissipation, power usage, signal quality, and/or device aesthetic. In one embodiment, a plurality of BF modules 308 may be placed in a grid pattern at an edge-to-edge separation of 1.5 times a free-space wavelength in order to optimize any wireless signal strength.

It may be appreciated by a person with ordinary skill in the art that a user equipment device 300 and/or rear housing 310 may be implemented in any form. Forms that user equipment device 300 and/or rear housing 310 may take include, but not limited to, cellular phones, tablets, computers, laptops, virtual reality headsets, wearable devices, and/or vehicles. In one embodiment, user equipment device 300 and rear housing 310 may be in the form of a smart television.

It may be appreciated by a person with ordinary skill in the art that one or more cellular sub-6 GHz antennas 312 may be one or more antennas for any frequency. Cellular sub-6 GHz antennas 312 may also be heterogeneous or homogenous antennas. Cellular sub-6 GHz antennas 312 may be, but not limited to, Bluetooth antennas, WLAN antennas, and/or super-high frequency radio antennas. In one embodiment, cellular sub-6 GHz antennas 312 may be a plurality of heterogeneous antennas covering a range of frequencies.

It may be appreciated by a person with ordinary skill in the art that a main logic board 322 may accommodate any hardware components of a user equipment device 300. Hardware components may include, but not limited to, a computer processor, one or more computer memory modules, and/or additional copies of elements within user equipment 300. In one embodiment, main logic board 322 may accommodate a plurality of battery controllers.

Figure 4:
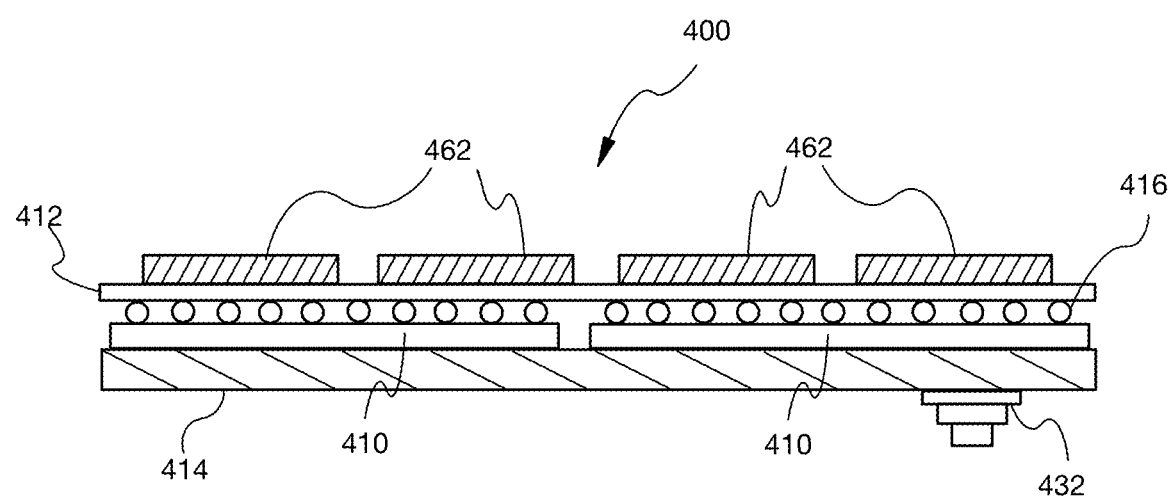
FIG. 4 illustrates a side view of an exemplary beamforming module, in accordance with an embodiment.

FIG. 4 illustrates a side view of an exemplary beamforming (BF) module 400, in accordance with an embodiment. A BF module 400 comprises of one or more radio frequency integrated circuits (RFICs) 410, a substrate layer 412, a printed circuit board (PCB) layer 414, one or more stud bumps 416, one or more cable couplers 432, and one or more antenna elements 462.

Substrate layer 412 may hold one or more antenna elements 462. One or more stud bumps 416 may be beneath substrate layer 412 for purposes including, but not limited to, maintaining mechanical stability and/or signal routing between one or more antenna elements 462 and RFICs 410. RFICs 410 may integrate function blocks such as, but not limited to, low-noise amplifiers, power amplifiers, phase shifters, filters, single-pole double-throw switches, local oscillators, and/or other necessary circuitry for functions that may be present in BF module 400. RFICs 410 may be created with different fabrication processes and/or integrate different function blocks that may be suitable for one or more fabrication processes. RFICs 410 may also be an RFIC die without packaging. PCB layer 414 may mount one or more RFICs 410, one or more cable couplers 432, and/or one or more stud bumps 416.

It may be appreciated by a person with ordinary skill in the art that one or more stud bumps 416 may be materials of any physical properties required for a function. Stud bumps 416 may be created from materials with properties such as, but not limited to, conductivity, malleability, and/or size. In one embodiment, stud bumps 416 may be a heterogeneous collection of conductive and non-conductive stud bumps make from solder and rubber respectively.

It may be appreciated by a person with ordinary skill in the art that one or more antenna elements 462 may be one or more antennas for any frequency. Antenna elements 462 may also be heterogeneous or homogenous antennas. Antenna elements 462 may be, but not limited to, Bluetooth antennas, WLAN antennas, millimeter wave antennas, terahertz antennas, and/or super-high frequency radio antennas. In one embodiment, antenna elements 462 may be a plurality of heterogeneous antennas covering a range of frequencies.

It may be appreciated by a person with ordinary skill in the art that one or more antenna elements 462 may include any type of antenna in any orientation. Antenna elements 462 may include, but not limited to, phased array antennas, steerable antennas, and/or reconfigurable antennas. In one embodiment, a plurality of phased array antennas are orientated in a circular formation on a substrate layer 412. In another embodiment, a plurality of phased array antennas are orientated in a stacked up three-dimensional formation.

Figure 5:
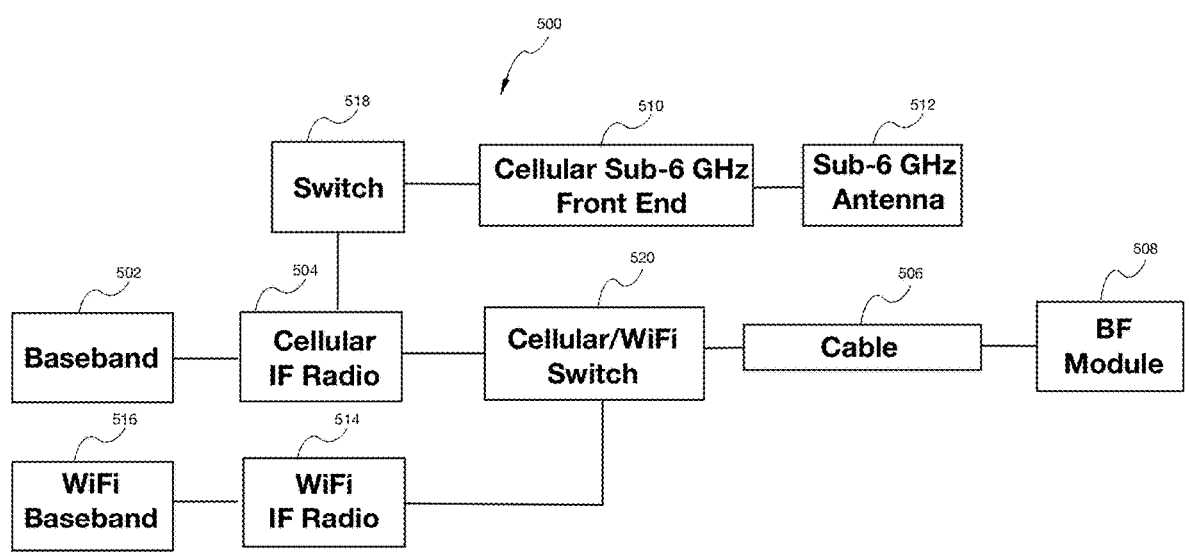
FIG. 5 illustrates a top level system diagram of a multiplexed distributed phased array multiple-input-multiple-output wireless communication architecture, in accordance with an embodiment.

FIG. 5 illustrates a top level system diagram of a multiplexed distributed phased array multiple-input-multiple-output wireless communication architecture 500, in accordance with an embodiment. A multiplex DPA-MIMO wireless communication architecture 500 comprises of a baseband processing unit 502, one or more cellular intermediate frequency (IF) radios 504, one or more cables 506, one or more beamforming (BF) modules 508, one or more switches 518, a cellular sub-6 GHz front end 510, one or more cellular sub-6 GHz antennas 512, one or more cellular-WiFi switches 520, one or more WiFi IF radios 514, and a WiFi baseband processing unit 516. Baseband processing unit 502 may handle all baseband signals for all cellular IF radios 504. Electronic signals and/or power may travel from cellular IF radios 504 through one or more cables 506 to one or more BF modules 508. BF module 506 may be configured to receive and/or transmit wireless data. One or more cellular-WiFi switches 520 may be inserted between one or more cables 506 and one or more cellular IF radios 504. The cellular-WiFi switches 520 may enable a signal path between one or more cables 506 and one or more cellular IF radios 504 or one or more WiFi IF radios 514. One or more switches 518 may be inserted between one or more cellular IF radios 504 and a cellular sub-6 GHz front end 510. Cellular sub-6 GHz front end 510 may operate below 6 GHz and may include power amplifiers, low-noise amplifiers, antenna switching modules, and/or filters. One or more cellular sub-6 GHz antennas 512 may be connected to every cellular sub-6 GHz front end 510.

During a typical receive operation, henceforth also known as a downlink path, BF module 508 receives wireless signals and downconverts the wireless signals to an intermediate frequency (IF) range. BF modules 508 may form wireless transmission beams independently or jointly pointing to any directions with any beamwidths that are amenable to reception in a given propagation environment. The wireless signals in the cellular IF range are sent through one or more cables 506 to one or more cellular IF radios 504. At IF radio 504, IF range wireless signals are further downconverted in the frequency domain and sent to baseband processing unit 502 for processing.

During a typical transmit operation, henceforth also known as an uplink path, baseband processing unit 502 generates baseband data carrying information for communication and sends the baseband signals to one or more cellular IF radios 504. Cellular IF radios 504 upconverts the baseband signals to one or more intermediate frequencies which are sent through one or more cables 506 to one or more BF modules 508. BF modules 508 upconverts any received IF signals to one or more predetermined transmission frequencies. BF modules 508 further forms a wireless transmission beams independently or jointly pointing to any directions with any beamwidths that are amenable to transmission in a given propagation environment and sends wireless signals at transmission frequencies.

Circuit paths may be enabled or disabled based on control signals given to one or more switches 518 and one or more cellular-WiFi switches 520. When one or more switches 518 open a signal path between one or more cellular IF radios 504 and a cellular sub-6 GHz front end 510, the one or more cellular-WiFi switches 520 may disable the signal paths between the one or more cables 506 and the one or more WiFi IF radios 514. In a similar fashion, when one or more switches 518 close a signal path between one or more cellular IF radios 504 and a cellular sub-6 GHz front end 510, the one or more cellular-WiFi switches 520 may enable the signal paths between the one or more cables 506 and the one or more WiFi IF radios 514.

It may be appreciated by a person with ordinary skill in the art that enabling and/or disabling circuit paths with one or more switches 518 and/or cellular-WiFi switches 520 may be used to control the usage of one or more BF modules 508 and/or input/output signals to and from baseband processing unit 502. In one embodiment, WiFi communications may be established by disabling all circuit paths to the cellular sub-6 GHz front end 510 and enabling one or more circuit paths to cellular cellular IF radios 504. In another embodiment, time slicing usage time of BF modules 508 and/or baseband processing unit 502 may be achieved by modulating control of one or more switches 518 and/or one or more cellular-WiFi switches 520.

It may be appreciated by a person with ordinary skill in the art that baseband processing unit 502 includes a processor that may perform any type of process and/or algorithm on electronic signals. Processes and/or algorithms include, but are not limited to, digital beamforming techniques that process one or more signals from the one or more BF modules 508 independently or jointly. BF modules 508 may also perform functions such as, but not limited to, removing interferences and/or enhancing a single to noise ratio of the one or more processed signals and/or signals between antenna elements within one BF module 508. Baseband processing unit 502 may also perform baseband processing for other wireless protocols and/or standards.

It may be appreciated by a person with ordinary skill in the art that a BF module 508 may operate at any frequency range. Frequency ranges may be, but not limited to, from 6 to 600 GHz, to handle various wireless technologies and standards which may include, but not limited to, cellular communications, WLAN communications, GNSS communications, mmWave communications, THz communications, visible-light communications, NFC and/or other wireless communications. In one embodiment, a plurality of BF modules 508 may cover a plurality of standard wireless communications frequencies such that a multiplexed DPA-MIMO wireless communications architecture 500 may function at a plurality of wireless communication protocols.

It may be appreciated by a person with ordinary skill in the art that one or more cables 506 may be any type of medium capable of sending signals and/or power. Cables 506 may be, but not limited to, fiber optic cables, coaxial cables, and/or ethernet cables with the any necessary coupling apparent by a person with ordinary skill in the art. In one embodiment, cables 506 may be fiber optic cables carrying signals and/or power at various optical wavelengths.

It may be appreciated by a person with ordinary skill in the art that one or more cables 506 may carry signals at one or more frequencies for each cable 506. In one embodiment a single cable 506 may carry multiple signals at a plurality of frequencies.

It may be appreciated by a person with ordinary skill in the art that a BF module 508 may include any type of antenna in any orientation. BF module 508 antennas may include, but not limited to, phased array antennas, steerable antennas, and/or reconfigurable antennas. In one embodiment, a plurality of phased array antennas are orientated in a circular formation.

It may be appreciated by a person with ordinary skill in the art that any signal and/or power may be sent between one or more elements of DPA-MIMO wireless communication architecture 500. Signals and/or power sent between one or more elements may include, but not limited to, direct-current (DC) power, control signals, reference signals, and/or feedback signals. In one embodiment, a cellular IF radio 504 may provide DC power to one or more BF modules 508 through one or more cables 506. In another embodiment, one or more cellular IF radios 504 may send control and reference signals through one or more cables 506 to one or more BF modules 508. BF modules 508 may send feedback signals back to cellular IF radios 504 through cables 506.

It may be appreciated by a person with ordinary skill in the art that one or more elements of DPA-MIMO wireless communication system 500 may be combined into a single functional group or separated into a plurality of functional groups. In one embodiment, a plurality of sets each comprising of a cellular IF radio 504, a cable 506, and a BF module 508 may work individual functions such as, but not limited to, communications at a specific frequency, communications in a specific data stream, transmitting signals, and/or receiving signals. In another embodiment, a plurality of sets comprising of one or more cellular IF radios 504, cables 506, and BF modules 508 may work a single function such as, but not limited to, communications at a specific frequency, communications in a specific data stream, transmitting signals, and/or receiving signals.

It may be appreciated by a person with ordinary skill in the art that one or more BF modules 508 may cover a wide frequency range. A frequency ranged covered by one or more BF modules 508 may include, but not limited to, WiFi bands beyond 6 GHz, wireless gigabit (WiGig) bands from 57-71 GHz, and/or frequencies used by other wireless standards, and/or licensed and unlicensed spectrum frequencies.

It may be appreciated by a person with ordinary skill in the art that one or more cellular-IF radios 504, one or more switches 518, a cellular sub-6 GHz front end 510, one or more cellular sub-6 GHz antennas 512, one or more cellular-WiFi switches 520, one or more WiFi IF radios 514, and a WiFi baseband processing unit 516 may be hardware designed for any wireless frequency and/or protocol. In one embodiment, one or more switches 518, a cellular sub-6 GHz front end 510, and one or more cellular sub-6 GHz antennas 512 may be switches, front ends, and antennas designed for super-high frequency wireless communications.

It may be appreciated by a person with ordinary skill in the art that multiplexed DPA-MIMO wireless communication architecture 500 and any comprising elements may be configured for any wireless communication frequencies. Wireless communication frequencies may include, but not limited to, Bluetooth, NFC, cellular frequencies, and/or radio frequencies. In one embodiment, one or more WiFi IF radios 514 and one or more WiFi baseband processing units 516 may be configured for Bluetooth frequencies while one or more cellular sub-6 GHz front ends 510 and one or more cellular sub-6 GHz antennas 512 may be configured for NFC frequencies.

Figure 6:
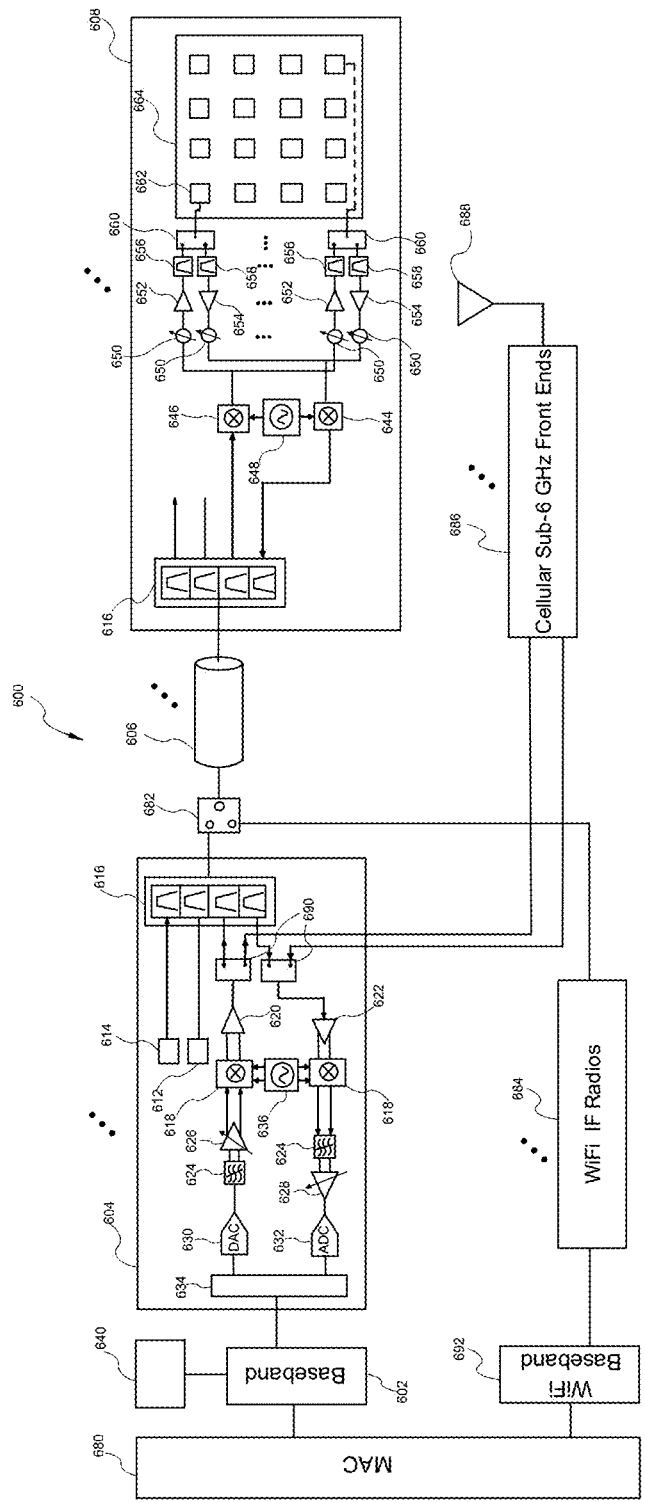
FIG. 6 illustrates a detailed perspective of a multiplexed distributed phased array multiple-input-multiple-output wireless communication system, in accordance with an embodiment.

FIG. 6 illustrates a detailed perspective of a multiplexed DPA-MIMO wireless communication system 600, in accordance with an embodiment. A multiplexed DPA-MIMO wireless communication system 600 comprises of a baseband processing unit 602, one or more IF radios 604, one or more cables 606, one or more BF modules 608, a medium access control (MAC) block 680, one or more cellular-WiFi switches 682, one or more WiFi IF radios 684, one or more WiFi baseband processing units 692, one or more cellular sub-6 GHz front ends 686, and one or more cellular sub-6 GHz antennas 688. Baseband processing unit 602 may be further connected to one or more radio frequency (RF) systems 640 which may include any RF front ends and/or antenna apparent by a person with ordinary skill in the art.

BF module 608 comprises of an antenna array 664, one or more quadplexers 616, one or more local oscillators 648, one or more transmission signal mixers 646, one or more receive signal mixers 644, one or more phase shifters 650, one or more power amplifiers 652, one or more low noise amplifiers 654, one or more transmission band filters 656, one or more tunable receive band filters 658, and one or more time controlled switches 660. Antenna array 664 may further comprise of one or more antenna elements 662.

Antenna array 664 may comprise of one or more antenna elements 662 which may be of heterogeneous type, shape, and design. It may be appreciated by a person with ordinary skill in the art that antenna elements 662 may be selected and/or orientated based on specific multiplexed DPA-MIMO wireless communication system 600 design and/or an application requirement.

IF radio module 604 comprises of one or more quadplexers 616, a control-reference generator 612, a power supply generator 614, a local oscillator 636, one or more low-pass filters 624, one or more automatic gain control units 626 and 628, one or more ADC 632, a digital interface 634, one or more DAC 630, a plurality of signal mixers 618, one or more transmission filters 624, two or more signal amplifiers 620 and 622, and one or more switches 690.

MAC block 680 may be designed to work with signals from baseband processing unit 602 and WiFi baseband processing unit 692. MAC block 680 may contain algorithms and/or protocols which may enable communication between baseband processing unit 602 and WiFi baseband processing unit 692. Communication between baseband processing unit 602 and WiFi baseband processing unit 692 may include, but not limited to, cooperation between cellular and WiFi functions based on usage and/or application scenarios, supporting co-enabling cellular and WiFi functions in baseband processing unit 602 and/or WiFi baseband processing unit 692, and/or carrier frequency aggregation of license and unlicensed frequency bands.

During typical operation within a BF module 608, one or more antenna elements 662 may be directly connected to a time controlled switch 660 that may route the signal for an uplink or a downlink path. A downlink path may have a tunable receive band filter 658 placed between a time controlled switch 660 and one or more low noise amplifiers 654. Each low-noise amplifiers 654 are followed by a phase shifter 650. Output signals from one or more phase shifters 650 may be combined to be downconverted to IF signals by a local oscillator 648 and a receive signal mixer 644. A generated IF signal may be then delivered to one or more quadplexers 616 in one or more IF radios 604 via one or more cables 606.

A transmission path within BF module 608 may begin by receiving signals from quadplexer 616 via one or more cables 606. Signals received from quadplexer 616 may be upconverted by a local oscillator 648 and a transmission signal mixer 646. An output signal from transmission signal mixer 646 is sent to multiple phase shifters 650, one phase shifter 650 at a path where one or more power amplifiers 652 may direct an amplified output signal to one or more transmission band filters 656. A filtered output signal from the one or more transmission band filters 656 may be sent to a time controlled switch 660 and routed to a corresponding antenna element 662 for transmission.

During typical operation within an IF radio 604, one or more quadplexers 616 may deliver power from a power supply generator 614 to one or more BF modules 608 via one or more cables 606. A control-reference generator 612 generates control and/or reference signals and may also receive feedback signals.

A downlink path within IF radio 604 begins with output signals received at one or more quadplexers 616. One or more signal amplifiers 622 may perform functions such as, but not limited to, amplification and transforming single-ended signals to differential signals. Signals from signal amplifiers 622 may be downconverted into one or more baseband analog signals by a local oscillator 636 and a signal mixer 618. The baseband analog signals may be filtered by one or more low-pass filters 624. An amplitude of a filtered baseband signal may be adjusted by one or more automatic gain control units 628. A filtered and/or amplified baseband signal may be digitized by an ADC 632. A digital interface 634 bridges the digitized baseband signal from ADC 632 to baseband processing unit 602.

An uplink path within IF radio 604 begins with digital baseband signals being transformed to analog baseband signals through one or more DAC 630. The analog baseband signals may be filtered through one or more low pass filters 624. One or more automatic gain control units 626 may adjust the amplitude of a filtered analog baseband signal from the low-pass filters 624. Filtered and/or amplitude adjusted signals may be frequency upconverted by a local oscillator 636 and a signal mixer 618. One or more signal amplifiers 620 may further amplify an upconverted signal from signal mixer 618 before sending the upconverted signal to one or more quadplexers 616. Signals may be sent from quadplexers 616 to one or more BF modules 608 via one or more cables 606.

Circuit paths may be enabled or disabled based on control signals given to one or more switches 690 and one or more cellular-WiFi switches 682. When one or more switches 690 open a signal path between the two or more signal amplifiers 620 and 622 and the one or more cellular sub-6 GHz front ends 686, the one or more cellular-WiFi switches 682 may disable the signal paths between the one or more cables 606 and the one or more WiFi IF radios 684. In a similar fashion, when one or more switches 690 close a signal path between between the two or more signal amplifiers 620 and 622 and the one or more cellular sub-6 GHz front ends 686, the one or more cellular-WiFi switches 682 may enable the signal paths between the one or more cables 606 and the one or more WiFi IF radios 684.

It may be appreciated by a person with ordinary skill in the art that enabling and/or disabling circuit paths with one or more switches 690 and/or cellular-WiFi switches 682 may be used to control the usage of one or more BF modules 608 and/or input/output signals to and from baseband processing unit 602. In one embodiment, WiFi communications may be established by disabling all circuit paths to the one or more cellular sub-6 GHz front ends 686 and enabling one or more circuit paths to WiFi IF radios 684. In another embodiment, time slicing usage time of BF modules 608 and/or baseband processing unit 602 may be achieved by modulating control of one or more switches 690 and/or one or more cellular-WiFi switches 682.

It may be appreciated by a person with ordinary skill in the art that a BF module 608 may operate at any frequency range. Frequency ranges may be, but not limited to, from 6 to 600 GHz, to handle various wireless technologies and standards which may include, but not limited to, cellular communications, WLAN communications, GNSS communications, mmWave communications, THz communications, visible-light communications, NFC and/or other wireless communications. In one embodiment, a plurality of BF modules 608 may cover a plurality of standard wireless communications frequencies such that a multiplexed DPA-MIMO wireless communications system 600 may function at a plurality of wireless communication protocols.

It may be appreciated by a person with ordinary skill in the art that one or more quadplexers 616 may be multiplexers of any size and/or number. In one embodiment, quadplexers 616 may be a hexplexer. In another embodiment, quadplexers 616 may be a chain of smaller multiplexers.

It may be appreciated by a person with ordinary skill in the art that one or more IF radios 604, one or more switches 690, one or more cellular sub-6 GHz front end 686, one or more cellular sub-6 GHz antennas 688, one or more cellular-WiFi switches 682, one or more WiFi IF radios 684, and a WiFi baseband processing unit 692 may be hardware designed for any wireless frequency and/or protocol. In one embodiment, one or more switches 690, one or more cellular sub-6 GHz front ends 686, and one or more cellular sub-6 GHz antennas 688 may be switches, front ends, and antennas designed for super-high frequency wireless communications.

It may be appreciated by a person with ordinary skill in the art that one or more time controlled switches 660 may be any type, combination, and/or number of time controlled switches. Time controlled switches 660 may be, but not limited to, N-pole N-throw switches. In one embodiment, time controlled switches 660 may be a combination of single-pole double-throw switches and single-pole triple-throw switches.

It may be appreciated by a person with ordinary skill in the art that one or more time controlled switches 660 may be any switching and/or multiplexing device to achieve any duplexing scheme for one or more BF modules 608. BF modules 608 may perform duplexing such as, but not limited to, time-division duplexing and/or frequency-division duplexing. Duplexing schemes may be achieved with different types of switches and/or multiplexers as the one or more time controlled switches 660 in BF modules 608. Duplexing switches and/or multiplexers may include, but not limited to, diplexers and/or single pole double throw switches. In one embodiment, one or more BF modules 608 may have time division duplexing with one or more time controlled switches 660 as single-pole double-throw switches. In another embodiment, one or more BF modules 608 may have frequency-division duplexing with one or more time controlled switches 660 as diplexers.

It may be appreciated by a person with ordinary skill in the art that RF system 640 may be for any wireless communication standard. Wireless communication standards include, but not limited to, 2G, 3G, 4G, WLAN, Bluetooth, and/or other wireless standards. In one embodiment, RF system 640 may function at Bluetooth, NFC, and 3G wireless standards.

It may be appreciated by a person with ordinary skill in the art that multiplexed DPA-MIMO wireless communication system 600 and any comprising elements may be configured for any wireless communication frequencies. Wireless communication frequencies may include, but not limited to, Bluetooth, NFC, cellular frequencies, and/or radio frequencies. In one embodiment, one or more WiFi IF radios 684 and one or more WiFi baseband processing units 692 may be configured for Bluetooth frequencies while one or more cellular sub-6 GHz front ends 686 and one or more cellular sub-6 GHz antennas 688 may be configured for NFC frequencies.

Figure 7:
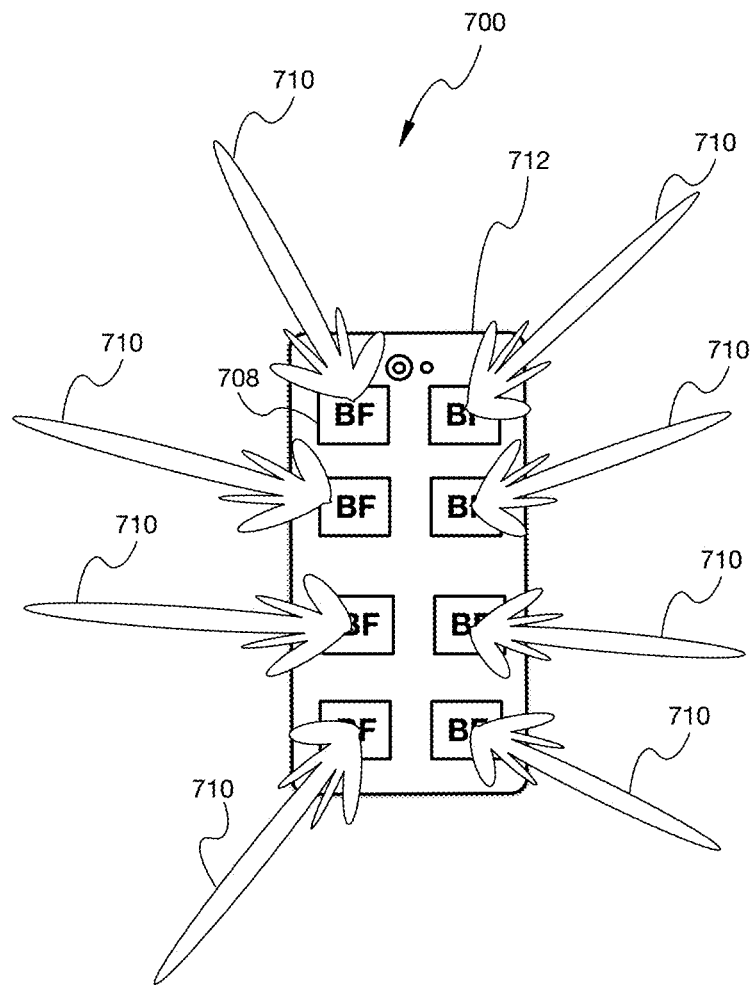
FIG. 7 illustrates a diagram of a user equipment device with multiple radiation beams, in accordance with an embodiment.

FIG. 7 illustrates a diagram of a user equipment device 700 with multiple radiation beams, in accordance with an embodiment. User equipment device 700 comprises of one or more BF modules 708 in a rear housing 712. Each BF module 708 may radiate one or more beams 710 which contain wireless signals for wireless communications and may comprise of a main lob and a plurality of side lobes.

It may be appreciated by a person with ordinary skill in the art that one or more BF modules 708 may shape, attenuate, and/or direct one or more beams 710. In one embodiment, a plurality of BF modules 708 may collectively form a single, comparatively powerful beam. In another embodiment, a plurality of BF modules 708 may form a plurality of beams 710 in a designated direction with respect to the user equipment device 700.

It may be appreciated by a person with ordinary skill in the art that one or more beams 710 may represent one or more carrier frequencies and/or one or more data streams. In one embodiment, a plurality of beams 710 may each represent a different frequency to enable user equipment device 700 to cover a large frequency range. In another embodiment, a plurality of beams 710 may each carry a different data stream in order to maximize the wireless bandwidth of user equipment 700.

It may be appreciated by a person with ordinary skill in the art that the rear housing 712 may house any components and/or peripherals. Components and/or peripherals may include, but not limited to, one or more cameras, one or more LEDs, screw mounts, antennas, and/or electrical modules. In one embodiment, rear housing 712 may house a camera, an LED light, and any supporting hardware for an embodiment of a user equipment device 700.

Figure 8:
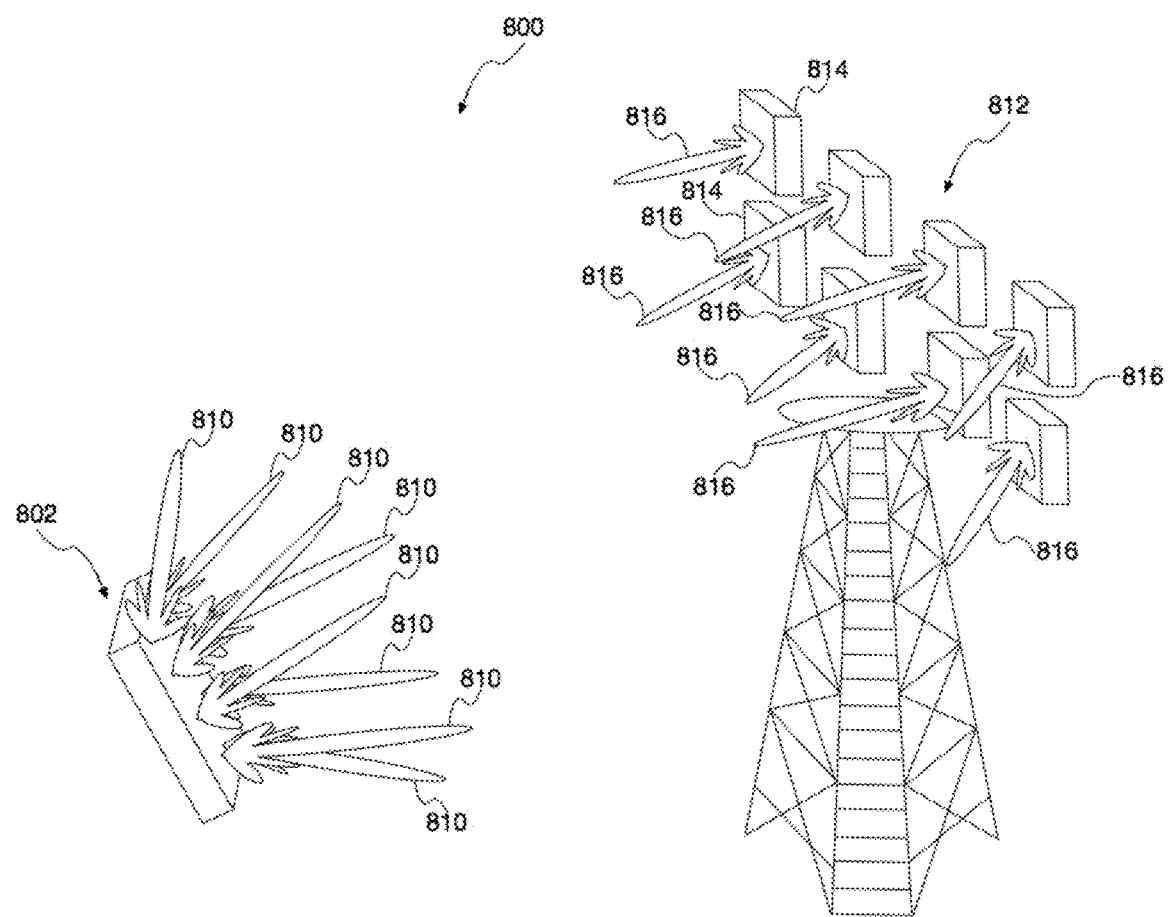
FIG. 8 illustrates a distributed phase array multiple-input-multiple-output wireless network, in accordance with an embodiment.

FIG. 8 illustrates a DPA-MIMO wireless network 800, in accordance with an embodiment. DPA-MIMO wireless network 800 comprises of a user equipment device 802 and a base station 812. The user equipment device 802 may further comprise of one or more wireless beams 810. The base station 812 may further comprise of one or more base station units 814 which generate one or more base station beams 816.

During typical operation, base station 812 may steer one or more base station beams 816 to user equipment device 802. The base station beams 816 may align with one or more wireless beams 810 from user equipment device 802 to create a high-performance communication line between the user equipment device 802 and the base station 812.

It may be appreciated by a person with ordinary skill in the art that one or more base station units 814 may shape, attenuate, and/or direct one or more base station beams 816. In one embodiment, a plurality of base station units 814 may collectively form a single, comparatively powerful beam. In another embodiment, a plurality of base station units 814 may form a plurality of base station beams 816 in a designated direction to create signal redundancy in the designated direction.

It may be appreciated by a person with ordinary skill in the art that one or more beams 810 and one or more base station beams 816 may represent one or more carrier frequencies and/or one or more data streams. In one embodiment, a plurality of beams 810 may each represent a different frequency to enable user equipment device 802 to cover a large frequency range. In another embodiment, a plurality of base station beams 816 may each carry a different data stream to maximize the wireless bandwidth of DPA-MIMO wireless network 800.

It may be appreciated by a person with ordinary skill in the art that there may be a plurality of user equipment device 802 and/or base station 812 in DPA-MIMO wireless network 800. In one embodiment, a base station 812 may have each one of a plurality of base station units 814 establish a high-performance communication link with a single user equipment device 802. In another embodiment, a plurality of base stations 812 may establish high-performance links with a single user equipment device 802 to enable signal redundancy.

It may be appreciated by a person with ordinary skill in the art that a high-performance link may be determined by one or more metrics. Metrics to determine performance in a wireless link include, but not limited to, signal strength, available bandwidth, and/or transmission speed.

Figure 9:
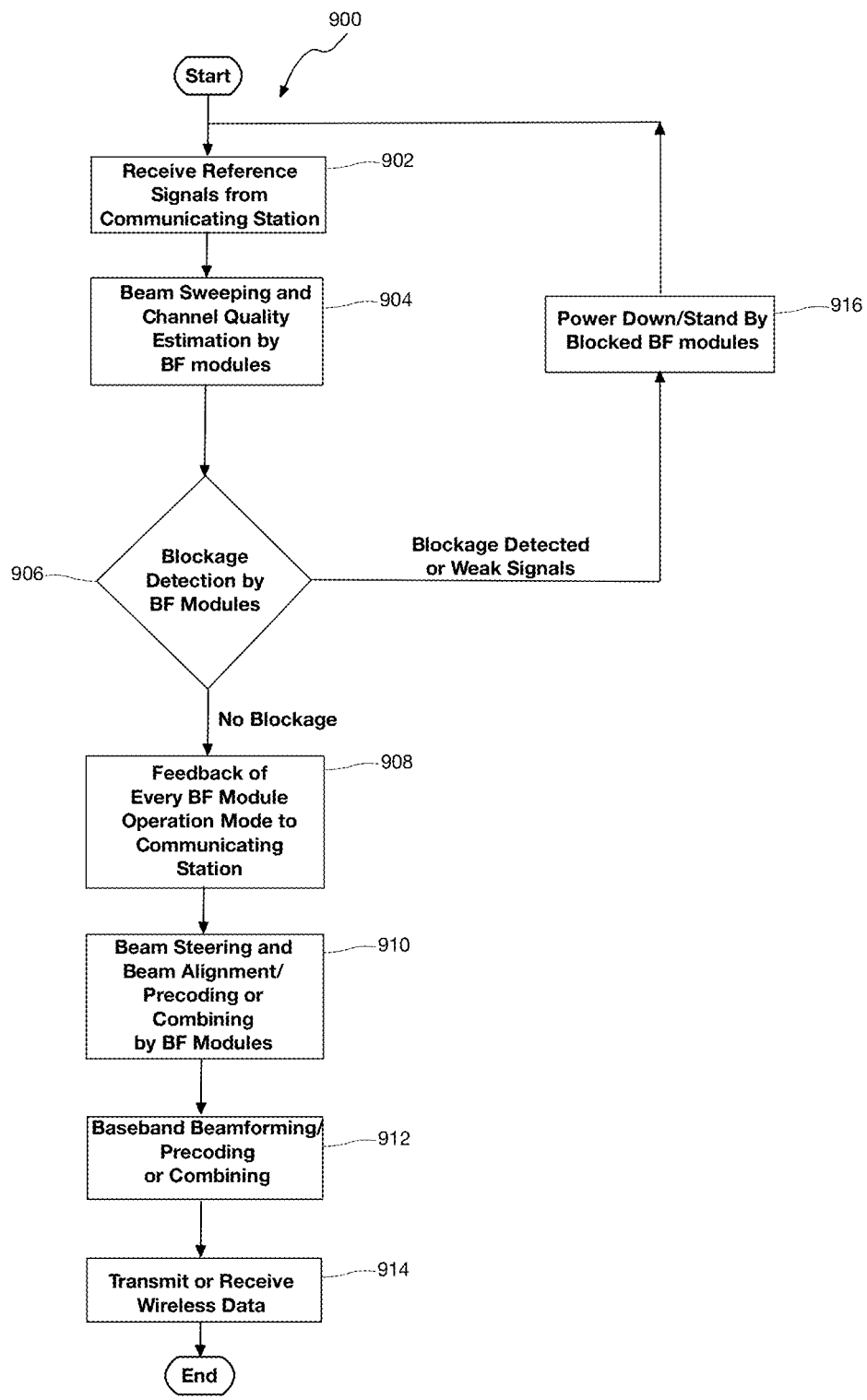
FIG. 9 is a flow chart illustrating an exemplary process for distributed phased array multiple-input-multiple-out wireless communication, in accordance with an embodiment.

FIG. 9 is a flow chart illustrating an exemplary process for DPA-MIMO wireless communication 900, in accordance with an embodiment. DPA-MIMO wireless communication process 900 comprises of a receive reference signal step 902, a beam sweeping step 904, a blockage detection step 906, a feedback step 908, a beam steering and combining step 910, a baseband beaming step 912, a transmit or receive step 914, and a power down step 916.

Referring now to both FIG. 9 and FIG. 2, DPA-MIMO wireless communication process 900 begins with the receive reference signal step 902. A DPA-MIMO wireless communication system 200 receives one or more reference signals on one or more BF modules 208 from a communicating station outside DPA-MIMO wireless communication system 200. The one or more reference signals from an outside transmitter may be any type of signal such as, but not limited to, a short pulse, an encoded data stream, and/or a wireless beam exceeding a certain power threshold.

A beam sweeping step 904 may be performed by one or more BF modules 208 wherein beam sweeping and channel estimation are performed. A blockage detection step 906 may be performed by a processing unit such as, but not limited to, a baseband processing unit 202. The blockage detection step 906 checks for whether a BF module 208 is blocked.

If a blockage is detected in the blockage detection step 906, a power down step 916 is performed by a BF module 208. In the power down step 916, one or more BF modules 208 may power down and/or enter a stand by state. BF modules 208 may remain in a powered down and/or stand by state until a time interval has passed and DPA-MIMO wireless communication process 900 re-enters a receive reference signal step 902.

If a blockage is not detected in the blockage detection step 906 by at least one or more BF modules 208, a feedback step 908 may be initiated from baseband processing unit 202 and transmitted by one or more unblocked BF modules 208. Information such as, but not limited to, operation mode and channel condition of every BF module 208, temperature, and/or bandwidth usage may be sent back to a transmitter within DPA-MIMO wireless communication system 200.

BF modules may perform a beam steering and beam alignment step 910, in other words precoding for transmission and combining for reception. In beam steering and combining step 910, beam steering and beam alignment will be performed to optimize DPA-MIMO wireless communication system 200 metrics such as, but not limited to, signal strength, power usage, and/or transmission data rate.

The baseband beaming step 912 may be performed by a baseband processing unit 202. Baseband beaming step 912 may pre-code or combine signals within DPA-MIMO wireless communication system 200 depending whether DPA-MIMO wireless communication system 200 transmitting or receiving data. The transmit or receive step 914 may be performed by one or more BF modules 208 and transmits or receives wireless signals according to a transmission mode.

It may be appreciated by a person with ordinary skill in the art that one or more steps in the DPA-MIMO wireless communication process 900 may be added, removed, or rearranged. In another embodiment, DPA-MIMO wireless communication process 900 may omit step the feedback step 908 to reduce latency in DPA-MIMO wireless communication system 200. In still another embodiment, the order of beam sweeping step 904 and blockage detection step 906 in DPA-MIMO wireless communication process 900 may occur in any order. In still another embodiment, additional steps such as, but not limited to, data encryption and/or signal multiplexing may be added to the DPA-MIMO wireless communication process 900.

It may be appreciated by a person with ordinary skill in the art that one or more steps in the DPA-MIMO wireless communication process 900 may be performed by one or more DPA-MIMO wireless communication system 200 modules, one or more electrical circuits, and/or one or more devices. The one or more of the steps of DPA-MIMO wireless communication process 900 may be performed by devices such as, but not limited to, one or more user electronic devices, a computer network, and/or one or more DPA-MIMO wireless communication systems 200. In another embodiment, the steps of DPA-MIMO wireless communication process 900 may be performed by a networked computing device over a wireless local area network (WLAN).

Figure 10:
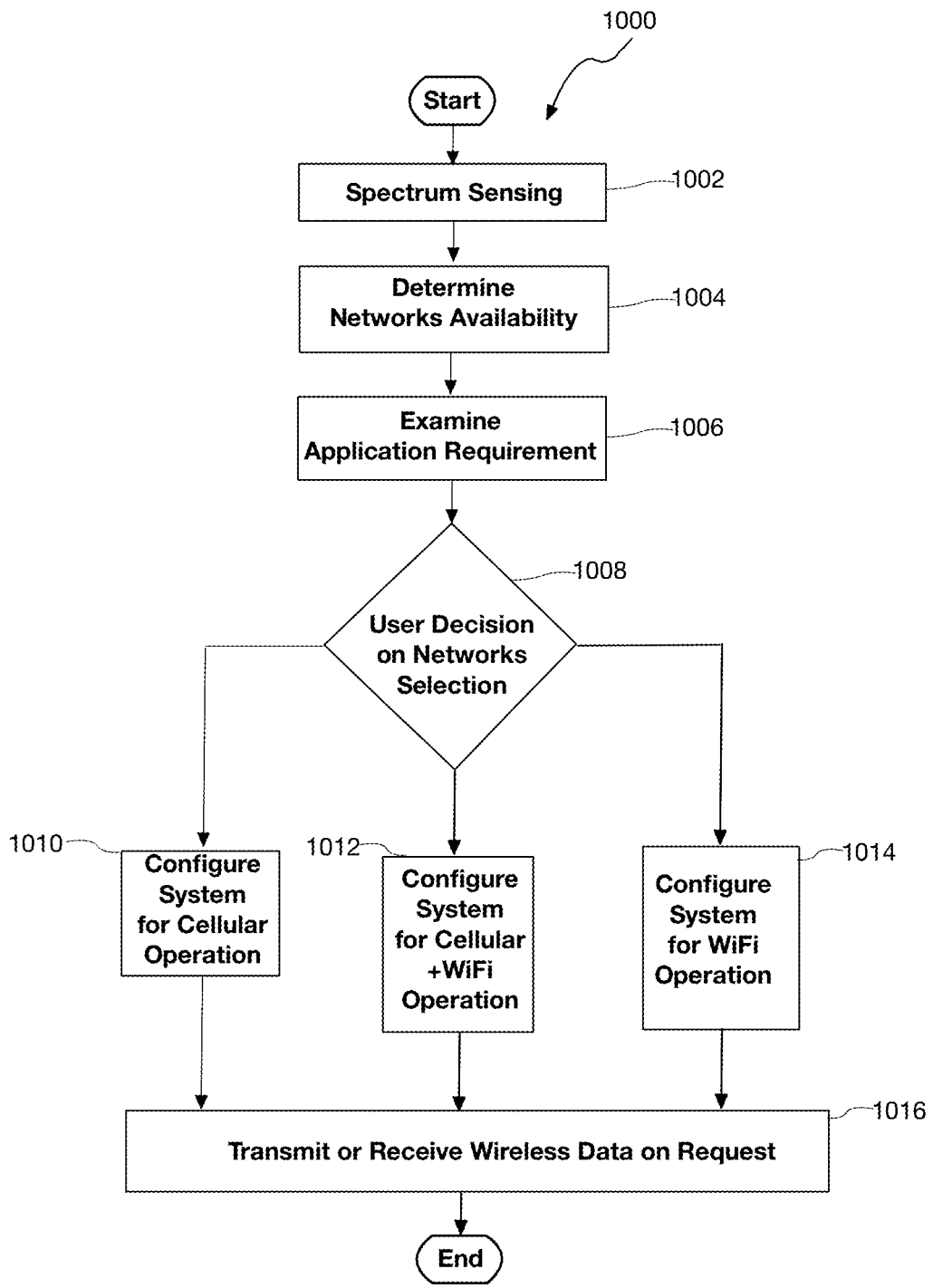
FIG. 10 is a flow chart illustrating an exemplary process for multiplexed distributed phased array multiple-input-multiple-out wireless communication, in accordance with an embodiment.

FIG. 10 is a flow chart illustrating an exemplary process for multiplexed distributed phased array multiple-input-multiple-out (DPA-MIMO) wireless communication 1000, in accordance with an embodiment. A multiplexed DPA-MIMO wireless communication process 1000 comprises of a spectrum sensing step 1002, a determine network availability step 1004, an examine application requirement step 1006, a network selection step 1008, a configure cellular operation step 1010, a configure cellular and WiFi operation step 1012, a configure WiFi operation step 1014, and a transmit or receive step 1016.

Referring now to both FIG. 10 and FIG. 6, multiplexed DPA-MIMO wireless communication process 1000 begins at the spectrum sensing step 1002. One or more BF modules 608 may perform spectrum sensing to determine available frequencies and/or traffic for wireless communication.

One or more BF modules and/or a processing module may perform the determine networks availability step 1004. Network availability may be determined through passive means such as, but not limited to, sensor readings, traffic on a frequency, and/or noise on a frequency. Network availability may also be determined through active means such as, but not limited to, a message exchange between multiplexed DPA-MIMO wireless communication system 600 and a transmitter, a broadcast message from a transmitter, and/or a user input on a user equipment.

Examine application requirement step 1006 may be performed by a processing unit such as, but not limited to, a baseband processing unit 602. Examine application requirement step 1006 evaluates an application's requirements to determine a network to use. Metrics to determine a suitable network include, but are not limited to, data rates, latency, and/or user input.

At network selection step 1008, a processing unit such as, but not limited to, a baseband processing unit 602, may determine one or more networks to use based on any information from the examine application requirement step 1006. A configure cellular operation step 1010, a configure cellular and WiFi operation step 1012, or a configure WiFi operation step 1014 may be performed based on the determination of which network must be used. Network determination may also be determined by factors such as, but not limited to, incoming wireless signals to a user device, traffic on a network, and/or a transmitter's network. It may be appreciated by a person with ordinary skill in the art that any type of wireless network may be supported. Wireless networks may be, but not limited to, Bluetooth, WiFi, NFC, and/or cellular.

In the configure cellular operation step 1010, the configure cellular and WiFi operation step 1012, and the configure WiFi operation step 1014, a network is determined in the network selection step 1008. A standalone cellular network, a cellular network and WiFi network, and a standalone WiFi network are the possible choices for a configure cellular operation step 1010, a configure cellular and WiFi operation step 1012, a configure WiFi operation step 1014 respectively. Multiplexed DPA-MIMO wireless communication system 600 configures itself for cellular network communication with switching and/or processing and initializing hardware and software such as, but not limited to, one or more cellular-WiFi switches 682, one or more cellular sub-6 GHz front ends 686, one or more time controlled switches 660, and/or a MAC block 680. In accordance with the present embodiment, multiplexed DPA-MIMO wireless communication system 600 may control WiFi and cellular operations by multiplexing shared hardware resources such as, but not limited to, one or more cables 606 and/or one or more BF modules 608.

The transmit and/or receive step 1016 may be performed by any transmission hardware such as, but not limited to, one or more BF modules 608, one or more IF radio modules 604, one or more WiFi radios 684 and transmits or receives wireless signals according to a transmission mode based on the operation state of multiplexed DPA-MIMO wireless communication system 600.

It may be appreciated by a person with ordinary skill in the art that multiplexed DPA-MIMO wireless communication process 1000 is not limited to a cellular and WiFi combination. Multiplexed DPA-MIMO wireless communication process 1000 may be any combination of two or more wireless communication technologies. In one embodiment, multiplexed DPA-MIMO wireless communication process 1000 may be configured for Bluetooth, NFC, and amateur radio wireless communications. In another embodiment, a configure cellular operation step 1010, a configure cellular and WiFi operation step 1012, and a configure WiFi operation step 1014 may each individually configure multiplexed DPA-MIMO wireless communication system 600 for one or more wireless communication protocols.

It may be appreciated by a person with ordinary skill in the art that one or more steps in the multiplexed DPA-MIMO wireless communication process 1000 may be added, removed, or rearranged. In another embodiment, multiplexed DPA-MIMO wireless communication process 1000 may omit step the spectrum sensing step 1002 to reduce latency in multiplexed DPA-MIMO wireless communication system 600. In still another embodiment, the determine network availability step 1004 and the examine application requirement step 1006 in the multiplexed DPA-MIMO wireless communication process 1000 may occur in any order. In still another embodiment, additional steps such as, but not limited to, data encryption and/or signal multiplexing may be added to the multiplexed DPA-MIMO wireless communication process 1000.

It may be appreciated by a person with ordinary skill in the art that one or more steps in the multiplexed DPA-MIMO wireless communication process 1000 may be performed by one or more multiplexed DPA-MIMO wireless communication system 600 modules, one or more electrical circuits, and/or one or more devices. The one or more of the steps of the multiplexed DPA-MIMO wireless communication process 1000 may be performed by devices such as, but not limited to, one or more user electronic devices, a computer network, and/or one or more multiplexed DPA-MIMO wireless communication systems 600. In another embodiment, the steps of the multiplexed DPA-MIMO wireless communication process 1000 may be performed by a networked computing device over a wireless local area network (WLAN).

Those skilled in the art will readily recognize, in light of and in accordance with the teachings of the present disclosure, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the disclosure may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present disclosure, other equivalent or alternative methods of implementing distributed phased arrays based multiple-input-multiple-output (DPA-MIMO) in hardware designs according to the present disclosure will be apparent to those skilled in the art. Various aspects of the disclosure have been described above by way of illustration, and the specific embodiments disclosed are not intended to limit the disclosure to the particular forms disclosed. The particular implementation of the DPA-MIMO in hardware designs may vary depending upon the particular context or application. By way of example, and not limitation, the DPA-MIMO in hardware designs described in the foregoing were principally directed to consumer electronics implementations; however, similar techniques may instead be applied to the Internet of Things applications such as vehicle to vehicle or sensor to sensor communications, which implementations of the present disclosure are contemplated as within the scope of the present disclosure. The disclosure is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Figure 11:
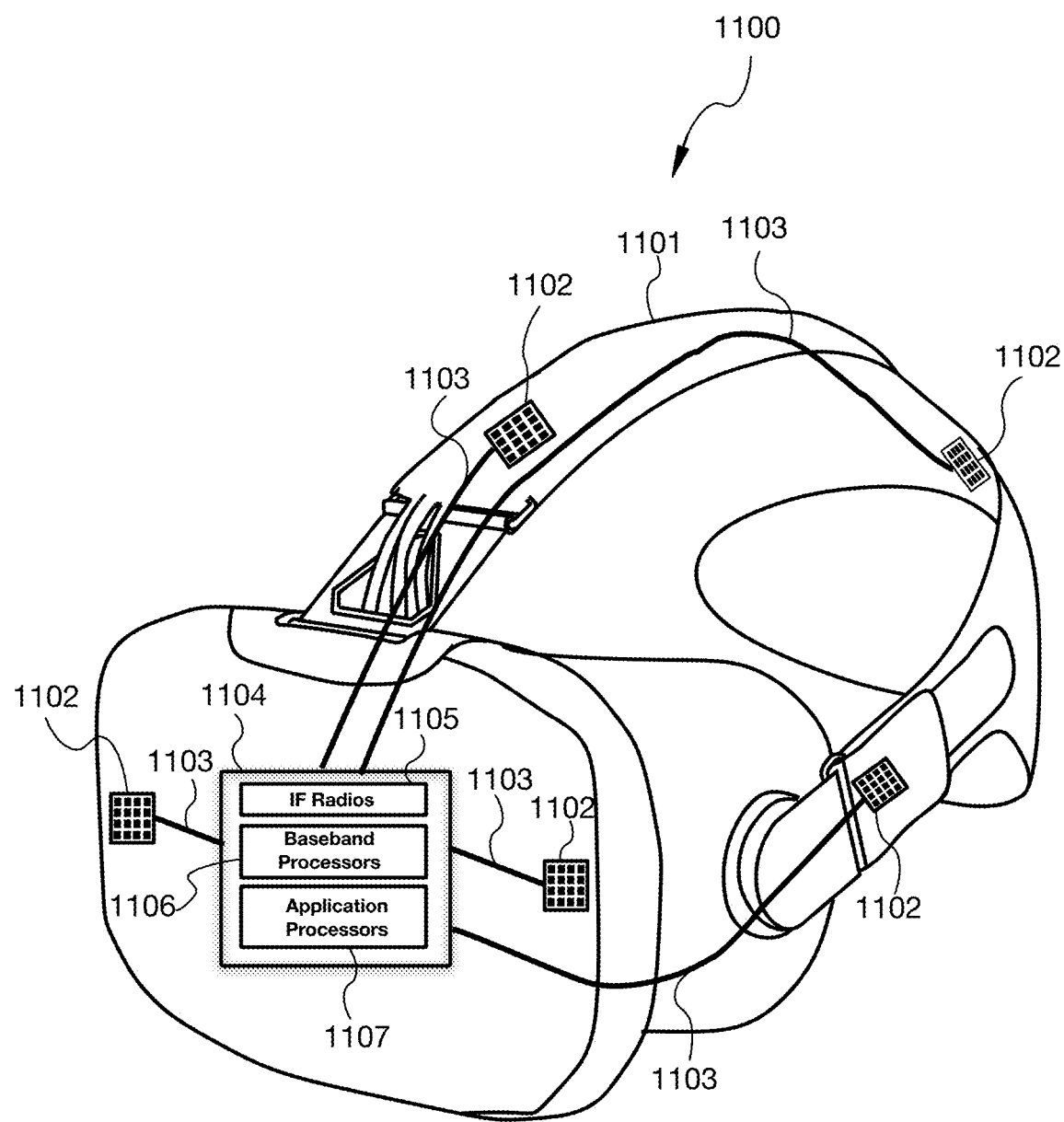
FIG. 11 illustrates a detailed perspective of an exemplary DPA-MIMO system based wearable virtual reality device, in accordance with an embodiment.

FIG. 11 illustrates a top level system diagram of a distributed phased arrays multiple-input-multiple-output (DPA-MIMO) wireless communication system based wearable virtual reality device, in accordance with an embodiment. A DPA-MIMO system based wearable virtual reality device 1100 comprises of a virtual reality device headset 1101, one or more beamforming (BF) modules 1102, one or more cables 1103, one or more main logic boards 1104, one or more intermediate frequency (IF) radios 1105, one or more baseband processors 1106, one or more application processors 1107. Application processors 1107 may handle all baseband signals from baseband processors 1106. Baseband processors 1106 may handle all IF signals for all IF radios 1105. Electronic signals and/or power may travel from one or more main logic boards 1104 through one or more cables 1103 to one or more BF modules 1102. BF module 1102 may be configured to receive and/or transmit wireless data. One or more BF modules 1102 may be placed on/in the device in a distributed way.

During a typical receive operation, henceforth also known as a downlink path, BF module 1102 receives wireless signals and downconverts the wireless signals to an intermediate frequency (IF) range. One or more BF modules 1102 may form wireless receiving beams independently or jointly pointing to any directions with any beamwidths that are amenable to reception in a given propagation environment. The wireless signals in the IF range are sent through one or more cables 1103 to one or more main logic boards 1104. At IF radios 1105, IF range wireless signals are further downconverted in the frequency domain and sent to baseband processors 1106 for processing. At application processors 1107, baseband signals are further processed for application purposes.

During a typical transmit operation, henceforth also known as an uplink path, baseband processors 1106 process application-layer signals from application processors 1107 and generate baseband data carrying information for communication and send the baseband signals to one or more IF radios 1105. IF radios 1105 upconvert the baseband signals to one or more intermediate frequencies which are sent through one or more cables 1103 to one or more BF modules 1102. BF modules 1102 upconvert any received IF signals to one or more predetermined transmission frequencies. One or more BF modules 1102 further form one or more wireless transmission beams independently or jointly pointing to any directions with any beamwidths that are amenable to transmission in a given propagation environment and sends wireless signals at transmission frequencies.

One or more BF modules 1102 may be placed in or on any wearable device. In one embodiment, a virtual reality device 1100 comprises of one or more BF modules 1102 positioned in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment, a plurality of BF modules 1102 are placed such that a necessary edge-to-edge spacing of more than 1.5 times a free space wavelength is maintained. A placement for BF modules 1102 may be determined according to any application requirements such as, but not limited to, physical requirements, heat dissipation, user experience, maximum weight specification, power consumption, and/or spatial multiplexing gain.

Multiple BF modules 1102 are placed all over the virtual reality device headset 1101 in a distributed manner and facing various directions in the space to send and/or receive signals from various angles of arrival. In one embodiment of the invention, one or more BF modules 1102 may be concentrated on the upper side of the wearable device to transmit and receive signals away from the user's body. In yet another embodiment of the invention, signal attenuation may be achieved by increasing or decreasing the distance and/or angle between one or more BF modules 1102. It may be appreciated by a person with ordinary skill in the art that a sub-optimal signal attenuation placement involving distance and/or angle between one or more BF modules 1102 may be implemented in a wearable device such as, but not limited to, virtual reality device headset 1101 in order to accommodate physical and/or design limitations.

Certain areas of a housing placement and a number of BF modules 1102 may be optimized for thermal considerations. In one embodiment of the invention, a virtual reality device headset 1101, the user's forehead and temple area may demonstrate a higher surface temperature. It may be appreciated by a person with ordinary skill in the art to position BF modules 1102 away from temperature sensitive areas of virtual reality device 1101 and/or a user. One or more BF modules 1102 may be placed in locations on or around virtual reality device headset 1101, in order to avoid a concentration of heat and/or other thermal management components such as, but not limited to, heat sinks, thermal compounds, silicon grease. It may be appreciated by a person with ordinary skill in the art that the placement and the number of a plural of BF modules may depend on the radiation pattern of the phased arrays of the BF modules 1102. In one embodiment, the BF modules 1102 are placed in a way that the differences in spatial angles among the boresights of the main lobes in a radiation pattern of BF modules 1102 are maximized.

One or more BF modules 1102 may be placed according to a radiation pattern of phased arrays of one or more BF modules 1102. A direction of a maximum radiation pattern of a phased array is indicated by a boresight, which may be represented by a vector in 3-D space. One or more BF modules 1102 may also be placed with the consideration of a most likely spatial direction that a signal may arrive from. In one embodiment of the invention, one or more BF modules 1102 are placed to cover as much 3-D space as possible based on the boresights of one or more BF modules 1102. In another embodiment of the invention, one or more BF modules 1102 are placed based on covering a weighted 3-D space where the weights are determined by a probability a signal may arrive from any given direction.

Components of virtual reality device 1100 may be distributed to maintain a certain radio frequency (RF) electromagnetic field (EMF) exposure from user equipment in order to comply with the relevant RF EMF exposure limits. In one embodiment of the invention, the number, designed dimensions, and/or placement of one or more BF modules 1102 is determined by a design metric such as, but not limited to, a maximum permissible transmitted power (MPTP), a maximum equivalent isotropically radiated power (EIRP), a total radiated power (TRP) and/or a maximum permissible exposure (MPE) limit for incident power density.

Multiple BF modules 1102 are placed in a distributed manner and managed by the DPA-MIMO wireless system that they work within a certain frequency band. In one embodiment of the invention, the BF modules are placed in a way that the differences in spatial angles among the boresights of the main lobes are maximized. As a result, the harmonic products among different BF modules are minimized. In another embodiment, the DPA-MIMO system based wearable virtual reality device 1100 receives and senses the power of one or more harmonic frequencies above a set threshold, and then deactivates one or more BF modules 1102, or lowers the output power of one or more BF modules 1102, or increases the receiving attenuation of one or more BF modules 1102, or increases the filtering functions of one or more BF modules 1102.

Components of virtual reality device 1100 may be distributed to maintain a certain channel capacity and data stream speed from user equipment. In one embodiment of the invention, one BF module 1102 supports at least one data stream for both transmission and reception.

Components of virtual reality device 1100 may be distributed to maintain a certain of weight and/or distribution of mass. In one embodiment of the invention, the number, designed dimensions, and/or placement of one or more BF modules 1102 is determined by a design metric such as, but not limited to, a maximum weight, a desired center of mass, and/or an even distribution of mass.

Tracking of a transmission source may be achieved by sending performance metrics from one or more BF modules 1102 to one or more main logic boards 1104. Performance metrics may be, but not limited to, signal strength, signal latency, and/or signal quality. A log of performance metrics and/or an instantaneous measurement of performance metrics, in addition to known locations of one or more BF modules 1102 on a device such as, but not limited to, virtual reality device 1100 may be used to device the location and/or directionality of a transmission source. In one embodiment of the invention, a latency in a received signal of one or more BF modules 1102 compared to a previously recorded latency in the same received signal may be used to derive a distance the transmission source has moved. In another embodiment of the invention, one or more differences in signal quality and/or signal strength from one or more BF modules 1102 may be compared to determine the directionality of a transmission source and any subsequent movement.

One or more BF modules 1102 may be controlled by one or more main logic boards 1104 in response to a wearable device's physical environment and/or power requirements. Heat dissipation and/or power consumption may be controlled by one or more main logic boards 1104 activating, deactivating, and/or switching performance states of one or more BF modules 1102. Performance states may be, but not limited to, a low power state, a sleep state, a high-performance state, and/or a standby state. Signal quality may be controlled by activating, deactivating, switching to a low power state, or switching to a performance state one or more BF modules 1102.

One or more IF radios 1105 may be connected to one or more BF modules 1102 through one or more cables 1103. BF modules 1102 may exchange IF signals with a plurality of IF radios 1105, which may be performed during instances when, but not limited to, some of the BF modules are powered down or stand by.

It may be appreciated by a person with ordinary skill in the art that baseband processors 1106 include a processor that may perform any type of process and/or algorithm on electronic signals. Processes and/or algorithms include, but are not limited to, digital beamforming techniques that process one or more signals from the one or more BF modules 1102 independently or jointly. Digital beamforming may implement functions such as, but not limited to, removing interferences and/or enhancing a signal-to-noise ratio of the one or more processed signals and/or signals between antenna elements within one BF module 1102. Baseband processors 1106 may also perform baseband processing for other wireless protocols and/or standards.

It may be appreciated by a person with ordinary skill in the art that one or more cables 1103 may be any type of medium capable of sending signals and/or power. Cables 1103 may be, but not limited to, fiber optic cables, coaxial cables, IPEX/IPX cables, and/or ethernet cables with the any necessary coupling apparent by a person with ordinary skill in the art. In one embodiment, cables 1103 may be fiber optic cables carrying signals and/or power at various optical wavelengths.

It may be appreciated by a person with ordinary skill in the art that one or more cables 1103 may carry signals at one or more frequencies for each cable 1103. In one embodiment a single cable 1103 may carry multiple signals at a plurality of frequencies.

It may be appreciated by a person with ordinary skill in the art that a BF module 1102 may include any type of beamforming antenna in any orientation. BF module 1102 antennas may include, but not limited to, phased array antennas, steerable antennas, and/or reconfigurable antennas. In one embodiment, a plurality of phased array antennas are orientated in a circular formation. In another embodiment, a plurality of phased array antennas are orientated in a stacked up three-dimensional formation.

It may be appreciated by a person with ordinary skill in the art that a BF module 1102 may operate at any frequency range. Frequency ranges may be, but not limited to, from 1 GHz to 10 THz, to handle various wireless technologies and standards which may include, but not limited to, cellular communications, wireless local area network (WLAN) communications, global navigation satellite system (GNSS) communications, millimeter wave (mmWave) communications, satellite communications, terahertz (THz) communications, visible-light communications, near field communications (NFC) and/or other wireless communications. In one embodiment, a plurality of BF modules 1102 may cover a plurality of standard wireless communications frequencies such that a DPA-MIMO system based virtual reality device 1100 may function at a plurality of wireless communication protocols.

It may be appreciated by a person with ordinary skill in the art that any signal and/or power may be sent between one or more elements of DPA-MIMO system based virtual reality wearable device 1100. Signals and/or power sent between one or more elements may include, but not limited to, direct current (DC) power, control signals, reference signals, and/or feedback signals. In one embodiment, an IF radio 1105 may provide DC power to one or more BF modules 1102 through one or more cables 1103. In another embodiment, one or more IF radios 1105 may send control and reference signals through one or more cables 1103 to one or more BF modules 1102. BF modules 1102 may send feedback signals back to IF radios 1105 through cables 1103.

It may be appreciated by a person with ordinary skill in the art that one or more elements of the DPA-MIMO system based virtual reality wearable device 1100 may be combined into a single functional group or separated into a plurality of functional groups. In one embodiment, a plurality of sets each comprising of an IF radio 1105, a cable 1103, and a BF module 1102 may work individual functions such as, but not limited to, communications at a specific frequency, communications in a specific data stream, transmitting signals, and/or receiving signals. In another embodiment, a plurality of sets comprising of one or more IF radios 1105, cables 1103, and BF modules 1102 may work a single function such as, but not limited to, communications at a specific frequency, communications in a specific data stream, transmitting signals, and/or receiving signals.

It may be appreciated by a person with ordinary skill in the art that one or more BF modules 1102 may cover a wide frequency range. A frequency range covered by one or more BF modules 1102 may include, but not limited to, WiFi bands above 6 GHz, wireless gigabit (WiGig) bands from 57-71 GHz, and/or frequencies used by other wireless standards, licensed and unlicensed spectrum frequencies.

It may be appreciated by a person with ordinary skill in the art that virtual reality wearable device headset 1101 includes one or more processors that may perform any type of process and/or algorithm on electronic signals. Processes and/or algorithms include, but are not limited to, digital beamforming techniques that process one or more signals from the one or more BF modules 1102 independently or jointly. BF modules 1102 may also perform functions such as, but not limited to, removing interferences and/or enhancing a single to noise ratio of the one or more processed signals and/or signals between antenna elements within one BF module 1102.

It may be appreciated by a person with ordinary skill in the art that a DPA-MIMO system based virtual reality wearable device 1100 may be for any wireless communication standard. Wireless communication standards include, but not limited to, the $2^{nd}$ Generation cellular system (2G), the $3^{rd}$ Generation cellular system (3G), the $4^{th}$ Generation cellular system (4G), the $5^{th}$ Generation cellular system (5G), WLAN, Bluetooth, and/or other wireless standards. In one embodiment, a DPA-MIMO system based wearable virtual reality device 1100 may function at Bluetooth, NFC, and 3G/4G/5G wireless standards.

Figure 12:
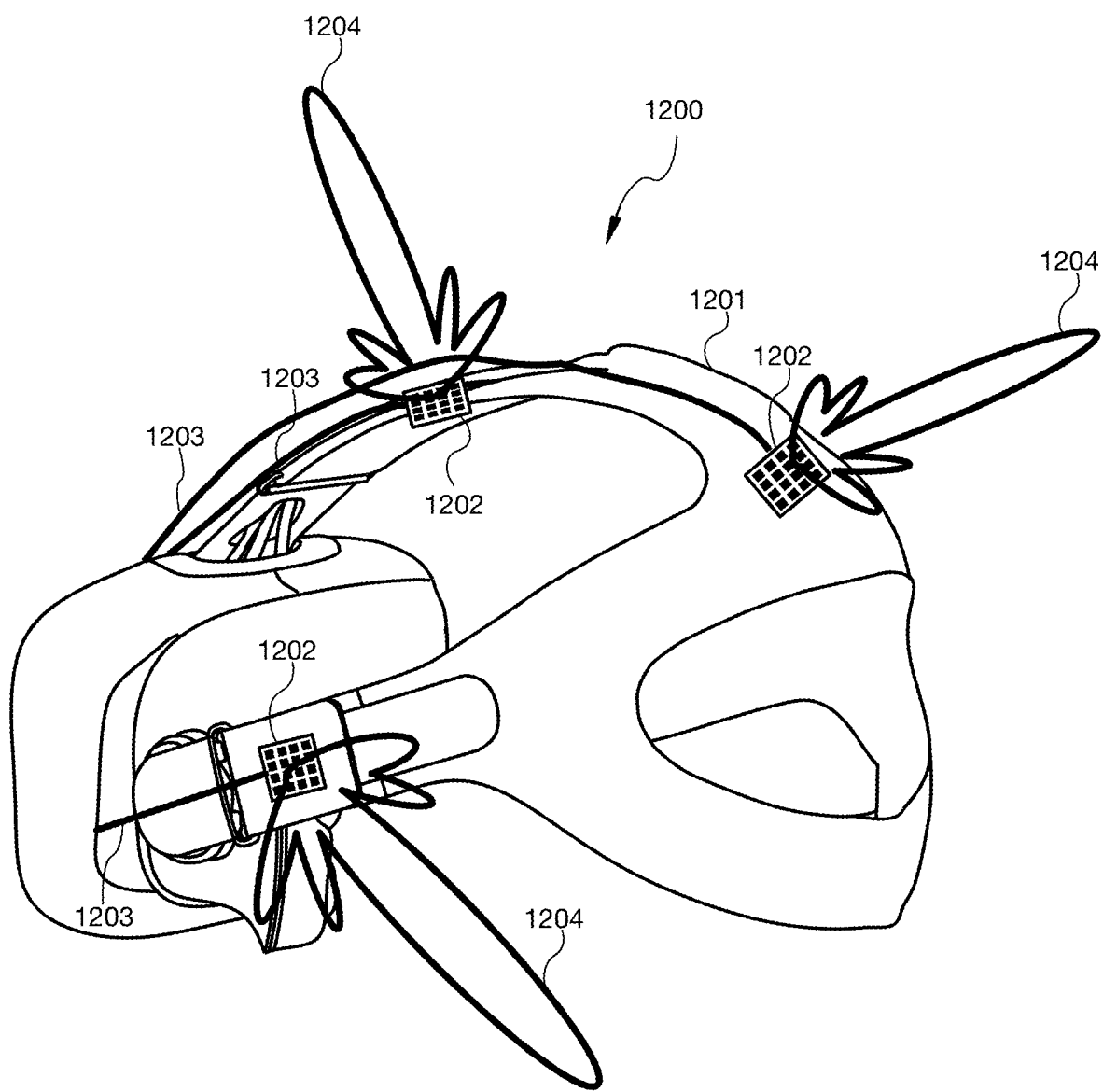
FIG. 12 illustrates another detailed perspective of an exemplary DPA-MIMO system based wearable virtual reality device with multiple radiation beams, in accordance with an embodiment.

FIG. 12 illustrates another detailed perspective of an exemplary DPA-MIMO system based virtual reality device 1200, in accordance with an embodiment. A DPA-MIMO system based virtual reality device 1200 comprises of a virtual reality device headset 1201, one or more BF modules 1202, one or more cables 1203, and one or more radiation beams 1204.

One or more BF modules 1202 may be placed in or on any wearable device. In one embodiment, a virtual reality device 1200 comprises of one or more BF modules 1202 positioned in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment, a plurality of BF modules 1202 are placed such that a necessary edge-to-edge spacing of more than 1.5 times a free space wavelength is maintained. A placement for BF modules 1202 may be determined according to any application requirements such as, but not limited to, physical requirements, heat dissipation, user experience, maximum weight specification, power consumption, and/or spatial multiplexing gain.

It may be appreciated by a person with ordinary skill in the art that virtual reality device headset 1201 includes one or more processors that may perform any type of process and/or algorithm on electronic signals. Processes and/or algorithms include, but are not limited to, digital beamforming techniques that process one or more signals from the one or more BF modules 1202 independently or jointly. BF modules 1202 may also perform functions such as, but not limited to, removing interferences and/or enhancing a signal to noise ratio of the one or more processed signals and/or signals between antenna elements within one BF module 1202.

It may be appreciated by a person with ordinary skill in the art that a BF module 1202 may operate at any frequency range. Frequency ranges may be, but not limited to, from 1 GHz to 10 THz, to handle various wireless technologies and standards which may include, but not limited to, cellular communications, WLAN communications, GNSS communications, mmWave communications, satellite communications, THz communications, visible-light communications, NFC and/or other wireless communications. In one embodiment, a plurality of BF modules 1202 may cover a plurality of standard wireless communications frequencies such that a DPA-MIMO wireless communications system based virtual reality device 1200 may function at a plurality of wireless communication protocols.

It may be appreciated by a person with ordinary skill in the art that a DPA-MIMO system based virtual reality device 1200 may be for any wireless communication standard. Wireless communication standards include, but not limited to, the $2^{nd}$ Generation cellular system (2G), the $3^{rd}$ Generation cellular system (3G), the $4^{th}$ Generation cellular system (4G), the $5^{th}$ Generation cellular system (5G), WLAN, Bluetooth, and/or other wireless standards. In one embodiment, 1200 may function at Bluetooth, NFC, and 3G/4G/5G wireless standards.

It may be appreciated by a person with ordinary skill in the art that a virtual reality device headset 1201 may be any device capable of interfacing with a user. Virtual reality device headset 1201 may include, but not limited to, wearable smart glasses, brain-machine interface devices, implantable devices, and/or personal computing devices. In one embodiment, virtual reality device headset 1201 may be a wearable display with an implanted control device.

Figure 13:
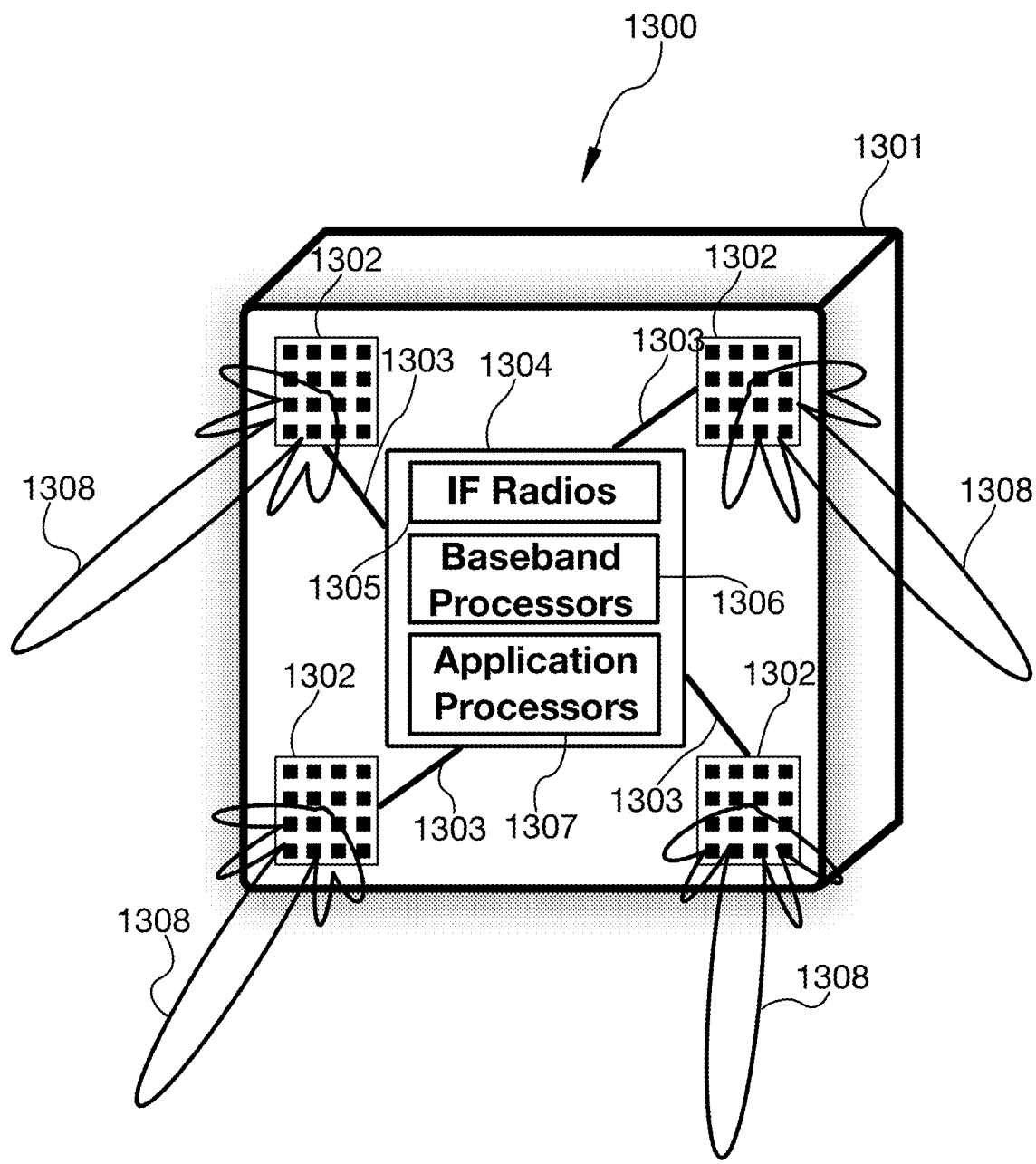
FIG. 13 illustrates a detailed perspective of an exemplary DPA-MIMO system based virtual reality base station device with multiple radiation beams, in accordance with an embodiment.

FIG. 13 illustrates a detailed perspective of an exemplary DPA-MIMO system based virtual reality base station device with multiple radiation beams in accordance with an embodiment. A DPA-MIMO wireless communication base station 1300 comprises of a base station 1301, one or more BF modules 1302, one or more cables 1303, one or more main logic boards 1304, one or more intermediate frequency (IF) radios 1305, one or more baseband processors 1306, one or more application processors 1307, and one or more radiation beams 1308. Application processors 1307 may handle all baseband signals from baseband processors 1306. Baseband processors 1306 may handle all baseband signals for all IF radios 1305. Electronic signals and/or power may travel from one or more main logic boards 1304 through one or more cables 1303 to one or more BF modules 1302. BF module 1302 may be configured to receive and/or transmit wireless data. One or more BF modules 1302 may be placed on/in the device in a distributed way.

During a typical receive operation, henceforth also known as a downlink path, BF module 1302 receives wireless signals and downconverts the wireless signals to an intermediate frequency (IF) range. One or more BF modules 1302 may form wireless receiving beams independently or jointly pointing to any directions with any beamwidths that are amenable to reception in a given propagation environment. The wireless signals in the IF range are sent through one or more cables 1303 to one or more main logic boards 1304. At IF radios 1305, IF range wireless signals are further downconverted in the frequency domain and sent to baseband processors 1306 for processing. At application processors 1307, baseband signals are further processed for application purposes.

During a typical transmit operation, henceforth also known as an uplink path, baseband processors 1306 process application-layer signals from application processors 1307 and generate baseband data carrying information for communication and send the baseband signals to one or more IF radios 1305. IF radios 1305 upconvert the baseband signals to one or more intermediate frequencies which are sent through one or more cables 1303 to one or more BF modules 1302. BF modules 1302 upconvert any received IF signals to one or more predetermined transmission frequencies. One or more BF modules 1302 further form one or more wireless transmission beams independently or jointly pointing to any directions with any beamwidths that are amenable to transmission in a given propagation environment and sends wireless signals at transmission frequencies.

One or more BF modules 1302 may be placed in or on any base station. In one embodiment, a DPA-MIMO wireless communication base station 1300 comprises of one or more BF modules 1302 positioned in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment, a plurality of BF modules 1302 are placed such that a necessary edge-to-edge spacing of more than 1.5 times a free space wavelength is maintained. A placement for BF modules 1302 may be determined according to any application requirements such as, but not limited to, physical requirements, heat dissipation, user experience, maximum weight specification, power consumption, and/or spatial multiplexing gain.

One or more IF radios 1305 may be connected to one or more BF modules 1302 through one or more cables 1303. BF modules 1302 may exchange IF signals with a plurality of IF radios 1305, which may be performed during instances when, but not limited to, some of the BF modules are powered down or stand by.

Multiple BF modules 1302 are placed all over the base station 1301 in a distributed manner and facing various directions in the space to send and/or receive signals from various angles of arrival. In one embodiment of the invention, one or more BF modules 1302 may be concentrated on the downside of the base station device to transmit and receive signals away from the user's terminal. In yet another embodiment of the invention, signal attenuation may be achieved by increasing or decreasing the distance and/or angle between one or more BF modules 1302. It may be appreciated by a person with ordinary skill in the art that a sub-optimal signal attenuation placement involving distance and/or angle between one or more BF modules 1302 may be implemented in a virtual reality base station device such as, but not limited to, the base station 1301 in order to accommodate physical and/or design limitations.

Certain areas of a housing placement and a number of BF modules 1302 may be optimized for thermal considerations. In one embodiment of the invention, a base station 1301, the areas where voltage regulator and power management module are placed may demonstrate a higher surface temperature. It may be appreciated by a person with ordinary skill in the art to position BF modules 1302 away from temperature sensitive areas of base station 1301 and/or a user. One or more BF modules 1302 may be placed in locations on or around base station 1301, in order to avoid a concentration of heat and/or other thermal management components such as, but not limited to, heat sinks, thermal compounds, silicon grease. It may be appreciated by a person with ordinary skill in the art that the placement and the number of a plural of BF modules may depend on the radiation pattern of the phased arrays of the BF modules 1302. In one embodiment, the BF modules 1302 are placed in a way that the differences in spatial angles among the boresights of the main lobes in a radiation pattern of BF modules 1302 are maximized.

One or more BF modules 1302 may be placed according to a radiation pattern of phased arrays of one or more BF modules 1302. A direction of a maximum radiation pattern of a phased array is indicated by a boresight, which may be represented by a vector in 3-D space. One or more BF modules 1302 may also be placed with the consideration of a most likely spatial direction that a signal may arrive from. In one embodiment of the invention, one or more BF modules 1302 are placed to cover as much 3-D space as possible based on the boresights of one or more BF modules 1302. In another embodiment of the invention, one or more BF modules 1302 are placed based on covering a weighted 3-D space where the weights are determined by a probability a signal may arrive from any given direction.

Components of a DPA-MIMO wireless communication base station 1300 may be distributed to maintain a certain radio frequency (RF) electromagnetic field (EMF) exposure from user equipment in order to comply with the relevant RF EMF exposure limits. In one embodiment of the invention, the number, designed dimensions, and/or placement of one or more BF modules 1302 is determined by a design metric such as, but not limited to, a maximum permissible transmitted power (MPTP), a maximum equivalent isotropically radiated power (EIRP), a total radiated power (TRP) and/or a maximum permissible exposure (MPE) limit for incident power density.

Multiple BF modules 1302 are placed in a distributed manner and managed by the DPA-MIMO wireless system that they work within a certain frequency band. In one embodiment of the invention, the BF modules 1302 are placed in a way that the differences in spatial angles among the boresights of the main lobes are maximized. As a result, the harmonic products among different BF modules are minimized. In another embodiment, the DPA-MIMO wireless communication base station 1300 receives and senses the power of one or more harmonic frequencies above a set threshold, and then deactivates one or more BF modules 1302, or lowers the output power of one or more BF modules 1302, or increases the receiving attenuation of one or more BF modules 1302, or increases the filtering functions of one or more BF modules 1302.

Components a DPA-MIMO wireless communication base station 1300 may be distributed to maintain a certain channel capacity and data speed from user equipment. In one embodiment of the invention, one BF module 1302 supports at least one data stream for both transmission and reception.

Components of a DPA-MIMO wireless communication base station 1300 may be distributed to maintain a certain of weight and/or distribution of mass. In one embodiment of the invention, the number, designed dimensions, and/or placement of one or more BF modules 1302 is determined by a design metric such as, but not limited to, a maximum weight, a desired center of mass, and/or an even distribution of mass.

Tracking of a transmission source may be achieved by sending performance metrics from one or more BF modules 1302 to one or more main logic boards 1304. Performance metrics may be, but not limited to, signal strength, signal latency, and/or signal quality. A log of performance metrics and/or an instantaneous measurement of performance metrics, in addition to known locations of one or more BF modules 1302 on a device such as, but not limited to, virtual reality device 1300 may be used to device the location and/or directionality of a transmission source. In one embodiment of the invention, a latency in a received signal of one or more BF modules 1302 compared to a previously recorded latency in the same received signal may be used to derive a distance the transmission source has moved. In another embodiment of the invention, one or more differences in signal quality and/or signal strength from one or more BF modules 1302 may be compared to determine the directionality of a transmission source and any subsequent movement.

One or more BF modules 1302 may be controlled by one or more main logic boards 1304 in response to a wearable device's physical environment and/or power requirements. Heat dissipation and/or power consumption may be controlled by one or more main logic boards 1304 activating, deactivating, and/or switching performance states of one or more BF modules 1302. Performance states may be, but not limited to, a low power state, a sleep state, a high-performance state, and/or a standby state. Signal quality may be controlled by activating, deactivating, switching to a low power state, or switching to a performance state one or more BF modules 1302.

It may be appreciated by a person with ordinary skill in the art that base station 1301 may be on any stationary or mobile platform. In one embodiment of the invention, base station 1301 may be, but not limited to, a mobile vehicle, a train, an airplane, a satellite, and/or a hot air balloon.

It may be appreciated by a person with ordinary skill in the art that baseband processors 1306 include a processor that may perform any type of process and/or algorithm on electronic signals. Processes and/or algorithms include, but are not limited to, digital beamforming techniques that process one or more signals from the one or more BF modules 1302 independently or jointly. Digital beamforming may implement functions such as, but not limited to, removing interferences and/or enhancing a signal-to-noise ratio of the one or more processed signals and/or signals between antenna elements within one BF module 1302. Baseband processors 1302 may also perform baseband processing for other wireless protocols and/or standards.

It may be appreciated by a person with ordinary skill in the art that one or more cables 1303 may be any type of medium capable of sending signals and/or power. Cables 1303 may be, but not limited to, fiber optic cables, coaxial cables, IPEX/IPX cables, and/or ethernet cables with the any necessary coupling apparent by a person with ordinary skill in the art. In one embodiment, cables 1303 may be fiber optic cables carrying signals and/or power at various optical wavelengths.

It may be appreciated by a person with ordinary skill in the art that one or more cables 1303 may carry signals at one or more frequencies for each cable 1303. In one embodiment a single cable 1303 may carry multiple signals at a plurality of frequencies.

It may be appreciated by a person with ordinary skill in the art that a BF module 1302 may include any type of beamforming antenna in any orientation. BF module 1302 antennas may include, but not limited to, phased array antennas, steerable antennas, and/or reconfigurable antennas. In one embodiment, a plurality of phased array antennas are orientated in a circular formation. In another embodiment, a plurality of phased array antennas are orientated in a stacked up three-dimensional formation.

It may be appreciated by a person with ordinary skill in the art that a BF module 1302 may operate at any frequency range. Frequency ranges may be, but not limited to, from 1 GHz to 10 THz, to handle various wireless technologies and standards which may include, but not limited to, cellular communications, wireless local area network (WLAN) communications, global navigation satellite system (GNSS) communications, millimeter wave (mmWave) communications, satellite communications, terahertz (THz) communications, visible-light communications, near field communications (NFC) and/or other wireless communications. In one embodiment, a plurality of BF modules 1302 may cover a plurality of standard wireless communications frequencies such that a DPA-MIMO wireless communication base station 1300 may function at a plurality of wireless communication protocols.

It may be appreciated by a person with ordinary skill in the art that any signal and/or power may be sent between one or more elements of a DPA-MIMO wireless communication base station 1300. Signals and/or power sent between one or more elements may include, but not limited to, direct current (DC) power, control signals, reference signals, and/or feedback signals. In one embodiment, an IF radio 1305 may provide DC power to one or more BF modules 1302 through one or more cables 1303. In another embodiment, one or more IF radios 1305 may send control and reference signals through one or more cables 1303 to one or more BF modules 1302. BF modules 1302 may send feedback signals back to IF radios 1305 through cables 1303.

It may be appreciated by a person with ordinary skill in the art that one or more elements of a DPA-MIMO wireless communication base station 1300 may be combined into a single functional group or separated into a plurality of functional groups. In one embodiment, a plurality of sets each comprising of an IF radio 1305, a cable 1303, and a BF module 1302 may work individual functions such as, but not limited to, communications at a specific frequency, communications in a specific data stream, transmitting signals, and/or receiving signals. In another embodiment, a plurality of sets comprising of one or more IF radios 1305, cables 1303, and BF modules 1302 may work a single function such as, but not limited to, communications at a specific frequency, communications in a specific data stream, transmitting signals, and/or receiving signals.

It may be appreciated by a person with ordinary skill in the art that one or more BF modules 1302 may cover a wide frequency range. A frequency range covered by one or more BF modules 1302 may include, but not limited to, WiFi bands above 6 GHz, wireless gigabit (WiGig) bands from 57-71 GHz, and/or frequencies used by other wireless standards, licensed and unlicensed spectrum frequencies.

It may be appreciated by a person with ordinary skill in the art that a base station 1301 includes one or more processors that may perform any type of process and/or algorithm on electronic signals. Processes and/or algorithms include, but are not limited to, digital beamforming techniques that process one or more signals from the one or more BF modules 1302 independently or jointly. BF modules 1302 may also perform functions such as, but not limited to, removing interferences and/or enhancing a single to noise ratio of the one or more processed signals and/or signals between antenna elements within one BF module 1302.

It may be appreciated by a person with ordinary skill in the art that a DPA-MIMO wireless communication base station 1300 may be for any wireless communication standard. Wireless communication standards include, but not limited to, the $2^{nd}$ Generation cellular system (2G), the $3^{rd}$ Generation cellular system (3G), the $4^{th}$ Generation cellular system (4G), the $5^{th}$ Generation cellular system (5G), WLAN, Bluetooth, and/or other wireless standards. In one embodiment, a DPA-MIMO wireless communication base station 1300 may function at Bluetooth, NFC, and 3G/4G/5G wireless standards.

Figure 14:
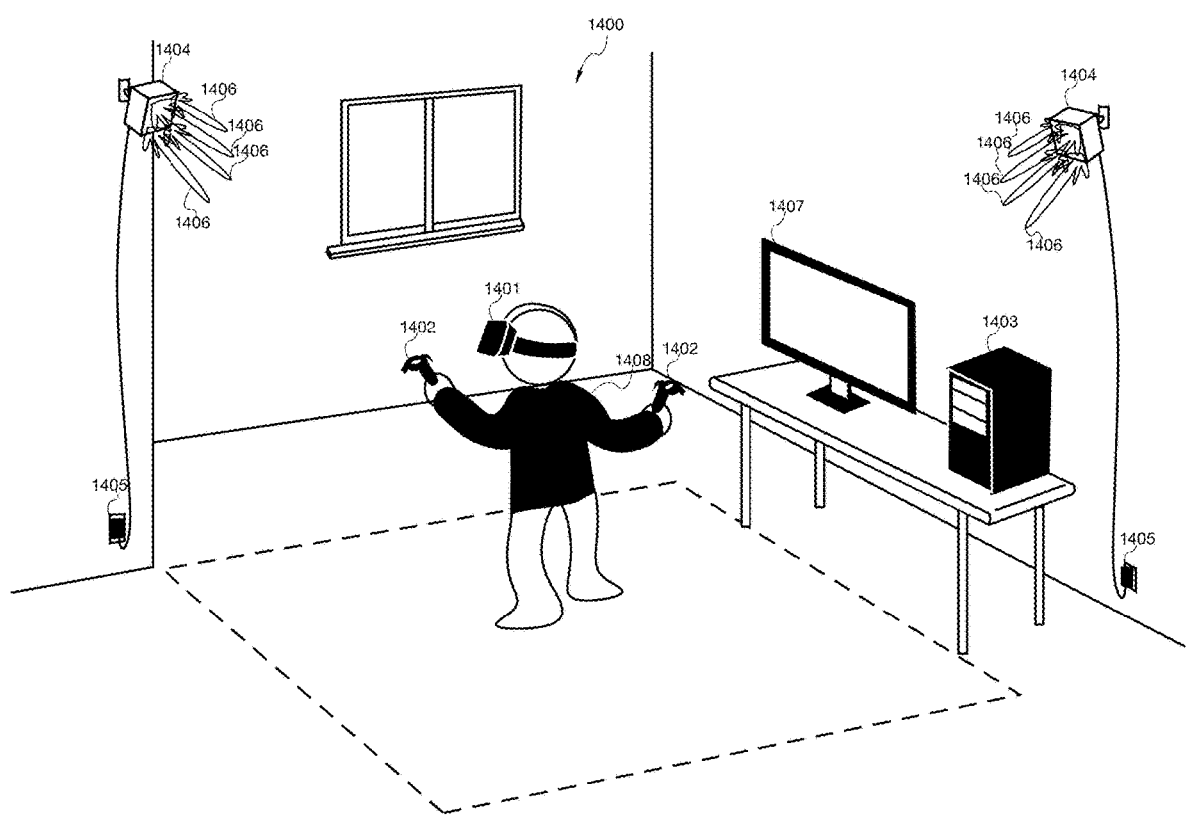
FIG. 14 illustrates a detailed perspective of an exemplary of a virtual reality application scenario with DPA-MIMO systems, in accordance with an embodiment.

FIG. 14 illustrates a detailed perspective of an exemplary of a virtual reality application scenario with DPA-MIMO wireless communication systems, in accordance with an embodiment. A DPA-MIMO wireless communication system application scenario 1400 comprises of one or more wearable virtual reality devices 1401, one or more system controllers 1402, one or more central processing systems 1403, one or more base stations 1404, one or more power suppliers of base stations 1405, one or more radiation beams 1406, one or more display devices 1407, and one or more users 1408. Wearable virtual reality devices 1401 may be configured to receive and/or transmit wireless data. System controllers 1402 may be configured to control one or more base stations 1404, one or more power suppliers of the base station 1405, one or more radiation beams 1406, and one or more display devices 1407. Central processing systems 1403 process wireless/wired data of one or more wearable virtual reality devices 1401, wireless/wired signals of system controllers 1402, wireless/wired data of one or more base stations 1404, and wireless/wired display signals of one or more display devices 1407. Base stations 1404 may be configured to receive and/or transmit wireless data. Power suppliers 1405 may be configured to transform the alternating current of city electricity to direct current for powering base stations 1404. Power suppliers 1405 may comprise of energy storage devices. Display devices 1407 may process and display the wireless/wired data from wearable virtual reality devices 1401, system controllers 1402, central processing systems 1403, and base stations 1404.

One or more base stations 1404 may be placed in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment, a plurality of base stations 1404 are placed such that a necessary edge-to-edge spacing of more than 1.5 times a free space wavelength is maintained. A placement for base stations 1404 may be determined according to any application requirements such as, but not limited to, physical requirements, heat dissipation, room space, building codes, user experience, maximum weight specification, power consumption, and/or spatial multiplexing gain.

One or more base stations 1404 may be distributed to maintain a certain coverage, channel capacity and data speed for one or more users. In one embodiment of the invention, one or more base stations provide a certain coverage of the wireless communication for one or more users in a specific area which is called a cell. In yet another embodiment of the invention, when a user moves from one cell to another cell that is also covered by one or more base stations, the wireless communication is not interrupted.

It may be appreciated by a person with ordinary skill in the art that one or more radiation beams 1406 may originate from any wireless communication device. Wireless communication devices may include, but not limited to, one or more wearable virtual reality devices 1401, one or more system controllers 1402, one or more central processing systems 1403, one or more base stations 1404, one or more display devices 1407, and/or other devices capable of transmitting wireless signals.

It may be appreciated by a person with ordinary skill in the art that wireless data of base stations 1404 may comprise of one or more radiation beams. Base stations 1404 may be configured to be synchronized for transmitting/receiving wireless data. Base stations 1404 may be configured to be installed in different locations in a distributed manner.

It may be appreciated by a person with ordinary skill in the art that one or more system controllers 1402 may be different types of controllers and/or sensors. One or more system controllers 1402 may include, but not limited to, cameras, pressure sensors, proximity sensors, GPS, wireless controllers, motion gestures, and/or personal computing devices. In one embodiment, one or more system controllers 1402 include mounted cameras and motion gestures to provide one or more users 1408 a physical controller-less virtual reality experience.

It may be appreciated by a person with ordinary skill in the art that virtual reality application scenario 1400 may be applied to any physical environment. Physical environments may include, but not limited to, auditoriums, theaters, shopping malls, college campuses, parks, and/or warehouses. In one embodiment, a reality application scenario 1400 may be applied to an outdoor shopping mall, comprising of one or more users 1408 wearing one or more wearable virtual reality devices 1401 and one or more system controllers 1402, central processing systems 1403, base stations 1404, and/or display devices 1407 to create a virtual reality experience covering an entire area.

Figure 15:
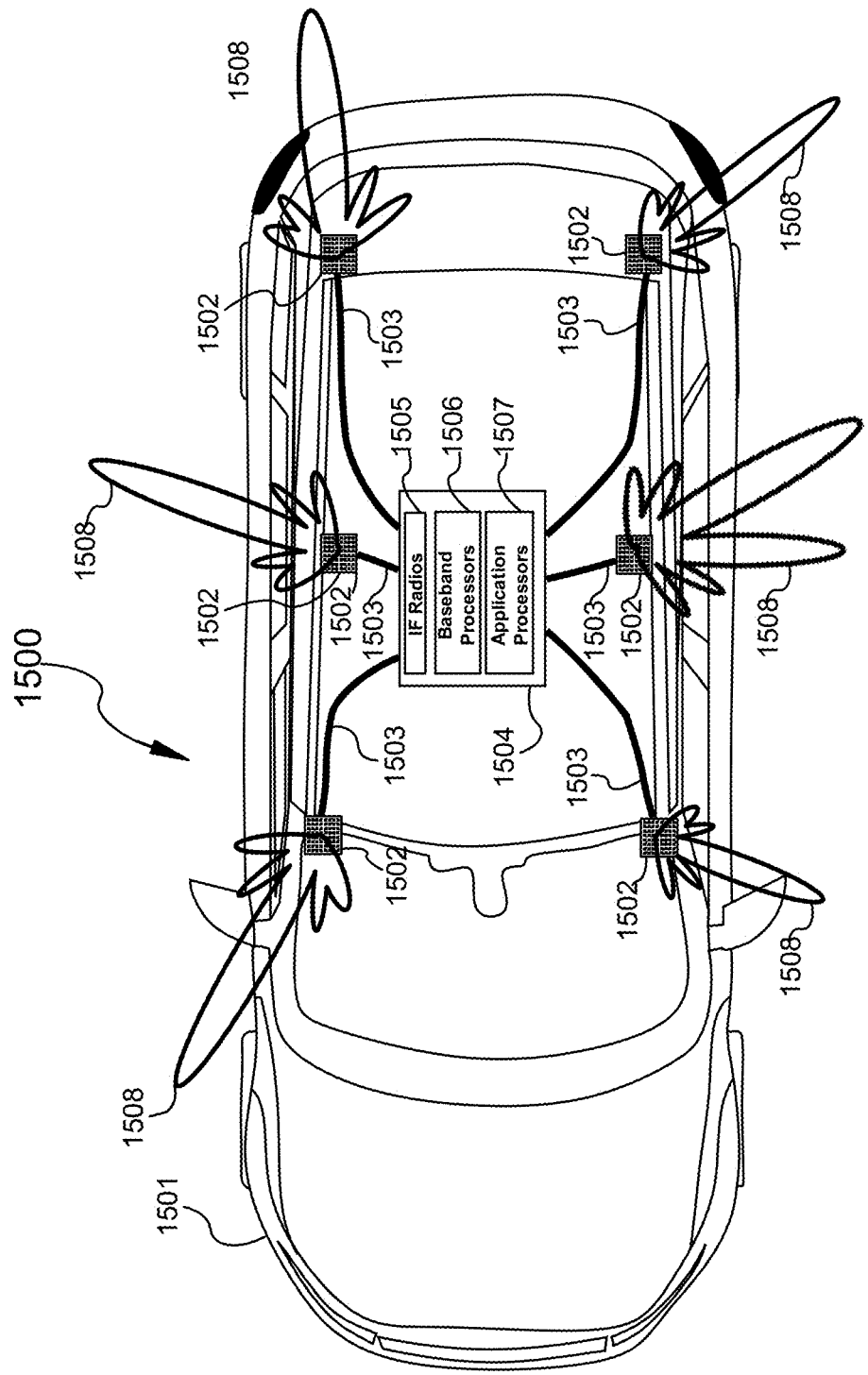
FIG. 15 illustrates a detailed perspective of an exemplary DPA-MIMO system based automotive vehicle system with multiple radiation beams, in accordance with an embodiment.

FIG. 15 illustrates a detailed perspective of an exemplary DPA-MIMO wireless communication mobile platform system with multiple radiation beams, in accordance with an embodiment. A DPA-MIMO mobile platform system 1500 comprises of a mobile platform 1501, one or more BF modules 1502, one or more cables 1503, one or more main logic boards 1504, one or more intermediate frequency (IF) radios 1505, one or more baseband processors 1506, one or more application processors 1507, and one or more radiation beams 1508. Application processors 1507 may handle all baseband signals from baseband processors 1506. Baseband processors 1506 may handle all baseband signals for all IF radios 1505. Electronic signals and/or power may travel from one or more main logic boards 1504 through one or more cables 1503 to one or more BF modules 1502. BF module 1502 may be configured to receive and/or transmit wireless data. One or more BF modules 1502 may be placed on/in the device in a distributed way.

During a typical receive operation, henceforth also known as a downlink path, BF module 1502 receives wireless signals and downconverts the wireless signals to an intermediate frequency (IF) range. One or more BF modules 1502 may form wireless receiving beams independently or jointly pointing to any directions with any beamwidths that are amenable to reception in a given propagation environment. The wireless signals in the IF range are sent through one or more cables 1503 to one or more main logic boards 1504. At IF radios 1505, IF range wireless signals are further downconverted in the frequency domain and sent to baseband processors 1506 for processing. At application processors 1507, baseband signals are further processed for application purposes.

During a typical transmit operation, henceforth also known as an uplink path, baseband processors 1506 process application-layer signals from application processors 1507 and generate baseband data carrying information for communication and send the baseband signals to one or more IF radios 1505. IF radios 1505 upconvert the baseband signals to one or more intermediate frequencies which are sent through one or more cables 1503 to one or more BF modules 1502. BF modules 1502 upconvert any received IF signals to one or more predetermined transmission frequencies. One or more BF modules 1502 further form one or more wireless transmission beams independently or jointly pointing to any directions with any beamwidths that are amenable to transmission in a given propagation environment and sends wireless signals at transmission frequencies.

One or more BF modules 1502 may be placed in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment, a plurality of BF modules 1502 are placed such that a necessary edge-to-edge spacing of more than 1.5 times a free space wavelength is maintained. A placement for BF modules 1502 may be determined according to any application requirements such as, but not limited to, physical requirements, heat dissipation, room space of vehicles, user experience, safety standards for vehicles, maximum weight specification, power consumption, and/or spatial multiplexing gain.

One or more IF radios 1505 may be connected to one or more BF modules 1502 through one or more cables 1503. BF modules 1502 may exchange IF signals with a plurality of IF radios 1505, which may be performed during instances when, but not limited to, some of the BF modules are powered down or stand by.

Multiple BF modules 1502 are placed all over the mobile platform 1501 in a distributed manner and facing various directions in the space to send and/or receive signals from various angles of arrival. In one embodiment of the invention, one or more BF modules 1502 may be concentrated on the corners of the mobile platform 1501 to transmit and receive signals away from the one or more users/base stations, and/or another mobile platform 1501. In yet another embodiment of the invention, signal attenuation may be achieved by increasing or decreasing the distance and/or angle between one or more BF modules 1502. It may be appreciated by a person with ordinary skill in the art that a sub-optimal signal attenuation placement involving distance and/or angle between one or more BF modules 1502 may be implemented in a platform such as, but not limited to, the mobile platform 1501 in order to accommodate physical and/or design limitations. It may be appreciated by a person with ordinary skill in the art that the placement and the number of a plural of BF modules may depend on the radiation pattern of the phased arrays of the BF modules 1502. In one embodiment, the BF modules 1502 are placed in a way that the differences in spatial angles among the boresights of the main lobes in a radiation pattern of BF modules 1502 are maximized.

BF modules 1502 may be placed according to a radiation pattern of phased arrays of one or more BF modules 1502. A direction of a maximum radiation pattern of a phased array is indicated by a boresight, which may be represented by a vector in 3-D space. BF modules 1502 may also be placed with the consideration of a most likely spatial direction that a signal may arrive from. In one embodiment of the invention, one or more BF modules 1502 are placed to cover as much 3-D space as possible based on the boresights of BF modules 1502. In another embodiment of the invention, BF modules 1502 are placed based on covering a weighted 3-D space where the weights are determined by a probability a signal may arrive from any given direction.

Certain areas of a housing placement and a number of BF modules 1502 may be optimized for thermal considerations. In one embodiment of the invention, a mobile platform 1501, the areas where voltage regulator and power management module are placed may demonstrate a higher surface temperature. It may be appreciated by a person with ordinary skill in the art to position BF modules 1502 away from temperature sensitive areas of a mobile platform 1501 and/or a user. One or more BF modules 1502 may be placed in locations on or around base stations, in order to avoid a concentration of heat and/or other thermal management components such as, but not limited to, heat sinks, thermal compounds, silicon grease.

Multiple BF modules 1502 are placed in a distributed manner and managed by the DPA-MIMO wireless system that they work within a certain frequency band. In one embodiment of the invention, the BF modules 1502 are placed in a way that the differences in spatial angles among the boresights of the main lobes are maximized. As a result, the harmonic products among different BF modules are minimized. In another embodiment, the DPA-MIMO mobile platform system 1500 receives and senses the power of one or more harmonic frequencies above a set threshold, and then deactivates one or more BF modules 1502, or lowers the output power of one or more BF modules 1502, or increases the receiving attenuation of one or more BF modules 1502, or increases the filtering functions of one or more BF modules 1502.

Components of a DPA-MIMO wireless communication mobile platform 1500 may be distributed to maintain a certain radio frequency (RF) electromagnetic field (EMF) exposure from user equipment in order to comply with the relevant RF EMF exposure limits. In one embodiment of the invention, the number, designed dimensions, and/or placement of one or more BF modules 1502 is determined by a design metric such as, but not limited to, a maximum permissible transmitted power (MPTP), a maximum equivalent isotropically radiated power (EIRP), a total radiated power (TRP) and/or a maximum permissible exposure (MPE) limit for incident power density.

Components a DPA-MIMO wireless communication mobile platform 1500 may be distributed to maintain a certain channel capacity and data stream speed from user equipment, base station and another mobile platform. In one embodiment of the invention, one BF module 1502 supports at least one data stream for both transmission and reception.

Components a DPA-MIMO wireless communication mobile platform 1500 may be distributed to maintain a certain coverage, channel capacity and data speed for one or more users. In one embodiment of the invention, one or more mobile platforms provide a certain coverage of the wireless communication for one or more users in a specific area which is called a cell. In yet another embodiment of the invention, when a mobile platform moves from one location to another, it can provide the coverage of wireless communication to user(s) in that new cell.

Components of a DPA-MIMO wireless communication mobile platform 1500 may be distributed to maintain a certain of weight and/or distribution of mass. In one embodiment of the invention, the number, designed dimensions, and/or placement of one or more BF modules 1502 is determined by a design metric such as, but not limited to, a maximum weight, a desired center of mass, and/or an even distribution of mass. One or more BF modules 1502 may be controlled by one or more main logic boards 1504 in response to a mobile platform's physical environment and/or power requirements. Heat dissipation and/or power consumption may be controlled by one or more main logic boards 1504 activating, deactivating, and/or switching performance states of one or more BF modules 1502. Performance states may be, but not limited to, a low power state, a sleep state, a high-performance state, and/or a standby state. Signal quality may be controlled by activating, deactivating, switching to a low power state, or switching to a performance state one or more BF modules 1502.

One or more mobile platforms 1502 may be distributed to maintain a certain coverage, channel capacity and data speed for one or more users. In one embodiment of the invention, one or more mobile platforms provide a certain coverage of the wireless communication for one or more users in a specific area which is called a cell. In yet another embodiment of the invention, when a user moves from one cell to another cell that is also covered by one or more mobile platforms, the wireless communication is not interrupted. In yet another embodiment of the invention, one or more mobile platforms 1502 may be distributed to form a network where information and data are exchanged, relayed and stored.

Tracking of a transmission source may be achieved by sending performance metrics from one or more BF modules 1502 to one or more main logic boards 1504. Performance metrics may be, but not limited to, signal strength, signal latency, and/or signal quality. A log of performance metrics and/or an instantaneous measurement of performance metrics, in addition to known locations of one or more BF modules 1502 on a device such as, but not limited to, a DPA-MIMO wireless communication mobile platform 1500 may be used to device the location and/or directionality of a transmission source. In one embodiment of the invention, a latency in a received signal of one or more BF modules 1502 compared to a previously recorded latency in the same received signal may be used to derive a distance the transmission source has moved. In another embodiment of the invention, one or more differences in signal quality and/or signal strength from one or more BF modules 1502 may be compared to determine the directionality of a transmission source and any subsequent movement.

It may be appreciated by a person with ordinary skill in the art that baseband processors 1506 include a processor that may perform any type of process and/or algorithm on electronic signals. Processes and/or algorithms include, but are not limited to, digital beamforming techniques that process one or more signals from the one or more BF modules 1502 independently or jointly. Digital beamforming may implement functions such as, but not limited to, removing interferences and/or enhancing a signal-to-noise ratio of the one or more processed signals and/or signals between antenna elements within one BF module 1502. Baseband processors 1502 may also perform baseband processing for other wireless protocols and/or standards. Baseband processors 1502 may also perform baseband processing for radar signal processing used for, but not limited to, autonomous driving.

It may be appreciated by a person with ordinary skill in the art that one or more cables 1503 may be any type of medium capable of sending signals and/or power. Cables 1503 may be, but not limited to, fiber optic cables, coaxial cables, IPEX/IPX cables, and/or ethernet cables with the any necessary coupling apparent by a person with ordinary skill in the art. In one embodiment, cables 1503 may be fiber optic cables carrying signals and/or power at various optical wavelengths.

It may be appreciated by a person with ordinary skill in the art that one or more cables 1503 may carry signals at one or more frequencies for each cable 1503. In one embodiment a single cable 1503 may carry multiple signals at a plurality of frequencies.

It may be appreciated by a person with ordinary skill in the art that a BF module 1502 may include any type of beamforming antenna in any orientation. BF module 1502 antennas may include, but not limited to, phased array antennas, steerable antennas, and/or reconfigurable antennas. In one embodiment, a plurality of phased array antennas are orientated in a circular formation. In another embodiment, a plurality of phased array antennas are orientated in a stacked up three-dimensional formation.

It may be appreciated by a person with ordinary skill in the art that a BF module 1502 may operate at any frequency range. Frequency ranges may be, but not limited to, from 1 GHz to 10 THz, to handle various wireless technologies and standards which may include, but not limited to, cellular communications, wireless local area network (WLAN) communications, global navigation satellite system (GNSS) communications, millimeter wave (mmWave) communications, satellite communications, vehicle communications, radar sensing, remote sensing, terahertz (THz) communications, visible-light communications, near field communications (NFC) and/or other wireless communications. In one embodiment, a plurality of BF modules 1502 may cover a plurality of standard wireless communications frequencies such that a DPA-MIMO mobile platform system 1500 may function at a plurality of wireless communication protocols.

It may be appreciated by a person with ordinary skill in the art that any signal and/or power may be sent between one or more elements of a DPA-MIMO mobile platform system 1500. Signals and/or power sent between one or more elements may include, but not limited to, direct current (DC) power, control signals, reference signals, and/or feedback signals. In one embodiment, an IF radio 1505 may provide DC power to one or more BF modules 1502 through one or more cables 1503. In another embodiment, one or more IF radios 1505 may send control and reference signals through one or more cables 1503 to one or more BF modules 1502. BF modules 1502 may send feedback signals back to IF radios 1505 through cables 1503.

It may be appreciated by a person with ordinary skill in the art that one or more elements of a DPA-MIMO mobile platform system 1500 may be combined into a single functional group or separated into a plurality of functional groups. In one embodiment, a plurality of sets each comprising of an IF radio 1505, a cable 1503, and a BF module 1502 may work individual functions such as, but not limited to, communications at a specific frequency, communications in a specific data stream, transmitting signals, and/or receiving signals. In another embodiment, a plurality of sets comprising of one or more IF radios 1505, cables 1503, and BF modules 1502 may work a single function such as, but not limited to, communications at a specific frequency, communications in a specific data stream, transmitting signals, and/or receiving signals.

It may be appreciated by a person with ordinary skill in the art that one or more BF modules 1502 may cover a wide frequency range. A frequency range covered by one or more BF modules 1502 may include, but not limited to, WiFi bands above 6 GHz, wireless gigabit (WiGig) bands from 57-71 GHz, 76-81 GHz for radar services, and/or frequencies used by other wireless standards, licensed and unlicensed spectrum frequencies.

It may be appreciated by a person with ordinary skill in the art that a mobile platform 1501 includes one or more processors that may perform any type of process and/or algorithm on electronic signals. Processes and/or algorithms include, but are not limited to, digital beamforming techniques that process one or more signals from the one or more BF modules 1502 independently or jointly. BF modules 1502 may also perform functions such as, but not limited to, removing interferences and/or enhancing a single to noise ratio of the one or more processed signals and/or signals between antenna elements within one BF module 1502.

It may be appreciated by a person with ordinary skill in the art that such a DPA-MIMO mobile platform system 1500 may be for any wireless communication standard. Wireless communication standards include, but not limited to, the $2^{nd}$ Generation cellular system (2G), the $3^{rd}$ Generation cellular system (3G), the $4^{th}$ Generation cellular system (4G), the $5^{th}$ Generation cellular system (5G), WLAN, Bluetooth, satellite communication, radar communication, and/or other wireless standards. In one embodiment, 1500 may function at Bluetooth, NFC, and 3G/4G/5G wireless standards.

Figure 16:
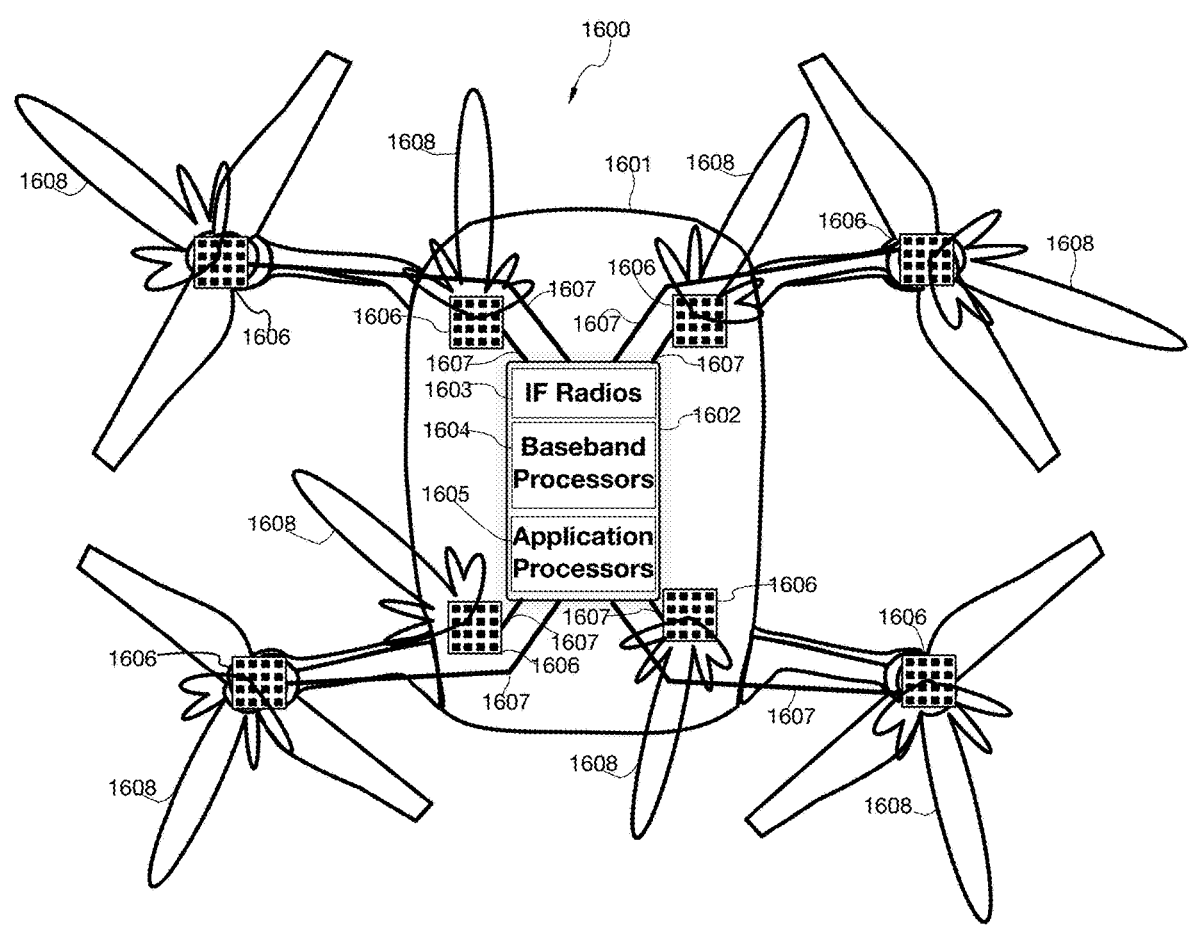
FIG. 16 illustrates a detailed perspective of an exemplary DPA-MIMO system based rotary wing aerial vehicle system with multiple radiation beams, in accordance with an embodiment.

FIG. 16 illustrates a detailed perspective of a DPA-MIMO wireless communication aerial vehicle system with multiple radiation beams, in accordance with an embodiment. A DPA-MIMO wireless communication aerial vehicle system 1600 comprises of an aerial vehicle 1601, one or more main logic boards 1602, one or more intermediate frequency (IF) radios 1603, one or more baseband processors 1604, one or more application processors 1605, one or more BF modules 1606, one or more cables 1607, and one or more radiation beams 1608. Application processors 1605 may handle all baseband signals from baseband processors 1604. Baseband processors 1604 may handle all baseband signals for all IF radios 1603. Electronic signals and/or power may travel from one or more main logic boards 1602 through one or more cables 1607 to one or more BF modules 1606. BF module 1606 may be configured to receive and/or transmit wireless data. One or more BF modules 1606 may be placed on/in the device in a distributed way.

During a typical receive operation, henceforth also known as a downlink path, BF module 1606 receives wireless signals and downconverts the wireless signals to an intermediate frequency (IF) range. One or more BF modules 1606 may form wireless receiving beams independently or jointly pointing to any directions with any beamwidths that are amenable to reception in a given propagation environment. The wireless signals in the IF range are sent through one or more cables 1607 to one or more main logic boards 1602. At IF radios 1603, IF range wireless signals are further downconverted in the frequency domain and sent to baseband processors 1604 for processing. At application processors 1605, baseband signals are further processed for application purposes.

During a typical transmit operation, henceforth also known as an uplink path, baseband processors 1604 process application-layer signals from application processors 1605 and generate baseband data carrying information for communication and send the baseband signals to one or more IF radios 1603. IF radios 1603 upconvert the baseband signals to one or more intermediate frequencies which are sent through one or more cables 1607 to one or more BF modules 1606. BF modules 1606 upconvert any received IF signals to one or more predetermined transmission frequencies. One or more BF modules 1606 further form one or more wireless transmission beams independently or jointly pointing to any directions with any beamwidths that are amenable to transmission in a given propagation environment and sends wireless signals at transmission frequencies.

One or more BF modules 1602 may be placed in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment, a plurality of BF modules 1602 are placed such that a necessary edge-to-edge spacing of more than 1.5 times a free space wavelength is maintained. A placement for BF modules 1602 may be determined according to any application requirements such as, but not limited to, physical requirements, aerodynamics, heat dissipation, payload capability of aerial vehicles, safety standards and regulations for aerial vehicles, user experience, power consumption, and/or spatial multiplexing gain.

One or more IF radios 1603 may be connected to one or more BF modules 1606 through one or more cables 1607. BF modules 1606 may exchange IF signals with a plurality of IF radios 1603, which may be performed during instances when, but not limited to, some of the BF modules are powered down or stand by.

It may be appreciated by a person with ordinary skill in the art that baseband processors 1604 include a processor that may perform any type of process and/or algorithm on electronic signals. Processes and/or algorithms include, but are not limited to, digital beamforming techniques that process one or more signals from the one or more BF modules 1606 independently or jointly. Digital beamforming may implement functions such as, but not limited to, removing interferences and/or enhancing a signal-to-noise ratio of the one or more processed signals and/or signals between antenna elements within one BF module 1606. Baseband processors 1606 may also perform baseband processing for other wireless protocols and/or standards. Baseband processors 1606 may also perform baseband processing for radar signal processing used for, but not limited to, autonomous driving.

It may be appreciated by a person with ordinary skill in the art that one or more cables 1607 may be any type of medium capable of sending signals and/or power. Cables 1607 may be, but not limited to, fiber optic cables, coaxial cables, IPEX/IPX cables, and/or ethernet cables with the any necessary coupling apparent by a person with ordinary skill in the art. In one embodiment, cables 1607 may be fiber optic cables carrying signals and/or power at various optical wavelengths.

It may be appreciated by a person with ordinary skill in the art that one or more cables 1607 may carry signals at one or more frequencies for each cable 1607. In one embodiment a single cable 1607 may carry multiple signals at a plurality of frequencies.

It may be appreciated by a person with ordinary skill in the art that a BF module 1606 may include any type of beamforming antenna in any orientation. BF module 1606 antennas may include, but not limited to, phased array antennas, steerable antennas, and/or reconfigurable antennas. In one embodiment, a plurality of phased array antennas are orientated in a circular formation. In another embodiment, a plurality of phased array antennas are orientated in a stacked up three-dimensional formation.

It may be appreciated by a person with ordinary skill in the art that a BF module 1606 may operate at any frequency range. Frequency ranges may be, but not limited to, from 1 GHz to 16 THz, to handle various wireless technologies and standards which may include, but not limited to, cellular communications, wireless local area network (WLAN) communications, global navigation satellite system (GNSS) communications, millimeter wave (mmWave) communications, satellite communications, vehicle communications, radar sensing, remote sensing, terahertz (THz) communications, visible-light communications, near field communications (NFC) and/or other wireless communications. In one embodiment, a plurality of BF modules 1606 may cover a plurality of standard wireless communications frequencies such that a DPA-MIMO wireless communications system based rotary-wing aerial vehicle 1600 may function at a plurality of wireless communication protocols.

It may be appreciated by a person with ordinary skill in the art that any signal and/or power may be sent between one or more elements of DPA-MIMO system based rotary-wing aerial vehicle 1600. Signals and/or power sent between one or more elements may include, but not limited to, direct current (DC) power, control signals, reference signals, and/or feedback signals. In one embodiment, an IF radio 1603 may provide DC power to one or more BF modules 1606 through one or more cables 1607. In another embodiment, one or more IF radios 1603 may send control and reference signals through one or more cables 1607 to one or more BF modules 1606. BF modules 1606 may send feedback signals back to IF radios 1603 through cables 1607.

It may be appreciated by a person with ordinary skill in the art that one or more elements of a DPA-MIMO system based rotary-wing aerial vehicle 1600 may be combined into a single functional group or separated into a plurality of functional groups. In one embodiment, a plurality of sets each comprising of an IF radio 1603, a cable 1607, and a BF module 1606 may work individual functions such as, but not limited to, communications at a specific frequency, communications in a specific data stream, transmitting signals, and/or receiving signals. In another embodiment, a plurality of sets comprising of one or more IF radios 1603, cables 1607, and BF modules 1606 may work a single function such as, but not limited to, communications at a specific frequency, communications in a specific data stream, transmitting signals, and/or receiving signals.

It may be appreciated by a person with ordinary skill in the art that one or more BF modules 1606 may cover a wide frequency range. A frequency range covered by one or more BF modules 1606 may include, but not limited to, WiFi bands above 6 GHz, wireless gigabit (WiGig) bands from 57-71 GHz, 76-81 GHz for radar services, and/or frequencies used by other wireless standards, licensed and unlicensed spectrum frequencies.

It may be appreciated by a person with ordinary skill in the art that a rotary-wing aerial vehicle body and chassis 1601 includes one or more processors that may perform any type of process and/or algorithm on electronic signals. Processes and/or algorithms include, but are not limited to, digital beamforming techniques that process one or more signals from the one or more BF modules 1606 independently or jointly. BF modules 1606 may also perform functions such as, but not limited to, removing interferences and/or enhancing a single to noise ratio of the one or more processed signals and/or signals between antenna elements within one BF module 1606.

It may be appreciated by a person with ordinary skill in the art that a DPA-MIMO system based rotary-wing aerial vehicle system 1600 may be for any wireless communication standard. Wireless communication standards include, but not limited to, the $2^{nd}$ Generation cellular system (2G), the $3^{rd}$ Generation cellular system (3G), the $4^{th}$ Generation cellular system (4G), the $5^{th}$ Generation cellular system (5G), WLAN, Bluetooth, satellite communication, radar communication, and/or other wireless standards. In one embodiment, a DPA-MIMO system based rotary-wing aerial vehicle system 1600 may function at Bluetooth, NFC, and 3G/4G/5G wireless standards.

Figure 17:
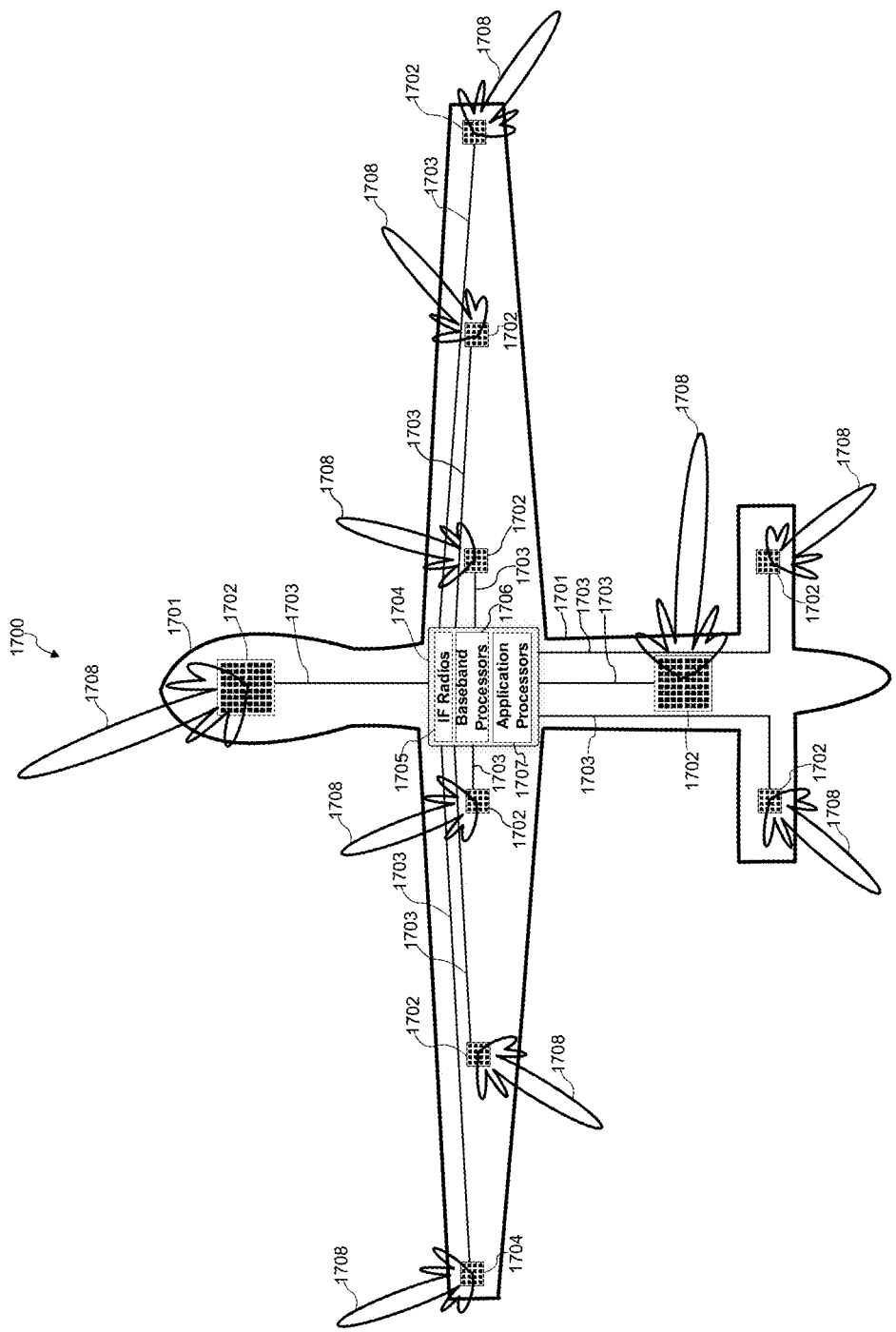
FIG. 17 illustrates a detailed perspective of an exemplary DPA-MIMO system based fixed-wing aerial vehicle system with multiple radiation beams, in accordance with an embodiment.

FIG. 17 illustrates a detailed perspective of an exemplary distributed phased arrays multiple-input-multiple-output system based fixed-wing aerial vehicle system with multiple radiation beams, in accordance with an embodiment. A DPA-MIMO wireless communication fixed-wing aerial vehicle system 1700 comprises of a fixed-wing aerial vehicle body and chassis 1701, one or more BF modules 1702, one or more cables 1703, one or more main logic boards 1704, one or more intermediate frequency (IF) radios 1705, one or more baseband processors 1706, one or more application processors 1707, and one or more radiation beams 1708. Application processors 1707 may handle all baseband signals from baseband processors 1706. Baseband processors 1706 may handle all baseband signals for all IF radios 1705. Electronic signals and/or power may travel from one or more main logic boards 1704 through one or more cables 1703 to one or more BF modules 1702. BF module 1702 may be configured to receive and/or transmit wireless data. One or more BF modules 1702 may be placed on/in the device in a distributed way.

During a typical receive operation, henceforth also known as a downlink path, BF module 1702 receives wireless signals and downconverts the wireless signals to an intermediate frequency (IF) range. One or more BF modules 1702 may form wireless receiving beams independently or jointly pointing to any directions with any beamwidths that are amenable to reception in a given propagation environment. The wireless signals in the IF range are sent through one or more cables 1703 to one or more main logic boards 1704. At IF radios 1705, IF range wireless signals are further downconverted in the frequency domain and sent to baseband processors 1706 for processing. At application processors 1707, baseband signals are further processed for application purposes.

During a typical transmit operation, henceforth also known as an uplink path, baseband processors 1706 process application-layer signals from application processors 1707 and generate baseband data carrying information for communication and send the baseband signals to one or more IF radios 1705. IF radios 1705 upconvert the baseband signals to one or more intermediate frequencies which are sent through one or more cables 1703 to one or more BF modules 1702. BF modules 1702 upconvert any received IF signals to one or more predetermined transmission frequencies. One or more BF modules 1702 further form one or more wireless transmission beams independently or jointly pointing to any directions with any beamwidths that are amenable to transmission in a given propagation environment and sends wireless signals at transmission frequencies.

One or more BF modules 1702 may be placed in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment, a plurality of BF modules 1702 are placed such that a necessary edge-to-edge spacing of more than 1.5 times a free space wavelength is maintained. A placement for BF modules 1702 may be determined according to any application requirements such as, but not limited to, physical requirements, aerodynamics, heat dissipation, payload capability of aerial vehicles, safety standards and regulations for aerial vehicles, user experience, power consumption, and/or spatial multiplexing gain.

One or more IF radios 1705 may be connected to one or more BF modules 1702 through one or more cables 1703. BF modules 1702 may exchange IF signals with a plurality of IF radios 1705, which may be performed during instances when, but not limited to, some of the BF modules are powered down or stand by.

It may be appreciated by a person with ordinary skill in the art that baseband processors 1706 include a processor that may perform any type of process and/or algorithm on electronic signals. Processes and/or algorithms include, but are not limited to, digital beamforming techniques that process one or more signals from the one or more BF modules 1702 independently or jointly. Digital beamforming may implement functions such as, but not limited to, removing interferences and/or enhancing a signal-to-noise ratio of the one or more processed signals and/or signals between antenna elements within one BF module 1702. Baseband processors 1706 may also perform baseband processing for other wireless protocols and/or standards. Baseband processors 1706 may also perform baseband processing for radar signal processing used for, but not limited to, autonomous driving.

It may be appreciated by a person with ordinary skill in the art that one or more cables 1703 may be any type of medium capable of sending signals and/or power. Cables 1703 may be, but not limited to, fiber optic cables, coaxial cables, IPEX/IPX cables, and/or ethernet cables with the any necessary coupling apparent by a person with ordinary skill in the art. In one embodiment, cables 1703 may be fiber optic cables carrying signals and/or power at various optical wavelengths.

It may be appreciated by a person with ordinary skill in the art that one or more cables 1703 may carry signals at one or more frequencies for each cable 1703. In one embodiment a single cable 1703 may carry multiple signals at a plurality of frequencies.

It may be appreciated by a person with ordinary skill in the art that a BF module 1702 may include any type of beamforming antenna in any orientation. BF module 1702 antennas may include, but not limited to, phased array antennas, steerable antennas, and/or reconfigurable antennas. In one embodiment, a plurality of phased array antennas are orientated in a circular formation. In another embodiment, a plurality of phased array antennas are orientated in a stacked up three-dimensional formation.

It may be appreciated by a person with ordinary skill in the art that a BF module 1702 may operate at any frequency range. Frequency ranges may be, but not limited to, from 1 GHz to 10 THz, to handle various wireless technologies and standards which may include, but not limited to, cellular communications, wireless local area network (WLAN) communications, global navigation satellite system (GNSS) communications, millimeter wave (mmWave) communications, satellite communications, vehicle communications, radar sensing, remote sensing, terahertz (THz) communications, visible-light communications, near field communications (NFC) and/or other wireless communications. In one embodiment, a plurality of BF modules 1702 may cover a plurality of standard wireless communications frequencies such that a DPA-MIMO wireless communications system based fixed-wing aerial vehicle 1700 may function at a plurality of wireless communication protocols.

It may be appreciated by a person with ordinary skill in the art that any signal and/or power may be sent between one or more elements of a DPA-MIMO wireless communication fixed-wing aerial vehicle system 1700. Signals and/or power sent between one or more elements may include, but not limited to, direct current (DC) power, control signals, reference signals, and/or feedback signals. In one embodiment, an IF radio 1705 may provide DC power to one or more BF modules 1702 through one or more cables 1703. In another embodiment, one or more IF radios 1705 may send control and reference signals through one or more cables 1703 to one or more BF modules 1702. BF modules 1702 may send feedback signals back to IF radios 1705 through cables 1703.

It may be appreciated by a person with ordinary skill in the art that one or more elements of a DPA-MIMO wireless communication fixed-wing aerial vehicle system with multiple radiation beams 1700 may be combined into a single functional group or separated into a plurality of functional groups. In one embodiment, a plurality of sets each comprising of an IF radio 1705, a cable 1703, and a BF module 1702 may work individual functions such as, but not limited to, communications at a specific frequency, communications in a specific data stream, transmitting signals, and/or receiving signals. In another embodiment, a plurality of sets comprising of one or more IF radios 1705, cables 1703, and BF modules 1702 may work a single function such as, but not limited to, communications at a specific frequency, communications in a specific data stream, transmitting signals, and/or receiving signals.

It may be appreciated by a person with ordinary skill in the art that one or more BF modules 1702 may cover a wide frequency range. A frequency range covered by one or more BF modules 1702 may include, but not limited to, WiFi bands above 6 GHz, wireless gigabit (WiGig) bands from 57-71 GHz, 76-81 GHz for radar services, and/or frequencies used by other wireless standards, licensed and unlicensed spectrum frequencies.

It may be appreciated by a person with ordinary skill in the art that a fixed-wing aerial vehicle body and chassis 1701 includes one or more processors that may perform any type of process and/or algorithm on electronic signals. Processes and/or algorithms include, but are not limited to, digital beamforming techniques that process one or more signals from the one or more BF modules 1702 independently or jointly. BF modules 1702 may also perform functions such as, but not limited to, removing interferences and/or enhancing a single to noise ratio of the one or more processed signals and/or signals between antenna elements within one BF module 1702.

It may be appreciated by a person with ordinary skill in the art that such a DPA-MIMO wireless communication fixed-wing aerial vehicle system 1700 may be for any wireless communication standard. Wireless communication standards include, but not limited to, the $2^{nd}$ Generation cellular system (2G), the $3^{rd}$ Generation cellular system (3G), the $4^{th}$ Generation cellular system (4G), the $5^{th}$ Generation cellular system (5G), WLAN, Bluetooth, satellite communication, radar communication, and/or other wireless standards. In one embodiment, 1700 may function at Bluetooth, NFC, and 3G/4G/5G wireless standards.

Figure 18:
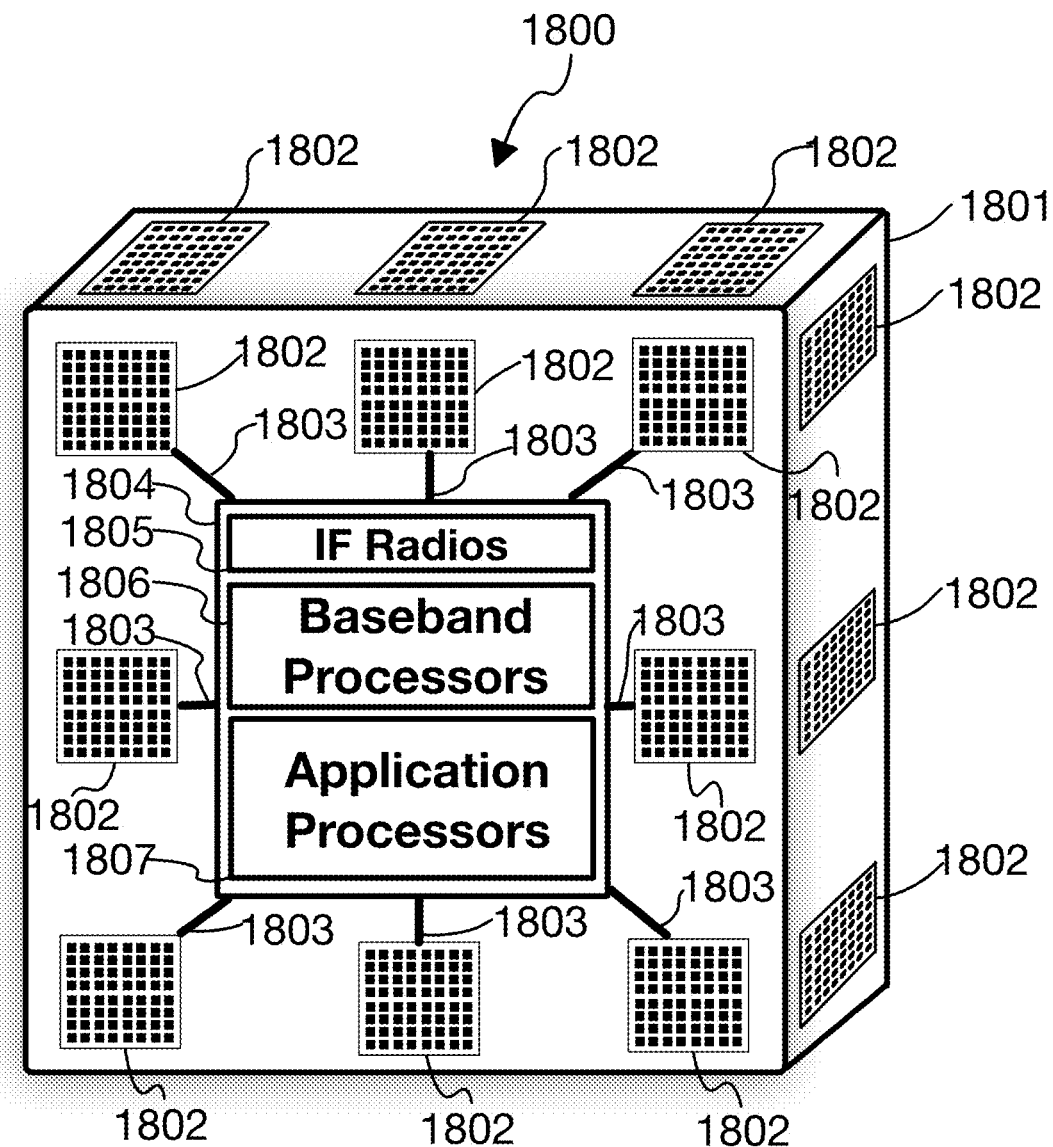
FIG. 18 illustrates a detailed perspective of an exemplary DPA-MIMO system based high altitude platform communication box, in accordance with an embodiment.

FIG. 18 illustrates a detailed perspective of an exemplary distributed phased arrays multiple-input-multiple-output system based communication box for high altitude platform (HAP), in accordance with an embodiment. A DPA-MIMO wireless communication HAP communication box 1800 comprises of a communication box case/housing/frame 1801, one or more BF modules 1802, one or more cables 1803, one or more main logic boards 1804, one or more intermediate frequency (IF) radios 1805, one or more baseband processors 1806, one or more application processors 1807, and one or more radiation beams 1808. Application processors 1807 may handle all baseband signals from baseband processors 1806. Baseband processors 1806 may handle all baseband signals for all IF radios 1805. Electronic signals and/or power may travel from one or more main logic boards 1804 through one or more cables 1803 to one or more BF modules 1802. BF module 1802 may be configured to receive and/or transmit wireless data. One or more BF modules 1802 may be placed on/in the device in a distributed way.

During a typical receive operation, henceforth also known as a downlink path, BF module 1802 receives wireless signals and downconverts the wireless signals to an intermediate frequency (IF) range. One or more BF modules 1802 may form wireless receiving beams independently or jointly pointing to any directions with any beamwidths that are amenable to reception in a given propagation environment. The wireless signals in the IF range are sent through one or more cables 1803 to one or more main logic boards 1804. At IF radios 1805, IF range wireless signals are further downconverted in the frequency domain and sent to baseband processors 1806 for processing. At application processors 1807, baseband signals are further processed for application purposes.

During a typical transmit operation, henceforth also known as an uplink path, baseband processors 1806 process application-layer signals from application processors 1807 and generate baseband data carrying information for communication and send the baseband signals to one or more IF radios 1805. IF radios 1805 upconvert the baseband signals to one or more intermediate frequencies which are sent through one or more cables 1803 to one or more BF modules 1802. BF modules 1802 upconvert any received IF signals to one or more predetermined transmission frequencies. One or more BF modules 1802 further form one or more wireless transmission beams independently or jointly pointing to any directions with any beamwidths that are amenable to transmission in a given propagation environment and sends wireless signals at transmission frequencies.

One or more BF modules 1802 may be placed in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment, a plurality of BF modules 1802 are placed such that a necessary edge-to-edge spacing of more than 1.5 times a free space wavelength is maintained. A placement for BF modules 1802 may be determined according to any application requirements such as, but not limited to, physical requirements, aerodynamics, environmental conditions, heat dissipation, payload capability of high-altitude platform systems, safety standards and regulations for high altitude platform systems, user experience, power consumption, and/or spatial multiplexing gain.

One or more IF radios 1805 may be connected to one or more BF modules 1802 through one or more cables 1803. BF modules 1802 may exchange IF signals with a plurality of IF radios 1805, which may be performed during instances when, but not limited to, some of the BF modules are powered down or stand by.

It may be appreciated by a person with ordinary skill in the art that baseband processors 1806 include a processor that may perform any type of process and/or algorithm on electronic signals. Processes and/or algorithms include, but are not limited to, digital beamforming techniques that process one or more signals from the one or more BF modules 1802 independently or jointly. Digital beamforming may implement functions such as, but not limited to, removing interferences and/or enhancing a signal-to-noise ratio of the one or more processed signals and/or signals between antenna elements within one BF module 1802. Baseband processors 1806 may also perform baseband processing for other wireless protocols and/or standards. Baseband processors 1806 may also perform baseband processing for radar signal processing used for, but not limited to, autonomous driving.

It may be appreciated by a person with ordinary skill in the art that one or more cables 1803 may be any type of medium capable of sending signals and/or power. Cables 1803 may be, but not limited to, fiber optic cables, coaxial cables, IPEX/IPX cables, and/or ethernet cables with the any necessary coupling apparent by a person with ordinary skill in the art. In one embodiment, cables 1803 may be fiber optic cables carrying signals and/or power at various optical wavelengths.

It may be appreciated by a person with ordinary skill in the art that one or more cables 1803 may carry signals at one or more frequencies for each cable 1803. In one embodiment a single cable 1803 may carry multiple signals at a plurality of frequencies.

It may be appreciated by a person with ordinary skill in the art that a BF module 1802 may include any type of beamforming antenna in any orientation. BF module 1802 antennas may include, but not limited to, phased array antennas, steerable antennas, and/or reconfigurable antennas. In one embodiment, a plurality of phased array antennas are orientated in a circular formation. In another embodiment, a plurality of phased array antennas are orientated in a stacked up three-dimensional formation.

It may be appreciated by a person with ordinary skill in the art that a BF module 1802 may operate at any frequency range. Frequency ranges may be, but not limited to, from 1 GHz to 10 THz, to handle various wireless technologies and standards which may include, but not limited to, cellular communications, wireless local area network (WLAN) communications, global navigation satellite system (GNSS) communications, millimeter wave (mmWave) communications, satellite communications, vehicle communications, radar sensing, remote sensing, terahertz (THz) communications, visible-light communications, near field communications (NFC) and/or other wireless communications. In one embodiment, a plurality of BF modules 1802 may cover a plurality of standard wireless communications frequencies such that a DPA-MIMO wireless communications system based HAP communication box 1800 may function at a plurality of wireless communication protocols.

It may be appreciated by a person with ordinary skill in the art that any signal and/or power may be sent between one or more elements of DPA-MIMO system based HAP communication box. Signals and/or power sent between one or more elements may include, but not limited to, direct current (DC) power, control signals, reference signals, and/or feedback signals. In one embodiment, an IF radio 1805 may provide DC power to one or more BF modules 1802 through one or more cables 1803. In another embodiment, one or more IF radios 1805 may send control and reference signals through one or more cables 1803 to one or more BF modules 1802. BF modules 1802 may send feedback signals back to IF radios 1805 through cables 1803.

It may be appreciated by a person with ordinary skill in the art that one or more elements of a DPA-MIMO wireless communication HAP communication box 1800 may be combined into a single functional group or separated into a plurality of functional groups. In one embodiment, a plurality of sets each comprising of an IF radio 1805, a cable 1803, and a BF module 1802 may work individual functions such as, but not limited to, communications at a specific frequency, communications in a specific data stream, transmitting signals, and/or receiving signals. In another embodiment, a plurality of sets comprising of one or more IF radios 1805, cables 1803, and BF modules 1802 may work a single function such as, but not limited to, communications at a specific frequency, communications in a specific data stream, transmitting signals, and/or receiving signals.

It may be appreciated by a person with ordinary skill in the art that one or more BF modules 1802 may cover a wide frequency range. A frequency range covered by one or more BF modules 1802 may include, but not limited to, WiFi bands above 6 GHz, wireless gigabit (WiGig) bands from 57-71 GHz, 76-81 GHz for radar services, and/or frequencies used by other wireless standards, licensed and unlicensed spectrum frequencies.

It may be appreciated by a person with ordinary skill in the art that a HAP communication box case/housing/frame 1801 includes one or more processors that may perform any type of process and/or algorithm on electronic signals. Processes and/or algorithms include, but are not limited to, digital beamforming techniques that process one or more signals from the one or more BF modules 1802 independently or jointly. BF modules 1802 may also perform functions such as, but not limited to, removing interferences and/or enhancing a single to noise ratio of the one or more processed signals and/or signals between antenna elements within one BF module 1802.

It may be appreciated by a person with ordinary skill in the art that such a DPA-MIMO wireless communication HAP communication box 1800 may be for any wireless communication standard. Wireless communication standards include, but not limited to, the $2^{nd}$ Generation cellular system (2G), the $3^{rd}$ Generation cellular system (3G), the $4^{th}$ Generation cellular system (4G), the $5^{th}$ Generation cellular system (5G), WLAN, Bluetooth, satellite communication, radar communication, and/or other wireless standards. In one embodiment, 1800 may function at Bluetooth, NFC, and 3G/4G/5G wireless standards.

Figure 19:
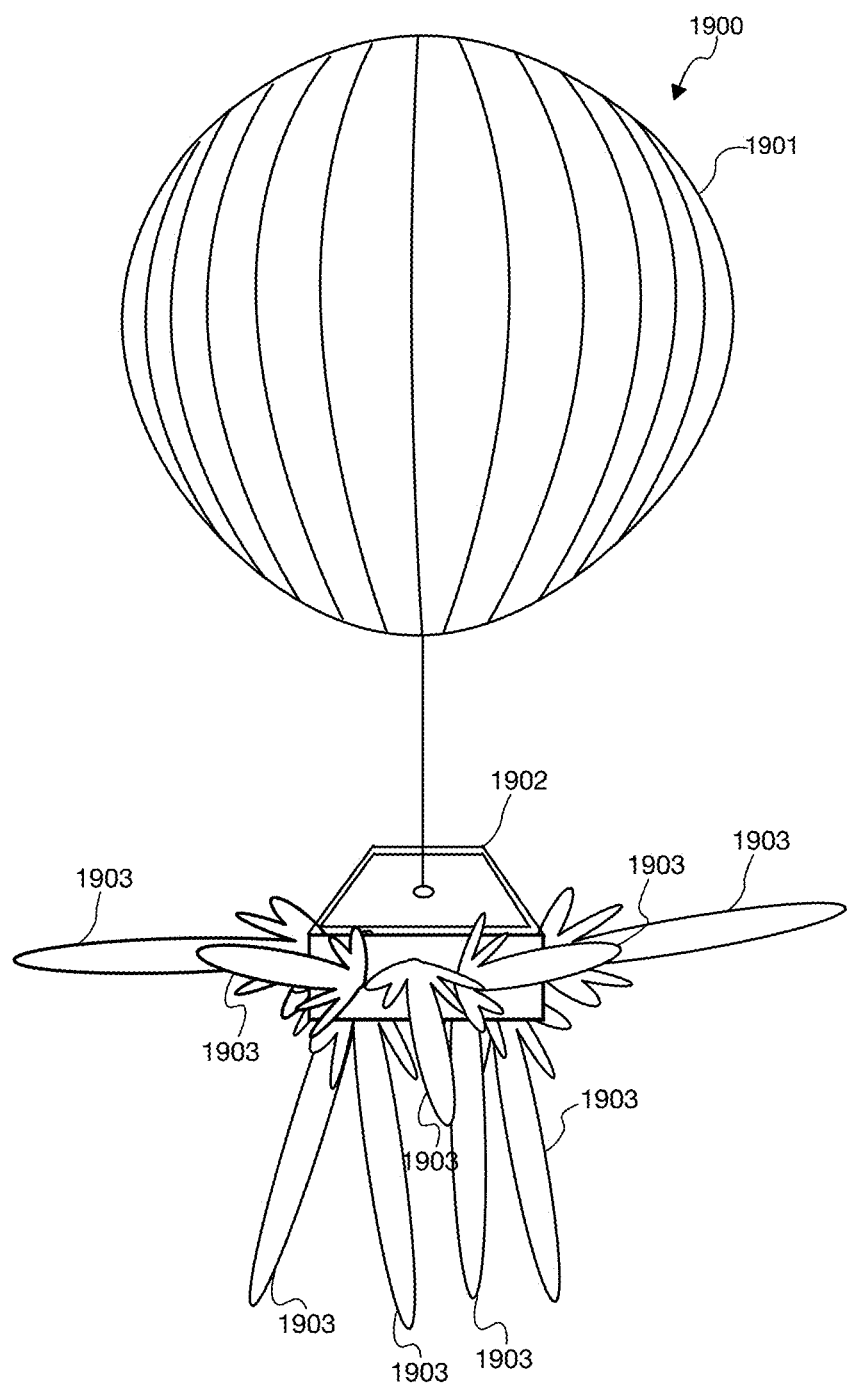
FIG. 19 illustrates a detailed perspective of an exemplary DPA-MIMO system based high altitude platform communication system with multiple radiation beams, in accordance with an embodiment.

FIG. 19 illustrates a detailed perspective of an exemplary distributed phased arrays multiple-input-multiple-output system based high altitude platform communication system with multiple radiation beams, in accordance with an embodiment. A DPA-MIMO wireless communication HAP system 1900 comprises of one or more balloons 1901, one or more communication and payload boxes 1902, and one or more radiation beams 1903.

In an example embodiment, a balloon 1901 may be filled with hot air, and helium, hydrogen or other lighter-than-air material. A balloon 1901 could be also associated with propulsion of ionic wind. A balloon 1901 could be associated with energy harvesting materials and technology to transfer the natural energy including, but not limited to solar energy, wind energy, thermal energy, and/or artificial energy including, but not limited to, microwave energy and optical energy.

It may be appreciated by a person with ordinary skill in the art that one or more DPA-MIMO wireless communication HAP system 1900 may be deployed and functioning at any altitude above the sea level, e.g., from 10 m to 60 km. A DPA-MIMO wireless communication HAP system 1900 communicates with each other to form a local, regional, or global network. A DPA-MIMO wireless communication HAP system 1900 communicates with other systems including but not limited to, terrestrial communication systems, marine/under-water communication systems, aerial communication systems, satellite communication systems, outerspace communication systems, and interstellar communication systems.

It may be appreciated by a person with ordinary skill in the art that a communication and payload box 1902 includes one or more processors that may perform any type of process and/or algorithm on electronic signals. Processes and/or algorithms include, but are not limited to, digital beamforming techniques that process one or more signals from the one or more BF modules independently or jointly.

It may be appreciated by a person with ordinary skill in the art that a communication and payload box 1902 could be associated with energy harvesting materials and technology to transfer the natural energy including, but not limited to solar energy, wind energy, thermal energy, and/or artificial energy including, but not limited to, microwave energy and optical energy.

It may be appreciated by a person with ordinary skill in the art that a communication and payload box 1902 may operate at any frequency range. Frequency ranges may be, but not limited to, from 1 GHz to 10 THz, to handle various wireless technologies and standards which may include, but not limited to, cellular communications, wireless local area network (WLAN) communications, global navigation satellite system (GNSS) communications, millimeter wave (mmWave) communications, satellite communications, vehicle communications, radar sensing, remote sensing, terahertz (THz) communications, visible-light communications, near field communications (NFC) and/or other wireless communications. In one embodiment, a plurality of communication and payload boxes 1902 may cover a plurality of standard wireless communications frequencies such that the DPA-MIMO wireless communication HAP system 1900 may function at a plurality of wireless communication protocols.

It may be appreciated by a person with ordinary skill in the art that a communication and payload box 1902 may be integrated to and/or mounted on any high-altitude device and/or vehicle. Communication and payload box 1902 may be integrated to and/or mounted on devices and/or vehicles including, but not limited to, satellites, skyscrapers, cellular towers, blimps, mountains, asteroids, and/or moons. In one embodiment, communication and payload box 1902 is mounted onto a spaceship.

One or more DPA-MIMO wireless communication HAP systems 1900 may be distributed to maintain a certain coverage, channel capacity and data speed for one or more users. In one embodiment of the invention, one or more HAP systems 1900 provide a certain coverage of the wireless communication for one or more users in a specific area which is called a cell. In yet another embodiment of the invention, when a user moves from one cell to another cell that is also covered by one or more HAP systems, the wireless communication is not interrupted. In yet another embodiment of the invention, one or more mobile platforms 1900 may be distributed to form a network where information and data are exchanged, relayed and stored.

Figure 20:
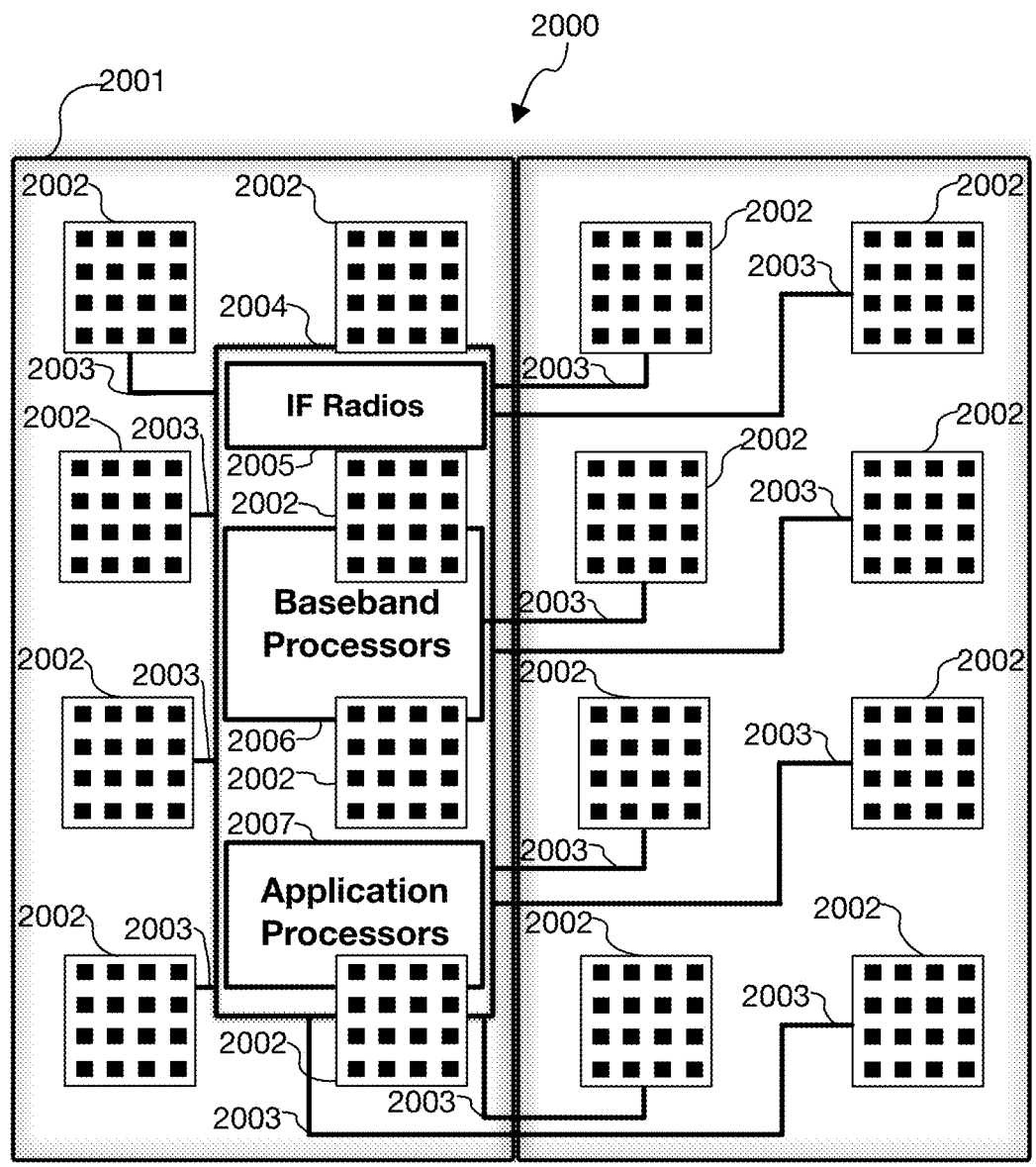
FIG. 20 illustrates a detailed perspective of an exemplary DPA-MIMO system based foldable handheld device, in accordance with an embodiment.

FIG. 20 illustrates a detailed perspective of an exemplary DPA-MIMO wireless communication handheld device, in accordance with an embodiment. A DPA-MIMO wireless communication handheld device 2000 comprises of a case/housing/frame of a handheld device 2001, one or more BF modules 2002, one or more cables 2003, one or more main logic boards 2004, one or more intermediate frequency (IF) radios 2005, one or more baseband processors 2006, one or more application processors 2007, and one or more radiation beams 2008. Application processors 2007 may handle all baseband signals from baseband processors 2006. Baseband processors 2006 may handle all baseband signals for all IF radios 2005. Electronic signals and/or power may travel from one or more main logic boards 2004 through one or more cables 2003 to one or more BF modules 2002. BF module 2002 may be configured to receive and/or transmit wireless data. One or more BF modules 2002 may be placed on/in the device in a distributed way.

During a typical receive operation, henceforth also known as a downlink path, BF module 2002 receives wireless signals and downconverts the wireless signals to an intermediate frequency (IF) range. One or more BF modules 2002 may form wireless receiving beams independently or jointly pointing to any directions with any beamwidths that are amenable to reception in a given propagation environment. The wireless signals in the IF range are sent through one or more cables 2003 to one or more main logic boards 2004. At IF radios 2005, IF range wireless signals are further downconverted in the frequency domain and sent to baseband processors 2006 for processing. At application processors 2007, baseband signals are further processed for application purposes.

During a typical transmit operation, henceforth also known as an uplink path, baseband processors 2006 process application-layer signals from application processors 2007 and generate baseband data carrying information for communication and send the baseband signals to one or more IF radios 2005. IF radios 2005 upconvert the baseband signals to one or more intermediate frequencies which are sent through one or more cables 2003 to one or more BF modules 2002. BF modules 2002 upconvert any received IF signals to one or more predetermined transmission frequencies. One or more BF modules 2002 further form one or more wireless transmission beams independently or jointly pointing to any directions with any beamwidths that are amenable to transmission in a given propagation environment and sends wireless signals at transmission frequencies.

One or more BF modules 2002 may be placed in or on any handheld device. In one embodiment, a DPA-MIMO wireless communication handheld device 2000 comprises of one or more BF modules 2002 positioned in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment, a plurality of BF modules 2002 are placed such that a necessary edge-to-edge spacing of more than 1.5 times a free space wavelength is maintained. A placement for BF modules 2002 may be determined according to any application requirements such as, but not limited to, physical requirements, heat dissipation, user experience, maximum weight specification, power consumption, and/or spatial multiplexing gain.

Multiple BF modules 2002 are placed all over the handheld device 2001 in a distributed manner and facing various directions in the space to send and/or receive signals from various angles of arrival. In one embodiment of the invention, one or more BF modules 2002 may be concentrated on the upper side of the handheld device to transmit and receive signals away from the user's body. In yet another embodiment of the invention, signal attenuation may be achieved by increasing or decreasing the distance and/or angle between one or more BF modules 2002. It may be appreciated by a person with ordinary skill in the art that a sub-optimal signal attenuation placement involving distance and/or angle between one or more BF modules 2002 may be implemented in a handheld device such as, but not limited to, the handheld device 2001 in order to accommodate physical and/or design limitations. It may be appreciated by a person with ordinary skill in the art that the placement and the number of a plural of BF modules may depend on the radiation pattern of the phased arrays of the BF modules 2002. In one embodiment, the BF modules 2002 are placed in a way that the differences in spatial angles among the boresights of the main lobes in a radiation pattern of BF modules 2002 are maximized.

BF modules 2002 may be placed according to a radiation pattern of phased arrays of one or more BF modules 2002. A direction of a maximum radiation pattern of a phased array is indicated by a boresight, which may be represented by a vector in 3-D space. BF modules 2002 may also be placed with the consideration of a most likely spatial direction that a signal may arrive from. In one embodiment of the invention, one or more BF modules 2002 are placed to cover as much 3-D space as possible based on the boresights of BF modules 2002. In another embodiment of the invention, BF modules 2002 are placed based on covering a weighted 3-D space where the weights are determined by a probability a signal may arrive from any given direction.

Certain areas of a housing placement and a number of BF modules 2002 may be optimized for thermal considerations. In one embodiment of the invention, a handheld device 2001, the user's forehead and temple area may demonstrate a higher surface temperature. It may be appreciated by a person with ordinary skill in the art to position BF modules 2002 away from temperature sensitive areas of the handheld device 2001 and/or a user. One or more BF modules 2002 may be placed in locations on or around virtual reality device headset 2001, in order to avoid a concentration of heat and/or other thermal management components such as, but not limited to, heat sinks, thermal compounds, silicon grease.

Multiple BF modules 2002 are placed in a distributed manner and managed by the DPA-MIMO wireless system that they work within a certain frequency band. In one embodiment of the invention, the BF modules 2002 are placed in a way that the differences in spatial angles among the boresights of the main lobes are maximized. As a result, the harmonic products among different BF modules are minimized. In another embodiment, the DPA-MIMO wireless communication handheld device 2000 receives and senses the power of one or more harmonic frequencies above a set threshold, and then deactivates one or more BF modules 2002, or lowers the output power of one or more BF modules 2002, or increases the receiving attenuation of one or more BF modules 2002, or increases the filtering functions of one or more BF modules 2002.

Components of DPA-MIMO wireless communication handheld device 2000 may be distributed to maintain a certain radio frequency (RF) electromagnetic field (EMF) exposure from user equipment in order to comply with the relevant RF EMF exposure limits. In one embodiment of the invention, the number, designed dimensions, and/or placement of one or more BF modules 2002 is determined by a design metric such as, but not limited to, a maximum permissible transmitted power (MPTP), a maximum equivalent isotropically radiated power (EIRP), a total radiated power (TRP) and/or a maximum permissible exposure (MPE) limit for incident power density.

Components of DPA-MIMO wireless communication handheld device 2000 may be distributed to maintain a certain channel capacity and data stream speed from user equipment. In one embodiment of the invention, one BF module 2002 supports at least one data stream for both transmission and reception.

Components of DPA-MIMO wireless communication handheld device 2000 may be distributed to maintain a certain of weight and/or distribution of mass. In one embodiment of the invention, the number, designed dimensions, and/or placement of one or more BF modules 2002 is determined by a design metric such as, but not limited to, a maximum weight, a desired center of mass, and/or an even distribution of mass.

Tracking of a transmission source may be achieved by sending performance metrics from one or more BF modules 2002 to one or more main logic boards 2004. Performance metrics may be, but not limited to, signal strength, signal latency, and/or signal quality. A log of performance metrics and/or an instantaneous measurement of performance metrics, in addition to known locations of one or more BF modules 2002 on a device such as, but not limited to, a DPA-MIMO wireless communication handheld device 2000 may be used to device the location and/or directionality of a transmission source. In one embodiment of the invention, a latency in a received signal of one or more BF modules 2002 compared to a previously recorded latency in the same received signal may be used to derive a distance the transmission source has moved. In another embodiment of the invention, one or more differences in signal quality and/or signal strength from one or more BF modules 2002 may be compared to determine the directionality of a transmission source and any subsequent movement.

One or more BF modules 2002 may be controlled by one or more main logic boards 2004 in response to a handheld device's physical environment and/or power requirements. Heat dissipation and/or power consumption may be controlled by one or more main logic boards 2004 activating, deactivating, and/or switching performance states of one or more BF modules 2002. Performance states may be, but not limited to, a low power state, a sleep state, a high-performance state, and/or a standby state. Signal quality may be controlled by activating, deactivating, switching to a low power state, or switching to a performance state one or more BF modules 2002.

One or more IF radios 2005 may be connected to one or more BF modules 2002 through one or more cables 2003. BF modules 2002 may exchange IF signals with a plurality of IF radios 2005, which may be performed during instances when, but not limited to, some of the BF modules are powered down or stand by.

It may be appreciated by a person with ordinary skill in the art that a case/housing/frame of a handheld device 2001 can be folded in between to any angle.

It may be appreciated by a person with ordinary skill in the art that baseband processors 2006 include a processor that may perform any type of process and/or algorithm on electronic signals. Processes and/or algorithms include, but are not limited to, digital beamforming techniques that process one or more signals from the one or more BF modules 2002 independently or jointly. Digital beamforming may implement functions such as, but not limited to, removing interferences and/or enhancing a signal-to-noise ratio of the one or more processed signals and/or signals between antenna elements within one BF module 2002. Baseband processors 2006 may also perform baseband processing for other wireless protocols and/or standards. Baseband processors 2006 may also perform baseband processing for radar signal processing used for, but not limited to, autonomous driving.

It may be appreciated by a person with ordinary skill in the art that one or more cables 2003 may be any type of medium capable of sending signals and/or power. Cables 2003 may be, but not limited to, fiber optic cables, coaxial cables, IPEX/IPX cables, and/or ethernet cables with the any necessary coupling apparent by a person with ordinary skill in the art. In one embodiment, cables 2003 may be fiber optic cables carrying signals and/or power at various optical wavelengths.

It may be appreciated by a person with ordinary skill in the art that one or more cables 2003 may carry signals at one or more frequencies for each cable 2003. In one embodiment a single cable 2003 may carry multiple signals at a plurality of frequencies.

It may be appreciated by a person with ordinary skill in the art that a BF module 2002 may include any type of beamforming antenna in any orientation. BF module 2002 antennas may include, but not limited to, phased array antennas, steerable antennas, and/or reconfigurable antennas. In one embodiment, a plurality of phased array antennas are orientated in a circular formation. In another embodiment, a plurality of phased array antennas are orientated in a stacked up three-dimensional formation.

It may be appreciated by a person with ordinary skill in the art that a BF module 2002 may operate at any frequency range. Frequency ranges may be, but not limited to, from 1 GHz to 10 THz, to handle various wireless technologies and standards which may include, but not limited to, cellular communications, wireless local area network (WLAN) communications, global navigation satellite system (GNSS) communications, millimeter wave (mmWave) communications, satellite communications, vehicle communications, radar sensing, remote sensing, terahertz (THz) communications, visible-light communications, near field communications (NFC) and/or other wireless communications. In one embodiment, a plurality of BF modules 2002 may cover a plurality of standard wireless communications frequencies such that a DPA-MIMO wireless communication handheld device 2000 may function at a plurality of wireless communication protocols.

It may be appreciated by a person with ordinary skill in the art that any signal and/or power may be sent between one or more elements of DPA-MIMO system based hand-held device. Signals and/or power sent between one or more elements may include, but not limited to, direct current (DC) power, control signals, reference signals, and/or feedback signals. In one embodiment, an IF radio 2005 may provide DC power to one or more BF modules 2002 through one or more cables 2003. In another embodiment, one or more IF radios 2005 may send control and reference signals through one or more cables 2003 to one or more BF modules 2002. BF modules 2002 may send feedback signals back to IF radios 2005 through cables 2003.

It may be appreciated by a person with ordinary skill in the art that one or more elements of a DPA-MIMO wireless communication handheld device 2000 may be combined into a single functional group or separated into a plurality of functional groups. In one embodiment, a plurality of sets each comprising of an IF radio 2005, a cable 2003, and a BF module 2002 may work individual functions such as, but not limited to, communications at a specific frequency, communications in a specific data stream, transmitting signals, and/or receiving signals. In another embodiment, a plurality of sets comprising of one or more IF radios 2005, cables 2003, and BF modules 2002 may work a single function such as, but not limited to, communications at a specific frequency, communications in a specific data stream, transmitting signals, and/or receiving signals.

It may be appreciated by a person with ordinary skill in the art that one or more BF modules 2002 may cover a wide frequency range. A frequency range covered by one or more BF modules 2002 may include, but not limited to, WiFi bands above 6 GHz, wireless gigabit (WiGig) bands from 57-71 GHz, 76-81 GHz for radar services, and/or frequencies used by other wireless standards, licensed and unlicensed spectrum frequencies.

It may be appreciated by a person with ordinary skill in the art that the case/housing/frame of a handheld device 2001 includes one or more processors that may perform any type of process and/or algorithm on electronic signals. Processes and/or algorithms include, but are not limited to, digital beamforming techniques that process one or more signals from the one or more BF modules 2002 independently or jointly. BF modules 2002 may also perform functions such as, but not limited to, removing interferences and/or enhancing a single to noise ratio of the one or more processed signals and/or signals between antenna elements within one BF module 2002.

It may be appreciated by a person with ordinary skill in the art that such a DPA-MIMO wireless communication handheld device 2000 may be for any wireless communication standard. Wireless communication standards include, but not limited to, the $2^{nd}$ Generation cellular system (2G), the $3^{rd}$ Generation cellular system (3G), the $4^{th}$ Generation cellular system (4G), the $5^{th}$ Generation cellular system (5G), the $5^{th}$ Generation and beyond cellular system, WLAN, Bluetooth, satellite communication, radar communication, and/or other wireless standards. In one embodiment, 2000 may function at Bluetooth, NFC, and 3G/4G/5G wireless standards.

Those skilled in the art will readily recognize, in light of and in accordance with the teachings of the present disclosure, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the disclosure may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present disclosure, other equivalent or alternative methods of implementing distributed phased arrays based multiple-input-multiple-output in hardware designs according to the present disclosure will be apparent to those skilled in the art. Various aspects of the disclosure have been described above by way of illustration, and the specific embodiments disclosed are not intended to limit the disclosure to the particular forms disclosed. The particular implementation of the DPA-MIMO in hardware designs may vary depending upon the particular context or application. By way of example, and not limitation, the DPA-MIMO in hardware designs described in the foregoing were principally directed to consumer electronics implementations; however, similar techniques may instead be applied to the Internet of Things applications such as vehicle to vehicle or sensor to sensor communications, which implementations of the present disclosure are contemplated as within the scope of the present disclosure. The disclosure is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

What is claimed is:

1. A system for distributed phased array multiple input multiple output (DPA-MIMO) communications, comprising:
   a plurality of beamforming (BF) modules, each beamforming module comprises at least a beamforming antenna, at least a downconverter that downconverts a beamformed antenna radio frequency signal to an intermediate frequency signal, and an upconverter that upconverts an intermediate frequency signal to a radio frequency signal and sends said radio frequency signal to said beamforming antenna for transmission; and
   a plurality of intermediate frequency (IF) radios, each intermediate frequency radio comprises at least a downconverter that downconverts an intermediate frequency signal sent from a BF module to a baseband signal, and at least an upconverter that upconverts said baseband signal to an intermediate frequency signal that is transmitted to a beamforming module;
   wherein based on at least one of: available physical space, a beamforming module dimension, a total number of BF modules, heat dissipation, a target spatial multiplexing gain, or a target diversity gain, said plurality of BF modules are placed in a distributed way with an edge-to-edge spacing that maximally reduces mutual coupling and propagation interference, whereby signal diversity and signal quality are enhanced among said BF modules;
   wherein one or more BF modules among said plurality of BF modules are placed to maximize spatial angle differences between BF modules.

2. The system of claim 1, wherein said plurality of BF modules are spaced from one another by at least 1.5 times a free-space wavelength.

3. The system of claim 1, wherein said one or more BF modules are placed to avoid thermal hotspots or thermal management components.

4. The system of claim 1, wherein quantity of said plurality of BF modules and dimensions of said plurality of BF modules are determined based on at least one of a maximum weight of the system or a distribution of mass of the system.

5. The system of claim 1, further comprising one or more logic boards that activate, deactivate, or switch a performance state of said one or more BF modules in response to the system's physical environment or signal quality.

6. The system of claim 1, wherein said one or more BF modules are positioned, activated, deactivated, or switched in a performance state to keep the system within a certain frequency band.

7. The system of claim 1, wherein at least one data stream is communicated by said one or more BF modules.

8. The system of claim 7, wherein each data stream is communicated over a different frequency or spatial direction.

9. The system of claim 7, wherein a transmission source is tracked by said one or more BF modules based on at least one of a the-received signal strength or quality from at least one data stream from the transmission source.

10. A wireless communications base station, comprising:
a plurality of beamforming (BF) modules, each beamforming module comprises at least a beamforming antenna, at least a downconverter that downconverts a beamformed antenna radio frequency signal to an intermediate frequency signal, and an upconverter that upconverts an intermediate frequency signal to a radio frequency signal and sends said radio frequency signal to said beamforming antenna for transmission; and
a plurality of intermediate frequency (IF) radios, each intermediate frequency radio comprises at least a downconverter that downconverts an intermediate frequency signal sent from a BF module to a baseband signal, and at least an upconverter that upconverts said baseband signal to an intermediate frequency signal that is transmitted to a beamforming module;
wherein based on at least one of: available physical space, a beamforming module dimension, a total number of BF modules, heat dissipation, a target spatial multiplexing gain, or a target diversity gain, said plurality of BF modules are placed in a distributed way with an edge-to-edge spacing that maximally reduces mutual coupling and propagation interference, whereby signal diversity and signal quality are enhanced among said BF modules;
wherein one or more BF modules among said plurality of BF modules are positioned, activated, deactivated, or change a performance state to keep the wireless communications base station within a certain frequency band;
wherein at least one data stream is communicated by said one or more BF modules;
wherein said one or more BF modules are placed to maximize spatial angle differences between BF modules.

11. The wireless communications base station of claim 10, wherein said plurality of BF modules are spaced from one another by at least 1.5 times a free space wavelength.

12. The wireless communications base station of claim 10, wherein said one or more BF modules are placed to avoid thermal hotspots or thermal management components.

13. The wireless communications base station of claim 10, wherein quantity of said plurality of BF modules and dimensions of said plurality of BF modules are determined based on at least one of a maximum weight of the wireless communications base station or a distribution of mass of the wireless communications base station.

14. The wireless communications base station of claim 10, further comprising one or more logic boards that activate, deactivate, or switch a performance state of said one or more BF modules in response to the wireless communications base station's physical environment or signal quality.

15. The wireless communications base station of claim 10, wherein each data stream is communicated over a different frequency or spatial direction.

16. The wireless communications base station of claim 10, wherein a transmission source is tracked by said one or more BF modules based on at least one of a received signal strength or quality from at least one data stream from the transmission source.

17. The wireless communications base station of claim 10, wherein the wireless communications base station is a mobile platform.

18. The wireless communications base station of claim 10, wherein the wireless communications base station is a high altitude platform.

* * * * *